(12) United States Patent
Kuribayashi

(10) Patent No.: US 10,747,395 B2
(45) Date of Patent: Aug. 18, 2020

(54) DISPLAY DEVICE, PROGRAM, DISPLAY METHOD AND CONTROL DEVICE

(71) Applicant: NIKON CORPORATION, Tokyo (JP)

(72) Inventor: Hidenori Kuribayashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/314,022

(22) PCT Filed: Jun. 28, 2017

(86) PCT No.: PCT/JP2017/023759
§ 371 (c)(1),
(2) Date: Dec. 28, 2018

(87) PCT Pub. No.: WO2018/003859
PCT Pub. Date: Jan. 4, 2018

(65) Prior Publication Data
US 2019/0243527 A1 Aug. 8, 2019

(30) Foreign Application Priority Data

Jun. 28, 2016 (JP) .................................. 2016-128209

(51) Int. Cl.
*G06F 3/14* (2006.01)
*G06F 3/0481* (2013.01)
*G06F 3/0488* (2013.01)
*G06F 3/0482* (2013.01)
*G06F 3/041* (2006.01)
(Continued)

(52) U.S. Cl.
CPC .......... *G06F 3/04817* (2013.01); *G06F 3/044* (2013.01); *G06F 3/0418* (2013.01); *G06F 3/0482* (2013.01); *G06F 3/0484* (2013.01); *G06F 3/0488* (2013.01); *G06F 3/04842* (2013.01); *G06F 2203/04101* (2013.01)

(58) Field of Classification Search
CPC ........................................................ G06F 3/14
USPC ................ 715/835; 345/169, 174, 419, 456; 348/43, 46
See application file for complete search history.

(56) References Cited

U.S. PATENT DOCUMENTS

2008/0030428 A1 2/2008 Tomisawa et al.
2011/0187638 A1* 8/2011 Chao ........................ G06F 3/01
345/156
(Continued)

FOREIGN PATENT DOCUMENTS

JP 2006-293878 A 10/2006
JP 2012-022307 A 2/2012
(Continued)

OTHER PUBLICATIONS

Oct. 3, 2017 International Search Report issued in International Patent Application No. PCT/JP2017/023759.
(Continued)

*Primary Examiner* — Ruay Ho
(74) *Attorney, Agent, or Firm* — Oliff PLC

(57) ABSTRACT

A display device includes: a display unit that displays, at a remote position, a display image that includes a first image and a second image; an operation detection unit that detects an operation by a user on the display image; and a display control unit that adjusts a display mode for at least one of the first image and the second image based upon the operation detected by the operation detection unit.

19 Claims, 42 Drawing Sheets

(51) Int. Cl.
     *G06F 3/0484*     (2013.01)
     *G06F 3/044*      (2006.01)

(56) References Cited

U.S. PATENT DOCUMENTS

| | | | |
|---|---|---|---|
| 2012/0280987 A1 | 11/2012 | Iwane | |
| 2013/0027517 A1* | 1/2013 | Kim | H04N 13/128 348/46 |
| 2013/0169543 A1* | 7/2013 | Xia | G09G 3/003 345/169 |
| 2014/0015794 A1 | 1/2014 | Ueno et al. | |
| 2014/0192054 A1* | 7/2014 | Yoo | G06T 15/60 345/426 |
| 2015/0268766 A1* | 9/2015 | Kim | G06F 3/044 345/174 |
| 2016/0004114 A1 | 1/2016 | Kuramoto | |
| 2016/0255325 A1* | 9/2016 | Zhang | H04N 13/30 348/43 |

FOREIGN PATENT DOCUMENTS

| | | |
|---|---|---|
| JP | 2012-203737 A | 10/2012 |
| JP | 2015-097049 A | 5/2015 |
| JP | 2016-014777 A | 1/2016 |
| WO | 2006/035816 A1 | 4/2006 |
| WO | 2011/158911 A1 | 12/2011 |

OTHER PUBLICATIONS

Mar. 3, 2020 Office Action issued in Japanese Patent Application No. 2018-525214.

* cited by examiner (a)

(b)

(c)

(d)

(a)

(b)

(a)

(b)

(a)

(b)

(a)

(b)

DISPLAY DEVICE, PROGRAM, DISPLAY METHOD AND CONTROL DEVICE

TECHNICAL FIELD

The present invention relates to a display device, a program, a display method and a control device.

BACKGROUND ART

There is an electronic device disclosed in the related art, which is capable of detecting an operation, performed with respect to a three-dimensional object displayed in midair, via a capacitive touch sensor that calculates the distance between a finger and a touch panel (see PTL 1). While PTL 1 describes that the electronic device detects an operation performed with respect to a three-dimensional object (target), full operability of operations performed with respect to the object is not assured in the art disclosed in PTL 1.

CITATION LIST

Patent Literature

PTL 1: Japanese Laid Open Patent Publication No. 2012-203737

SUMMARY OF INVENTION

According to the 1st aspect, a display device comprises: a display unit that displays, at a remote position, a display image that includes a first image and a second image; an operation detection unit that detects an operation by a user on the display image; and a display control unit that adjusts a display mode for at least one of the first image and the second image based upon the operation detected by the operation detection unit.

According to the 2nd aspect, a program executed by a computer in a display device enables the computer to execute: processing for displaying a display image that includes a first image and a second image at a position set apart from the display device; processing for detecting an operation by a user at the display device; and processing for adjusting a display mode for at least one of the first image and the second image based upon the detected operation.

According to the 3rd aspect, a display method through which an image is displayed, comprises: displaying a display image that includes a first image and a second image at a position set apart from a display device; detecting an operation by a user at the display device; and adjusting a display mode for at least one of the first image and the second image based upon the detected operation.

According to the 4th aspect, a display device comprises: a display unit that displays a display image together with reference information displayed by the display device at a position set apart from the display device by a predetermined distance; an operation detection unit that detects an operation by a user on the display image; an acquisition unit that sets a detection reference near the display image and ascertains a positional relationship between the detection reference and the operation by the user; and a control unit that executes display control in which a display mode for the display image in relation to the reference information displayed by the display device is altered based upon the positional relationship ascertained by the acquisition unit.

According to the 5th aspect, a control device that adjusts, based upon an operation by a user with respect to a display in a midair, the display, comprises: an acquisition unit that ascertains a positional relationship between a first reference used for detection of the operation and a position at which the operation is detected; and a control unit that adjusts the display in relation to a second reference used as a depth cue for the display based upon the positional relationship ascertained by the acquisition unit.

DESCRIPTION OF EMBODIMENTS

First Embodiment

In reference to drawings, the display device in the first embodiment will be described. The first embodiment will be described in reference to an example in which the display device in the embodiment is mounted in an operation panel. It is to be noted that the display device in the embodiment may be mounted in an electronic apparatus other than an operation panel. It may be mounted in, for instance, a portable telephone, a television set, a tablet terminal, a portable information terminal device such as a wristwatch-type terminal, a personal computer, a music player, a land-line telephone unit or a wearable device. In addition, the display device in the embodiment may be integrated into an electronic system such as a digital signage system. Examples of such digital signage systems include a compact display unit built into, for instance, an automatic vending machine or the like or a large display unit, assuming a size greater than a typical adult person, which may be installed at a wall surface in a building. Furthermore, the display device in the embodiment may be built into, for instance, a panel of an automatic cash machine (ATM) at which the user enters a PIN number, an amount of money and the like on, a panel of an automatic ticket vending machine that dispenses railway tickets, bus tickets, commuter passes and the like, or a panel on any of various types of information search terminal systems installed in libraries, art galleries and the like. Moreover, the display device in the embodiment may be installed in any of various types of robots (including, for instance, mobile robots and electronic devices such as self-propelled vacuum machines).

Figure 1:
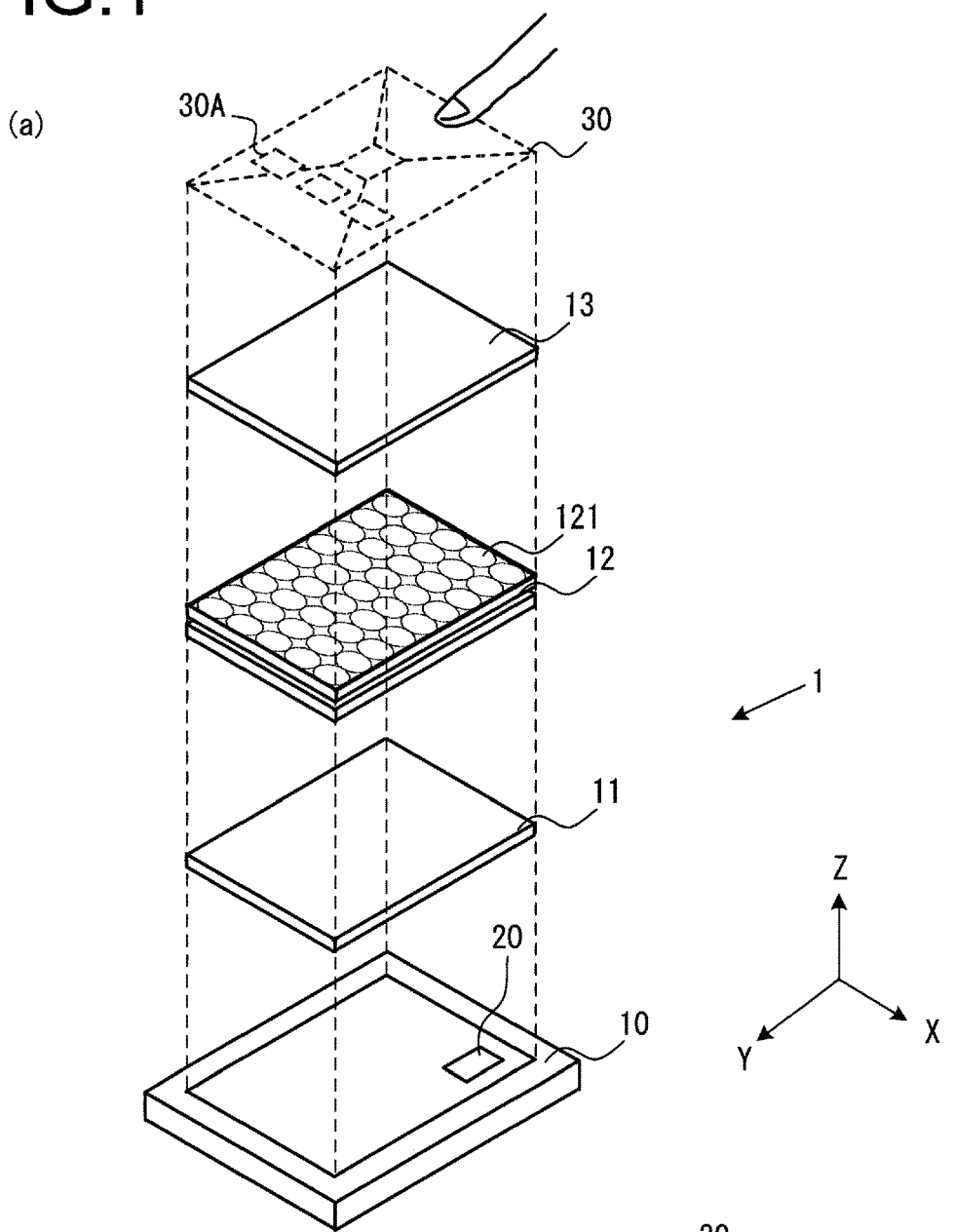
FIG. 1 Illustrations of the structure of the display device in a first embodiment, in an exploded perspective view in (a), in a sectional view in (b) and in a sectional view of an example in which another image-forming optical system is used in (c)
Figure 1:
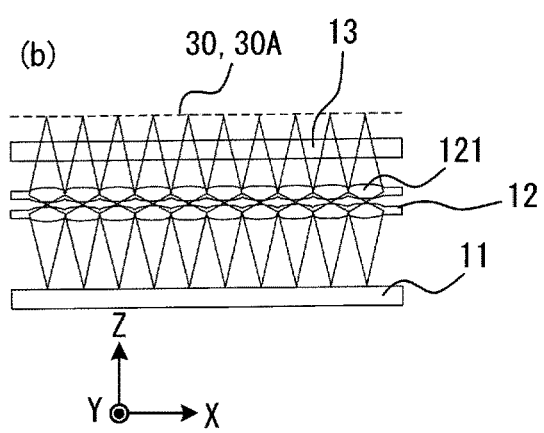
Figure 1:
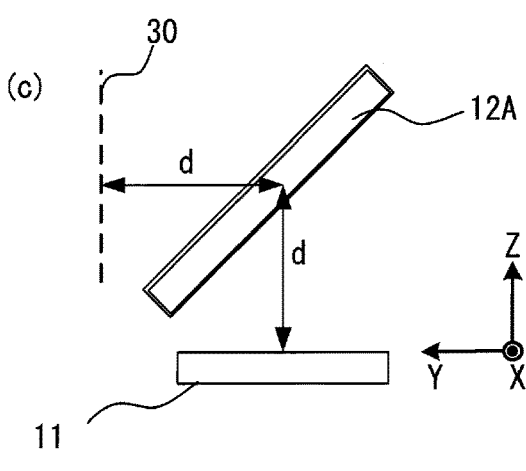

FIG. 1(*a*) is an exploded perspective view of a display device 1 and FIG. 1(*b*) shows part of the display device 1 in an enlarged side elevation. It is to be noted that for purposes of better clarity, the explanation will be given in reference to a coordinate system assuming an X axis, a Y axis and a Z axis set relative to the display device 1, as indicated in the figure. It is to be also noted that the coordinate system set for these purposes does not need to be an orthogonal coordinate system assuming the X axis, the Y axis and the Z axis, and it may instead be a polar coordinate system or a cylindrical coordinate system. In other words, any of these coordinate systems may be set relative to the display device 1, as long as the X axis is set to extend along the shorter sides of the rectangular display area of the display device 1, the Y axis is set to extend along the longer sides of the rectangular display area of the display device 1 and the Z axis is set to extend along a direction perpendicular to the display area (i.e., along the optical axis of an image-forming optical system, to be explained later).

The display device 1 includes a body 10 having installed therein a control unit 20, a display unit 11, an image-forming optical system 12 and an operation detector 13. The display unit 11, the image-forming optical system 12 and the operation detector 13 are disposed inside the body 10. The display unit 11, constituted with, for instance, a liquid crystal display or an organic EL display, includes a plurality of display pixel arrays arranged in a two-dimensional pattern. Under control executed by the control unit 20, the display unit 11 displays an image corresponding to display image data. The image-forming optical system 12 is disposed further upward relative to the display unit 11 (on the + side along the Z direction) over a predetermined distance from the display unit 11. The image-forming optical system 12 may be configured by, for instance, layering two micro-lens arrays, each having convex micro-lenses 121 arranged in a two-dimensional array, along the Z direction as clearly indicated in FIG. 1(*b*).

The image-forming optical system 12 forms a midair image or floating image 30 of a display image brought up on display at the display unit 11 in the space above the display device 1. Namely, an image brought up on display at the display unit 11 can be viewed by the user of the display device 1 as the midair image 30, floating above the display device 1. It is to be noted that the following explanation will be provided by assuming that the user is located toward the + side along the Z direction relative to the display device 1. The midair image 30 includes a plurality of icons 30A (operation buttons) corresponding to operation buttons via which various settings may be selected for the display device 1 and instructions for implementing various functions of the display device 1 may be issued. The icons 30A in the embodiment may be set over, for instance, one row by three columns. It is to be noted that instead of the micro-lens arrays, pinhole arrays or slit arrays may be used to configure the image-forming optical system.

It is to be noted that the display device 1 may include an image-forming optical system 12 other than that shown in FIGS. 1(*a*) and 1(*b*). The display device 1 may instead include, for instance, an image-forming optical system 12A shown in FIG. 1(*c*), having a plurality of micromirror elements disposed in a two-dimensional pattern therein, which is disposed at a predetermined angle relative to the XY plane, e.g., with a 45° tilt. In the image-forming optical system 12A, light having departed an image displayed at the display unit 11 and advancing toward the + side along the Z direction, is reflected toward the Y direction + side and forms a midair image 30, produced from a display image, at a plane ranging parallel to the ZX plane. At this time, the midair image 30 indicated by the dotted line in FIG. 1(*c*) is formed at a position symmetrical to the display surface of the display unit 11 relative to the image-forming optical system 12A. In other words, a distance d between the display surface of the display unit 11 and the image-forming optical system 12A matches a distance d between the image-forming optical system 12A and the midair image 30. It is to be noted that a specific structure that may be adopted in such an image-forming optical system 9 is disclosed in, for instance, Japanese Laid Open Patent Publication No. 2016-14777. In addition, instead of the structure described above, the image-forming optical system 12A may include, for instance, convex lenses. It is to be noted that a structure that includes convex lenses may assume a significant thickness along the optical axis depending upon the focal length and accordingly, an image-forming optical system that includes Fresnel lenses may be adopted instead. An optimal image-forming optical system 12 or 12A to be included in the display device 1 may be selected in correspondence to a specific set of requirements such as those described above.

Furthermore, the display device 1 may display a midair image 30 in conjunction with an image-forming optical system 12A that adopts the light-field method of the known art, as will be explained later in reference to variation 1 of a fourth embodiment.

In addition, the position at which the midair image 30 is displayed can be moved along the Y direction by allowing the distance d between the display unit 11 and the image-forming optical system 12A in FIG. 1(*c*) measured along the Z direction, to be variable. For instance, as the distance between the display unit 11 and the image-forming optical system 12A is reduced, i.e., as the display unit 11 is moved closer to the image-forming optical system 12A, the midair image 30 is moved and displayed at a position further away from the user (toward the Y direction − side). If, on the other hand, the distance between the display unit 11 and the image-forming optical system 12A is increased, i.e., if the display unit 11 is moved further away from the image-forming optical system 12A, the midair image 30 is moved and displayed at a position closer to the user (toward the Y direction + side). The display unit 11 can be moved along the Z direction via a drive device such as a motor, another type of actuator or the like (not shown).

It is to be noted that in conjunction with a certain type of image-forming optical system 12A, the relationship between the direction along which the midair image 30 moves and the direction along which the image-forming optical system 12A moves may be reversed from that described above. Namely, as the display unit 11 is moved closer to the image-forming optical system 12A, the midair image 30 may be moved and displayed at a position closer to the user (toward the Y direction + side). If, on the other hand, the distance between the display unit 11 and the image-forming optical system 12A is increased, i.e., if the display unit 11 is moved further away from the image-forming optical system 12A, the midair image 30 may be moved and displayed at a position further away from the user (toward the Y direction − side). This means that the direction along which the display unit 11 is moved will be adjusted in correspondence to the type of image-forming optical system 12A being used.

The operation detector 13, disposed further upward (on the + side along the Z direction) relative to the image-forming optical system 12, may be configured with, for instance, a transparent capacitive panel (hereafter will be referred to as a capacitive panel) of the known art. The operation detector 13 configured with a capacitive panel forms an electric field with electrodes constituted of a substantially transparent material. When the user moves his finger or a stylus toward the midair image 30 in order to perform an operation at the display position of the midair image 30, the operation detector 13 detects the position of the finger or the stylus as an electrostatic capacitance value. For instance, it may compare the electrostatic capacitance values detected at the four corners of the transparent capacitive panel so as to detect the position of the user's finger along the X axis and the Y axis based upon the electrostatic capacitance values detected at the four corners.

In addition, the operation detector 13 takes an electrostatic capacitance detection range, which is a predetermined range set upward relative to itself, as will be described in detail later. The operation detector 13 detects the distance between the operation detector 13 and the finger or the stylus within the predetermined detection range (i.e., the position on the Z axis) based upon the electrostatic capacitance values detected at the four corners of the transparent capacitive panel by, for instance, comparing the electrostatic capacitance values detected at the four corners. The midair image 30 must be formed via the image-forming optical system 12 so that it occupies a position within the predetermined detection range of the operation detector 13, and preferably a position around the midway point of the predetermined detection range along the up/down direction. As described above, the operation detector 13 detects a user operation performed at the display position of the midair image 30 with his finger or with a stylus, enabling the user to perform operations with respect to the midair image 30 without having to directly touch the operation detector 13. It is to be noted that while the following description will be provided by assuming that the user uses his finger to perform an operation at the display position of the midair image 30, the same principle will apply to an operation performed via a stylus or the like.

Figure 2:
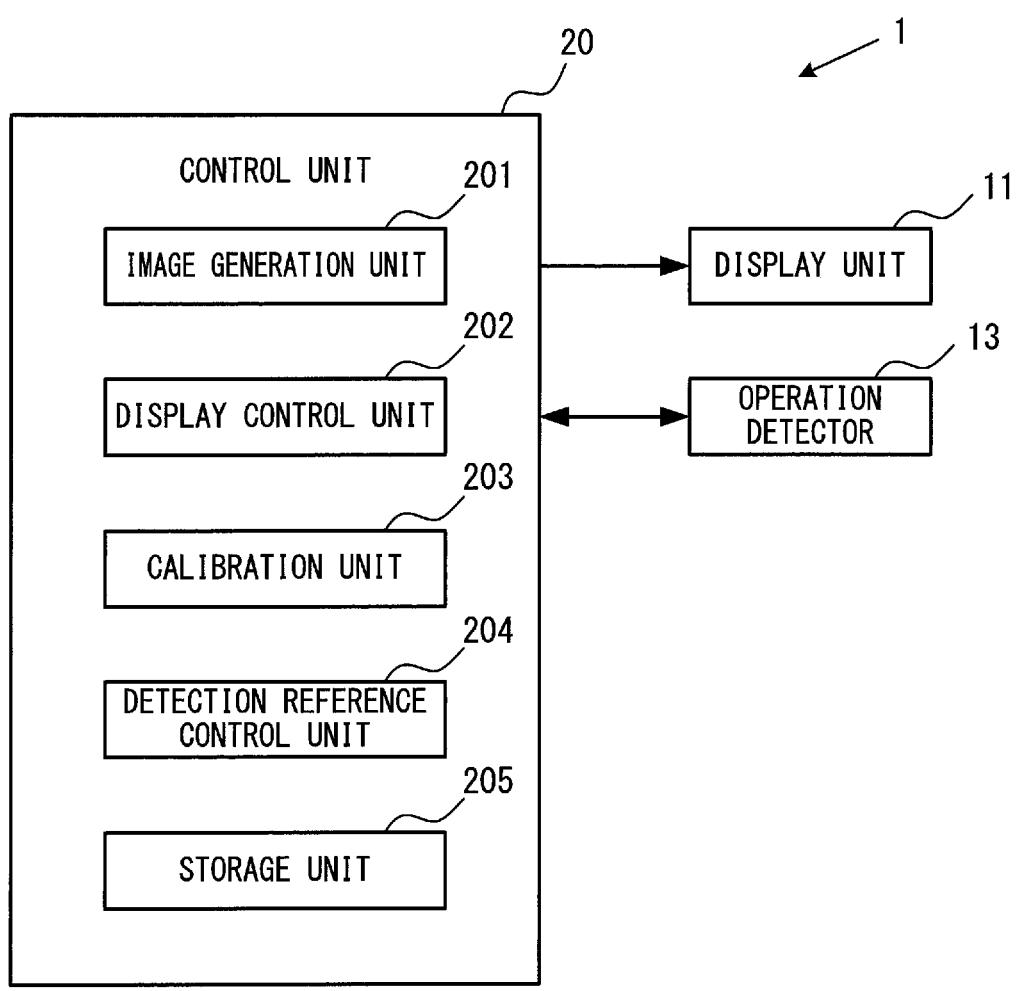
FIG. 2 A block diagram showing the essential configuration of the display device in the first embodiment FIG. 3 A schematic presentation of a midair image displayed in the first embodiment in a plan view in (a) and in sectional views, each indicating the relationship among the operation detector, the midair image and the detection reference, in (b) and (c)

FIG. 2 is a block diagram showing the control unit 20, and the display unit 11 and the operation detector 13 controlled by the control unit 20, among the components configuring the display device 1. The control unit 20, comprising a CPU, a ROM, a RAM and the like, includes an arithmetic operation circuit that controls various structural elements of the display device 1, including the display unit 11 and the operation detector 13, based upon a control program and executes various types of data processing. The control unit 20 includes an image generation unit 201, a display control unit 202, a calibration unit 203, a detection reference control unit 204 and a storage unit 205. The storage unit 205 includes a nonvolatile memory where the control program is stored, a storage medium where image data to be displayed at the display unit 11 and the like are stored, and the like. It is to be noted that the correspondence between the distance from the surface of the operation detector 13 to the fingertip and the electrostatic capacitance manifesting when the operation detector 13 detects the fingertip is stored in advance in the storage unit 205. Accordingly, as the fingertip is positioned within the predetermined detection range of the operation detector 13, the operation detector 13 is able to detect the electrostatic capacitance at the fingertip, and thus detect the position of the fingertip along the Z direction based upon the detected electrostatic capacitance and the correspondence stored in the storage unit 205, as explained earlier.

Based upon image data stored in the storage medium, the image generation unit 201 generates display image data corresponding to a display image to be brought up on display at the display unit 11. The display control unit 202 brings up the image corresponding to the display image data generated by the image generation unit 201 at the display unit 11. In addition, as the user performs an operation at the display position of an icon 30A in the midair image 30, the display control unit 202 executes display image switchover control for the display unit 11 in correspondence to the type of the icon 30A that has been operated. It is to be noted that in response to a user operation performed at the display position of the icon 30A in the midair image 30, the display control unit 202 may execute control other than the display image switchover control for the display unit 11. For instance, assuming that the user performs an operation at the display position of an icon 30A in the midair image 30 while a movie image is on display as the display image at the display unit 11, the display control unit 202 may execute control for playing the movie image currently displayed at the display unit 11 or for stopping the movie playback.

The calibration unit 203 executes calibration processing in first and second calibration processing modes, as will be described in detail later. The detection reference control unit 204 sets a detection plane, i.e., a detection reference, in the space above the display device 1. The detection reference is a first reference used to detect an operation performed by the user with respect to a midair image. More specifically, the detection reference control unit 204 sets the detection reference at the position taken by (or at a position within a predetermined range from) the midair image 30 within the predetermined detection range of the operation detector 13. The detection reference control unit 204 also decides that the user's finger has reached the detection reference based upon an electrostatic capacitance value detected by the operation detector 13. Namely, the detection reference control unit 204 decides that the user has performed an operation at the display position of the icon 30A when the finger position (the position on the X axis, the Y axis and the Z axis) corresponding to the value of the electrostatic capacitance detected by the operation detection unit 13 matches the position of the detection reference having been set. The detection reference control unit 204 sets the detection reference at a predetermined specific initial position. The initial position set for the detection reference is stored in advance in the storage unit 205. It is to be noted that the initial position of the detection reference may be a universal position shared by all users, or a different initial position may be set for each user based upon the history of use of the display device 1 by the particular user. It is to be noted that the detection reference control unit 204 may adjust or correct the position of the detection reference based upon the results of calibration processing to be described later.

Furthermore, the position of the detection reference (its initial position and an adjusted or a corrected reference position) may be set over the entire plane (over the X axis and the Y axis) of the operation detector 13 or may be set over part of the plane. Moreover, the position of the detection reference having been set when the display device 1 was last used, stored in the storage unit 205, may be read out and set as the initial position of the detection reference position. It is to be noted that the detection reference control unit 204 may decide that the user has performed an operation at the display position of the icon 30A when the finger position corresponding to the electrostatic capacitance value detected by the operation detector 13 substantially matches the position of the detection reference, as well as when the finger position exactly matches the position of the detection reference. A specific range over which the finger position is considered to substantially match the position of the detection reference may be set in advance.

FIG. 3(a) presents an example of a midair image 30 that may be displayed by the display device 1 and FIG. 3(b) schematically illustrates the positional relationship among the body 10 or the operation detector 13, the midair image 30 and a detection reference 40. The midair image 30 in FIG. 3(a) includes three icons 30A set over one row by three columns, as explained earlier, and reference lines 310 through 314 used as a depth cue (reference information). Namely, the midair image 30 includes the icons 30A constituting a first portion and the reference lines 310 through 314 constituting a second portion different from the first portion. It is to be noted that the reference lines 310 through 314 used as a depth cue, will be described in detail later. The detection reference 40 in FIG. 3(b) is set by the detection reference control unit 204 in the vicinity of the position taken by the midair image 30, and more specifically, at a position slightly above the midair image 30 in the example presented in the figure. The icons within the midair image 30 are indicated by bold dotted lines 30A in FIG. 3(b). It is to be noted that while the icons 30A, which are part of the midair image 30, take up positions assuming a height matching that of the midair image 30, the bold dotted lines indicating the icons 30A are offset from the solid line indicating the midair image 30 in FIG. 3(b) so as to distinguish the icons 30A.

The following is an explanation of depth cues. An image projected onto the retina of, for instance, a human being, is a two-dimensional planar image. However, human beings and the like are capable of perceiving a three-dimensional world by using various cues to perceive depth in real space. Depth perception cues can be classified into two primary categories; monocular depth cues and binocular depth cues. A monocular depth cue, which will be described in further detail later, is a cue used by a human being or the like to ascertain the depthwise position of a target object such as the size of another object apart from the target object (target), an overlap of different objects, or a reference line such as those mentioned earlier drawn by using the laws of perspective. Binocular depth cues include binocular parallax. Binocular parallax will be explained as follows. When a single target is viewed with both eyes, images of the target are projected with a slight offset onto the retinas of the left and right eyes. Binocular parallax is the term used to refer to this offset. Human beings and the like perceive the depthwise position of the target based upon the extent of the offset.

A human being or the like ascertains the depthwise position of a target by using depth cues, examples of which are listed above. In other words, as the target itself is altered or depth cues are altered, a human being or the like senses that the target is located at a depthwise position different from the actual position. In the method explained below, the target (e.g., an icon 30A) is changed relative to a monocular depth cue (e.g., the reference lines 310 through 314) so as to cause the user to perceive that the depthwise position of the target (the icon 30A) has changed.

In FIG. 3(b), the midair image 30 is formed above the operation detector 13 in the display device 1, at a position set apart from the operation detector 13 by a distance H1, whereas the detection reference 40 is set at a position further upward relative to the operation detector 13, set apart from the operation detector 13 by a distance H2 (H1<H2). As explained earlier, the operation detector 13 has an electrostatic capacitance detection range 13A set above its surface. In FIG. 3(b), the electrostatic capacitance detection limit above the operation detector 13 is indicated with a dotted line 13a, and the interval between the electrostatic capacitance detection limit 13a and the operation detector 13 is indicated as an electrostatic capacitance detection range 13A. The midair image 30 and the detection reference 40 are set so as to take positions within the electrostatic capacitance detection range 13A. It is to be noted that while the detection reference 40 in FIG. 3(b) is set above the midair image 30, it may instead be set further downward relative to the midair image 30 or may be set to exactly match the position of the midair image 30, as long as it takes a position within the electrostatic capacitance detection range 13A of the operation detector 13. A range outside the area set for the detection reference 40 within the detection range 13A will hereafter be referred to as a detection reference outside range 41.

Figure 3:
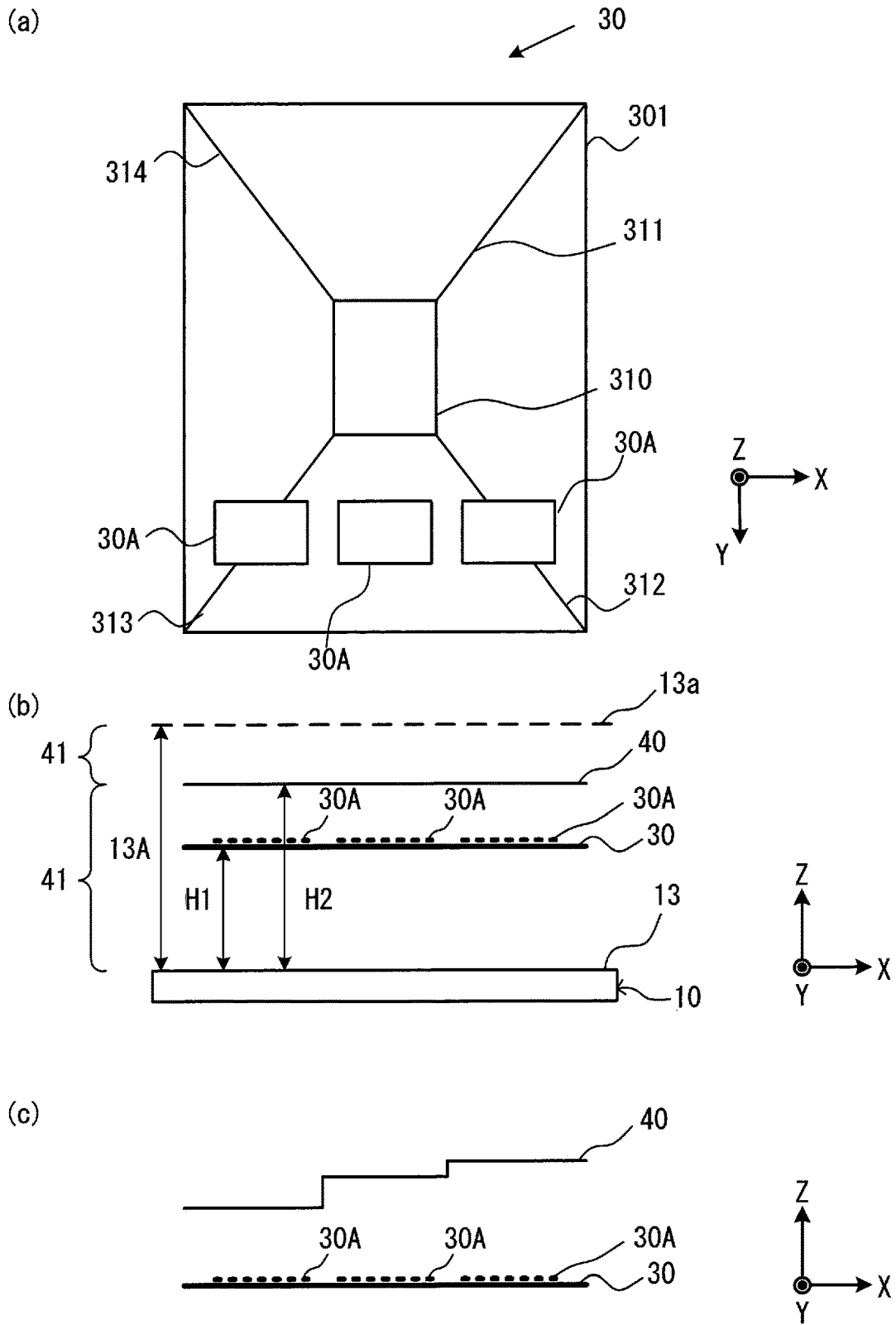

It is to be noted that the detection reference control unit 204 may adjust the position of the detection reference 40 described above by allowing it to move along the Z direction within the detection range 13A. For instance, the detection reference control unit 204 may move the detection reference 40, set as shown in FIG. 3(b), toward the + side or the − side along the Z direction based upon the results of calibration processing executed as will be described later. While the midair image 30 and the detection reference 40 are shown in FIG. 3(b) as flat planes ranging parallel to the XY plane, they do not need to be flat planes but instead may be curved planes. In addition, the detection reference 40 may include stages, each corresponding to one of the icons 30A, as indicated in FIG. 3(c), instead of being formed as a flat plane. In other words, the distance between a given icon 30A and the part of the detection reference 40 corresponding to the particular icon may be different from the distance between another icon 30A and the part of the detection reference 40 corresponding to the other icon. Forming stages in the detection reference 40, as described above, is particularly effective when the midair image 30 is a stereoscopic image and the positions of the plurality of icons 30A are offset relative to one another along the Z direction, i.e., along the up/down direction. For instance, the positions of detection references 40, each corresponding to one of the icons 30A, may be offset in correspondence to the offset with which the plurality of icons 30A in the stereoscopic midair image 30 are shifted along the up/down direction. Through these measures, it is ensured that the distances between the icons 30A and the corresponding detection references 40 remain constant. In addition, the position of a detection reference 40 among the detection references 40 each set in correspondence to one of the plurality of icons 30A shown in FIG. 3(c), may be adjusted by moving it independently. Namely, when calibration processing has been executed based upon an operation performed for the icon 30A located at the left end in the drawing sheet on which FIG. 3 is presented, the detection reference control unit 204 may move the position of the detection reference 40 set in correspondence to the icon 30A at the left end of the drawing along the Z direction. At this time, the detection reference control unit 204 does not change the Z-direction positions of the detection references 40 set in correspondence to the other icons 30A (the icons 30A at the center and at the right end in the drawing in FIG. 3(c)).

When the user's fingertip has reached a point set apart from the operation detector 13 by the distance H2, the operation detector 13 outputs a detection output corresponding to the distance H2. Based upon the detection output provided by the operation detector 13, the detection reference control unit 204 decides that the user's fingertip position has matched the detection reference 40 and accordingly decides that the user has performed an operation with his fingertip at the display position of an icon 30A. Through this process, the display device 1 detects a user operation performed at the display position of the particular icon 30A in the midair image 30 and executes a function corresponding to the icon 30A having been operated. For instance, it executes display image switchover at the display unit 11.

The icons 30A take positions set apart from the operation detector 13 by the distance H1. The icons 30A are displayed as part of the midair image 30 and for this reason, the visual perception of the display positions of the icons 30A in the midair image 30, i.e., their height H1, of one user may be different from that of another user. In addition, the visual perception of the display positions of the icons 30A of a given user may change depending upon the environment in which he operates the display device 1. For instance, when the detection reference 40 is set so as to align with the position of the midair image 30, a user may move his finger toward an icon 30A in the midair image 30 in order to perform an operation at the display position of the particular icon 30A. In this situation, the user may feel that there is still some distance between his finger and the icon 30A although the finger has, in fact, reached the icon, i.e., the detection reference 40. Under such circumstances, an unintended icon operation will be executed. Another user may move his finger toward an icon 30A in the midair image 30 in order to perform an icon operation, and may feel that his finger has reached the icon 30A and he is therefore, performing an operation at the display position of the icon 30A, though his finger is actually still set apart from the icon 30A, i.e., the detection reference 40. In this case, no icon operation will be executed, contrary to the user's intention. In either scenario, the user is bound to feel that the response to his efforts at icon operation is poor.

In addition to a midair image operation mode that may be set when performing operations for the midair image 30, as described above, a calibration processing mode can be set in the display device 1 in the embodiment, so as to reduce the above-described feeling something wrong with the response to icon operations. The display device 1 set in the calibration processing mode adjusts the display mode for the midair image 30 without altering the positional relationship between the midair image 30 and the detection reference 40 so as to create a user perception as if the display position of the midair image 30 has moved along the Z direction (depthwise direction), i.e., the direction in which the optical axis of the image-forming optical system 12 extends. As will be described in detail later, the display device 1 in the embodiment alters the depthwise position of the display of the midair image 30 by using a monocular depth cue. Namely, the display device 1 set in the calibration processing mode adjusts the display of the midair image 30 relative to a depth cue, (e.g., the reference lines 310 through 314 to be explained later) used as a second reference based upon the positional relationship between the detection reference 40 used as a first reference and the user operation position. In other words, the display device 1 executes display control, under which the display mode for the midair image 30 is altered relative to the depth cue used as reference information, based upon the positional relationship ascertained via the operation detector 13. The depth cue used as the second reference is a midair display different from the icons 30A. Through these measures, the display device 1 allows the user to alter the depthwise position at which he performs an icon operation so as to ensure that icon operations performed by the user will be detected at the position of the detection reference 40. The following is a detailed description of the calibration processing mode. It is to be noted that a display device 1 such as that shown in FIG. 1(c) adjusts the display mode for the midair image 30 so as to create a user perception as if the display position of the midair image 30 has moved along the Y direction. Namely, the apparent direction of movement of the midair image 30 as perceived by the user may be described as follows. The display mode for the midair image 30 is adjusted so as to create a user perception as if the midair image 30 has moved closer to the image-forming optical system 12 or has moved further away from the image-forming optical system 12.

As explained earlier, first and second calibration processing modes are available in the display device 1 in the embodiment. In the first calibration processing mode, calibration processing is executed while the midair image operation mode is not in effect, i.e., while midair image operation mode execution is not underway. In the second calibration processing mode, calibration processing is executed while the midair image operation mode execution, following startup of the display device 1, is underway. The processing in the first and second calibration processing modes is executed by the calibration unit 203 shown in FIG. 2.

The first or second calibration processing mode may be selected by the user via a calibration processing mode selector operation button (not shown) located at the display device 1. The control unit 20 may select and execute the midair image operation mode if neither the first calibration processing mode nor the second calibration processing mode has been selected via the calibration processing mode selector operation button. In addition, if the display device 1 does not have a calibration processing mode selector operation button, the second calibration processing mode may be a default mode. The first calibration processing mode and the second calibration processing mode will now be described in that order. It is to be noted that the first or second calibration processing mode may be selected via an icon in the midair image instead of via an operation button.

The first calibration processing mode will be explained first. As the display device 1 is started up, the user may operate the calibration processing mode selector operation button to select the first calibration processing mode. The calibration unit 203 in FIG. 2 starts the first calibration processing mode once the first calibration processing mode has been selected in response to the user operation. The image generation unit 201 generates display image data, and the display unit 11 brings up a display image to be used in calibration processing based upon the display image data.

FIG. 4(a) is a schematic illustration presenting an example of a display image provided as a midair image 300 to be used in the calibration processing. The midair image 300 has a rectangular outline and includes a calibration icon 300A and reference lines 310 through 314 used as a monocular depth cue. The image generation unit 201 displays a message "Touch this icon for calibration", superimposed on the calibration icon 300A. It is to be noted that the image generation unit 201 does not necessarily have to display the message "Touch this icon for calibration" to start calibration processing. For instance, the user, having selected the calibration processing mode, may already be cognizant of a specific operation to be performed in the calibration processing mode and in such a case, the image generation unit 201 does not display the message.

The image generation unit 201 displays the reference lines 310 through 314, set in the form of a perspective. A perspective is drawn in conformance to the laws of perspective in order to produce a three-dimensional space in a two-dimensional plane, and expresses distances with a plurality of straight lines. In the example presented in FIG. 4, straight reference lines 311 through 314 are set so as to run from the four vertices of a rectangular outline 301 of the midair image 300 toward the center of the rectangle and a reference line 310 defining a rectangle smaller than the outline 301 is set near the center. Namely, a pair of reference lines 311 and 313 constitute part of one of the diagonals of the rectangular outline 301 and a pair of reference lines 312 and 314 constitute part of the other diagonal of the rectangular outline 301, with the point at which these diagonals intersect each other corresponding to the center of the rectangular outline 301.

Figure 4:
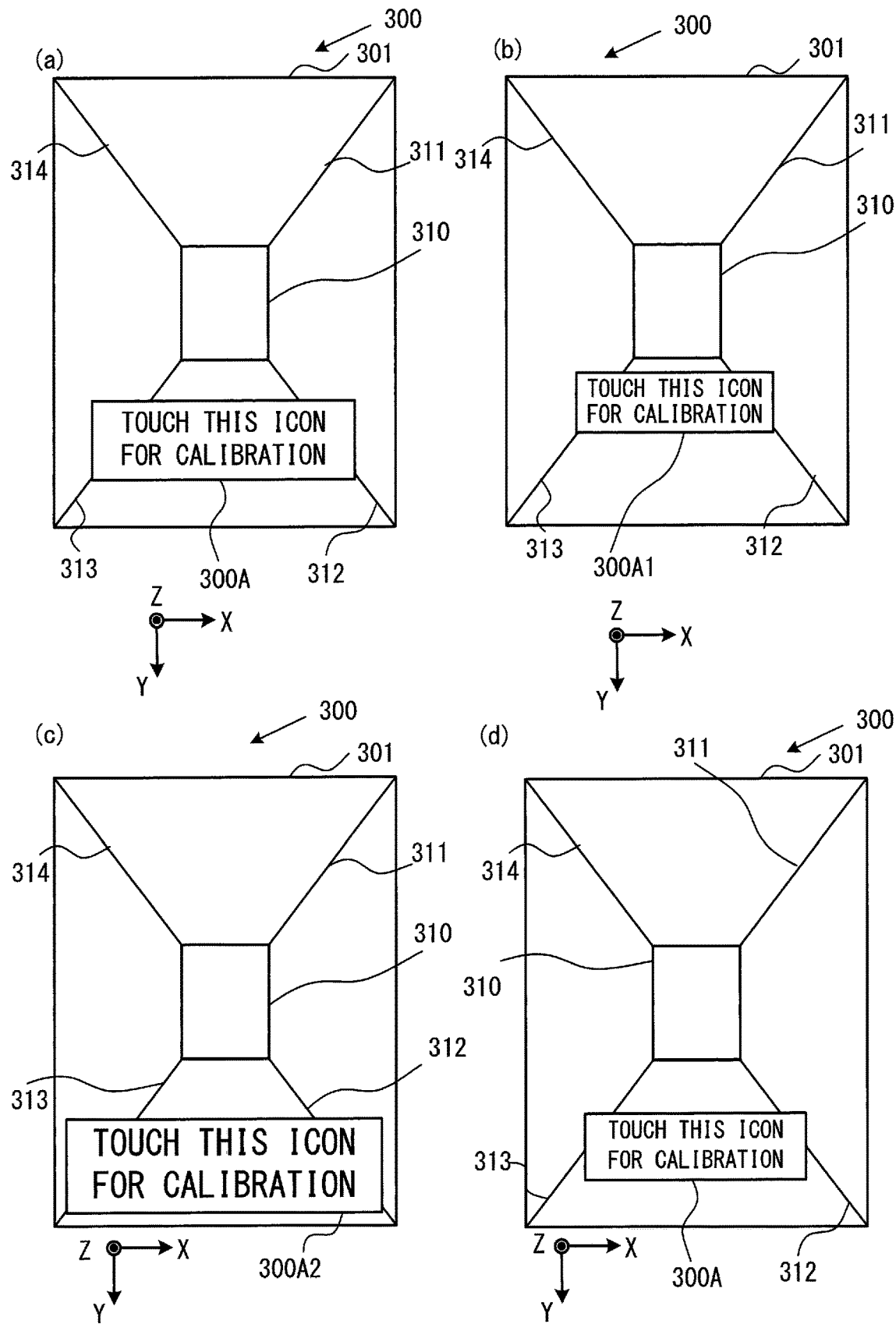
FIG. 4 A schematic presentation of a midair image displayed for purposes of calibration processing in the first embodiment in illustrations indicating the relationship between display mode adjustment and depth perception FIG. 5 Illustrations indicating the relationship between the display mode adjustment and depth perception in the first embodiment FIG. 6 Illustrations each indicating the relationship between display mode adjustment and depth perception in the first embodiment FIG. 7 Illustrations of the calibration processing executed in the first embodiment in sectional views, each indicating the relationship among the operation detector, the midair image, the detection reference and the finger position in (a), (b), (c) and (d)

While the reference line 310 defines a rectangle similar to the shape defined by the outline 301 in the example presented in FIG. 4, they do not need to be similar to each other. In addition, the reference line 310 does not need to define a rectangle and may instead define a circle or another polygonal shape. Furthermore, there may be no reference line 310. The reference lines 311 through 314 are straight lines connecting vertices of the shape defined by the reference line 310 and the vertices of the outline 301 of the midair image 300. In a perspective drawing that includes such reference lines 310 through 314, the vanishing point (faraway point) at which parallel lines meet each other in the laws of perspective is located near the center of the midair image 300. Accordingly, a user looking at such a midair image 300 experiences a visual effect whereby a point moving away from the outline 301 and moving closer to the vanishing point, i.e., the rectangular reference line 310 set in the vicinity of the center, appears further away from the user. It is to be noted that while the example presented in FIG. 4 includes a single vanishing point, the present invention is not limited to this example and it may be adopted in conjunction with a perspective drawing having a plurality of vanishing points. In addition, while the reference lines 311 through 314 intersect at the vanishing point in the example presented in the FIG. 4, the reference lines 311 through 314 do not necessarily need to meet at a vanishing point.

The image generation unit 201 adjusts the display mode for the icon 300A on the perspective drawing that includes the reference lines 310 through 314 drawn as described above. In more specific terms, the image generation unit 201 alters the size and the display position of the icon 300A. As the size of the icon 300A is reduced and its display position is altered along a direction running toward the vanishing point, the user experiences a perception as if the icon 300A has moved further away from the user. As the size of the icon 300A is increased and its display position is altered along a direction running away from the vanishing point, the user experiences a perception as if the icon 300A has moved closer to the user. Thus, the reference lines 310 through 314 function as a monocular depth cue with respect to the icon 300A.

It is to be noted that the image generation unit 201 may adjust only either the size or the display position of the icon 300A.

In reference to FIG. 4(a) through FIG. 4(c), the display mode for the icon 300A and the depth perceived by the user will be explained. In FIG. 4(a) through FIG. 4(c), the icon 300A is displayed toward the Y direction − side relative to the reference line 310 inside the outline 301. In the initial display provided prior to the calibration processing, the icon 300A is displayed in the size and at the position shown in FIG. 4(a). In the example presented in FIG. 4(b), the display position of an icon 300A1 is altered along a direction toward the Y direction + side and the size of the icon 300A1 is reduced relative to those in the initial display shown in FIG. 4(a). Namely, the display position of the icon 300A1 in FIG. 4(b) is moved closer to the reference line 310 along the reference lines 312 and 313 and the size of the icon 300A1 is reduced based upon the extent by which the display position has changed along the reference lines 312 and 313, i.e., based upon the extent by which the display position has moved, in comparison to those of the icon 300A in the initial display. As the display mode for the icon 300A in the initial display shown in FIG. 4(a) is adjusted to that in FIG. 4(d), the user experiences a perception as if the icon 300A has moved further away from the user (toward the Z direction − side) based upon its positional relationship to the reference lines 310 through 314.

In addition, the example presented in FIG. 4(c), the display position of an icon 300A2 is altered along a direction toward the Y direction − side and the size of the icon 300A2 is increased relative to those in the initial display shown in FIG. 4(a). Namely, the display position of the icon 300A2 in FIG. 4(c) is altered along a direction opposite that running toward the reference line 310, i.e., further away from the reference line 310, along the reference lines 312 and 313. Furthermore, the size of the icon 300A2 is increased based upon the extent by which the display position has changed along the reference lines 312 and 313. As the display mode for the icon 300A in the initial display shown in FIG. 4(a) is adjusted to that in FIG. 4(c), the user experiences a perception as if the icon 300A2 has moved closer to the user (toward the Z direction + side) based upon its positional relationship to the reference lines 310 through 314.

Figure 5:
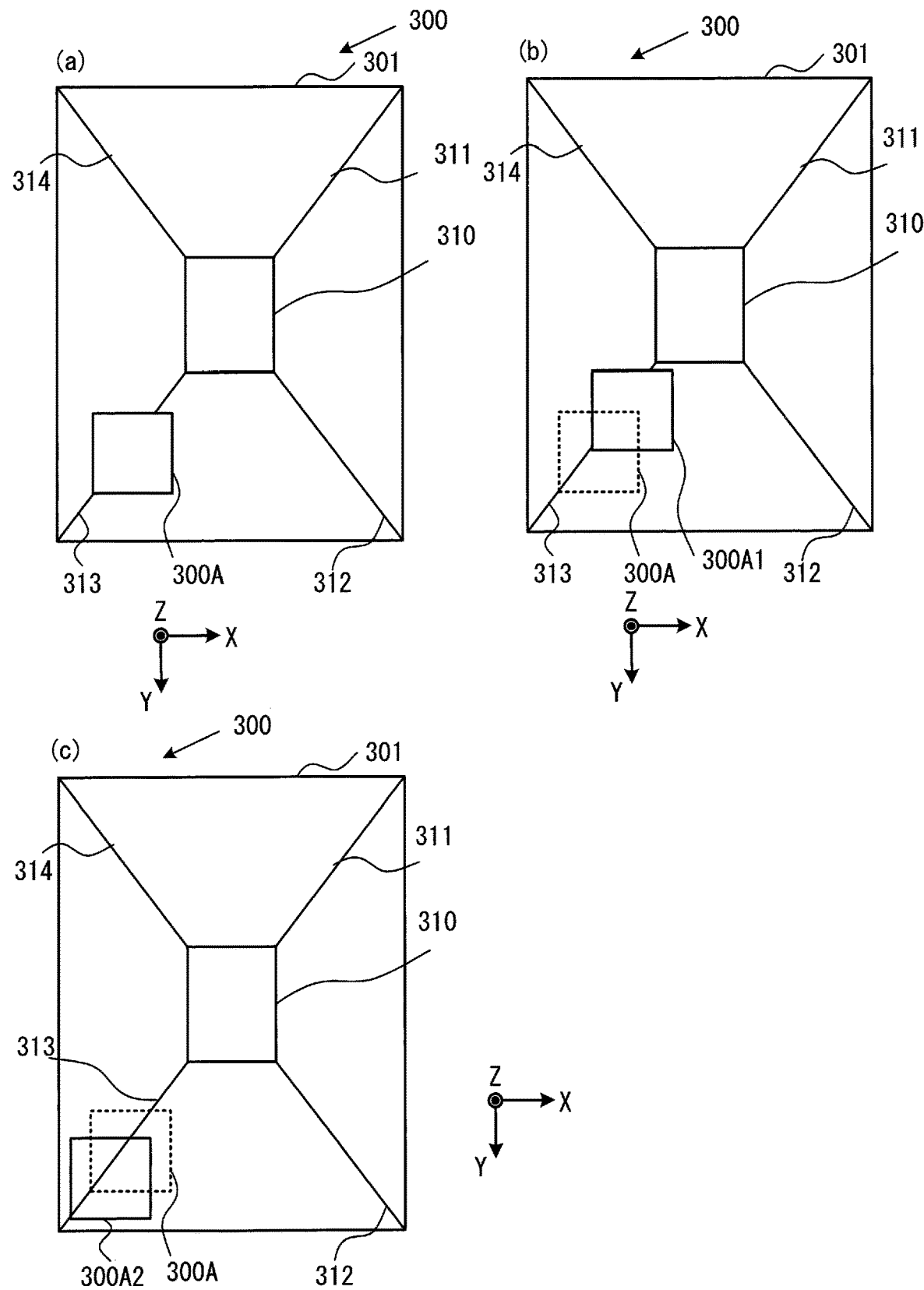

FIG. 5 presents another example of a perception effect on the user achieved by altering the display position of an icon 300A. The size of the icon 300A in a midair image 300 in the initial state shown in FIG. 5 is smaller than the size of the icon 300A in FIG. 4. It is to be noted that FIG. 5 does not include a message superimposed on the icon 300A. While FIG. 5(a) shows the icon 300A in an initial display, FIG. 5(b) shows display of an icon 300A1 after the display mode is adjusted so as to create a user perception as if it has moved further away from the user. It is to be noted that while FIG. 5(b) includes a dotted line indicating the icon 300A in the initial display in order to facilitate the explanation, such a dotted line is not included in the actual display. In the example presented in FIG. 5, the icon 300A in the initial display in FIG. 5(a) takes a position on the reference line 313 extending toward the vanishing point. While the icon 300A1 in FIG. 5(b) assumes a size matching that of the icon 300A in the initial display and takes a position on the reference line 313, it has moved closer to the reference line 310 or the vanishing point relative to the icon 300A in the initial display. As a result, the user experiences a perception as if the icon 300A1 has moved further away from the user in comparison to the icon 300A in the initial display.

FIG. 5(c) shows display of an icon 300A2 after the display mode is adjusted so as to create a user perception as if it has moved closer to the user. It is to be noted that while FIG. 5(c) includes a dotted line indicating the icon 300A in the initial display in order to facilitate the explanation, such a dotted line is not included in the actual display. While the icon 300A2 in FIG. 5(c) assumes a size matching that of the icon 300A in the initial display and takes a position on the reference line 313, it has moved further away from the reference line 310 or the vanishing point relative to the icon 300A in the initial display. As a result, the user experiences a perception as if the icon 300A2 has moved closer to the user in comparison to the icon 300A in the initial display.

It is to be noted that the midair image 300, which includes the icon 300A, 300A1 or 300A2, as shown in FIGS. 5(a) through 5(b) is displayed based upon display image data generated by the image generation unit 201.

While the icon 300A, 300A1 or 300A2 in FIG. 5 moves on the reference line 313 extending toward the vanishing point, it will be obvious that it may instead move on any of the other reference lines 311, 312 and 314 extending toward the vanishing point. Furthermore, the icon 300A, 300A1 or 300A2 does not need to take a position on a reference line among the reference lines 311 through 314, and instead it may take a position near one of the reference lines 311 through 314. An icon 300A1 or 300A2 taking a position near a reference line among the reference lines 311 through 314 will move along the nearby reference line among the reference lines 311 through 314 relative to the icon 300A in the initial display, i.e., along a direction running parallel to the nearby reference line.

As described above, as the display position of the icon 300A is altered so as to move closer to the vanishing point along a reference line while its size remains unchanged, the user experiences a perception as if the icon 300A has moved further away from the user. As the display position of the icon 300A is altered so as to move away from the vanishing point along a reference line while its size remains unchanged, the user experiences a perception as if the icon 300A has moved closer to the user. In this instance, the reference lines 310 through 314 function as a monocular depth cue with respect to the icon 300A. It will be obvious that the size of the icon 300A may also be altered in the example presented in FIG. 5, in the same way as it is altered in the example presented in FIG. 4. Namely, the size of the icon 300A1 in FIG. 5(b) may be reduced relative to the size of the icon 300A in the initial display and the size of the icon 300A2 in FIG. 5(c) may be increased relative to the size of the icon 300A in the initial display.

In addition, the icon 300A, 300A1 or 300A2 may take a position between two reference lines instead of a position on or near a reference line among the reference lines 311 through 314.

Figure 6:
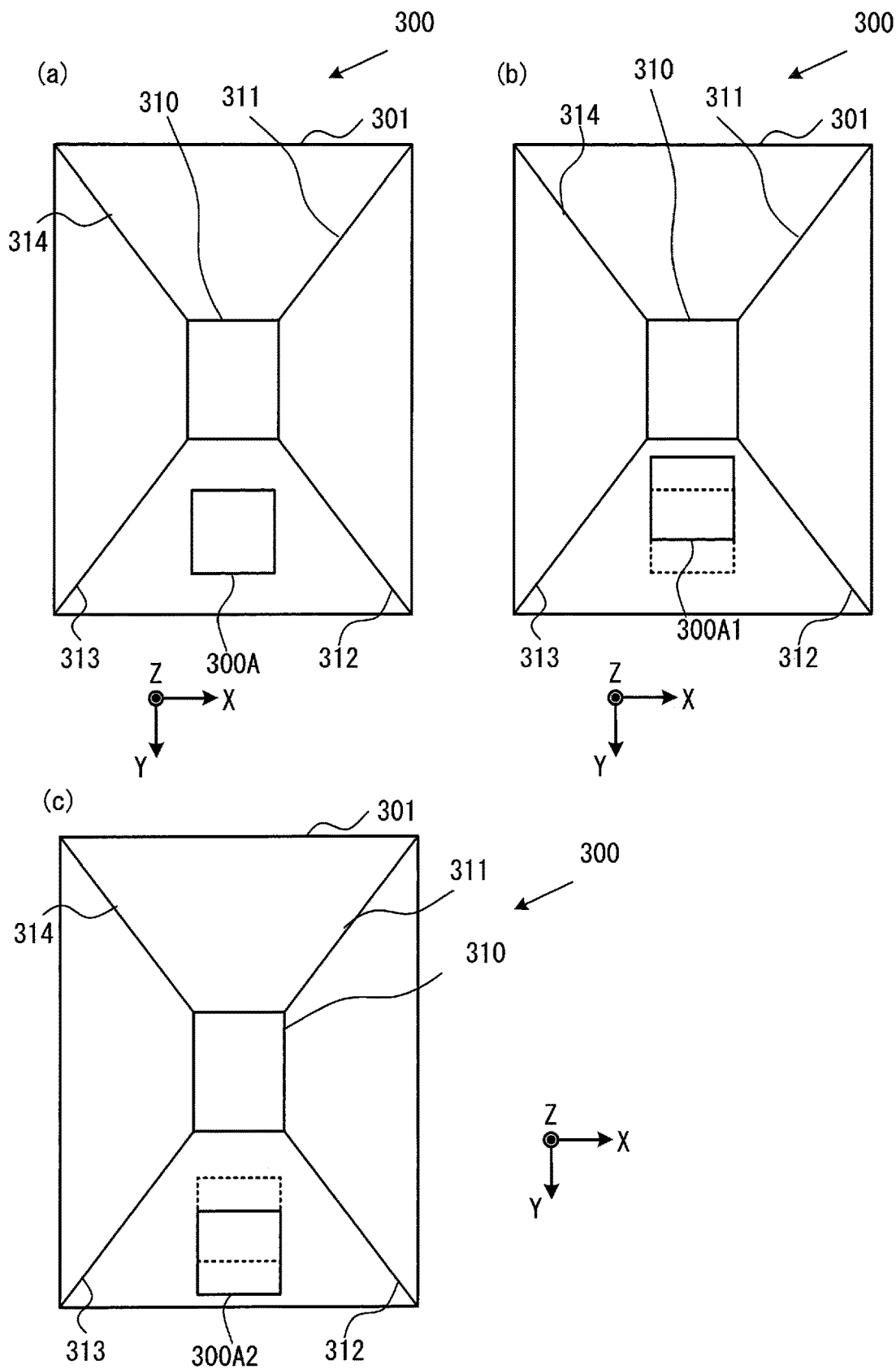

FIGS. 6(a) through 6(c) present an example in which an icon 300A, 300A1 or 300A2 takes a position between two reference lines 312 and 313. It is to be noted that FIG. 6 does not include a message superimposed on the icon 300A. While FIG. 6(a) shows the icon 300A in an initial display brought up at an intermediate position between the reference lines 312 and 313, FIG. 6(b) shows display of the icon 300A1 after the display mode is adjusted so as to create a user perception as if it has moved further away from the user. It is to be noted that while FIG. 6(b) includes a dotted line indicating the icon 300A in the initial display in order to facilitate the explanation, such a dotted line is not included in the actual display. While the icon 300A1 in FIG. 6(b) assumes a size matching that of the icon 300A in the initial display and takes a position between the reference lines 312 and 313, it has moved closer to the vanishing point relative to the icon 300A in the initial display. As a result, the user experiences a perception as if the icon 300A1 has moved further away from the user in comparison to the icon 300A in the initial display.

FIG. 6(c) shows display of the icon 300A2 after the display mode is adjusted so as to create a user perception as if it has moved closer to the user. It is to be noted that while FIG. 6(c) includes a dotted line indicating the icon 300 in the initial display in order to facilitate the explanation, such a dotted line is not included in the actual display. While the icon 300A2 in FIG. 6(c) assumes a size matching that of the icon 300A in the initial display and takes a position between the reference lines 312 and 313, it has moved further away from the vanishing point relative to the icon 300A in the initial display. As a result, the user experiences a perception as if the icon 300A2 has moved closer to the user, in comparison to the icon 300A in the initial display.

The icons 300A, 300A1 and 300A2 may each take a position between the reference lines 311 and 312, between the reference lines 313 and 314 or between the reference lines 311 and 314, instead.

In the example described above, the display position of the icon 300A set between two reference lines is altered along a direction toward the vanishing point or along a direction away from the vanishing point while its size remains unchanged. In this case, the user experiences a perception as if the icon 300A has moved further away from the user or has moved closer to the user.

It will be obvious that the size of the icon 300A may be altered in the example presented in FIG. 6, in much the same way as it is in the example presented in FIG. 4. Namely, the size of the icon 300A1 in FIG. 6(b) may be reduced relative to the size of the icon 300A2 in the initial display and the size of the icon 300A2 in FIG. 6(c) may be increased relative to the icon 300A in the initial display.

Figure 7:
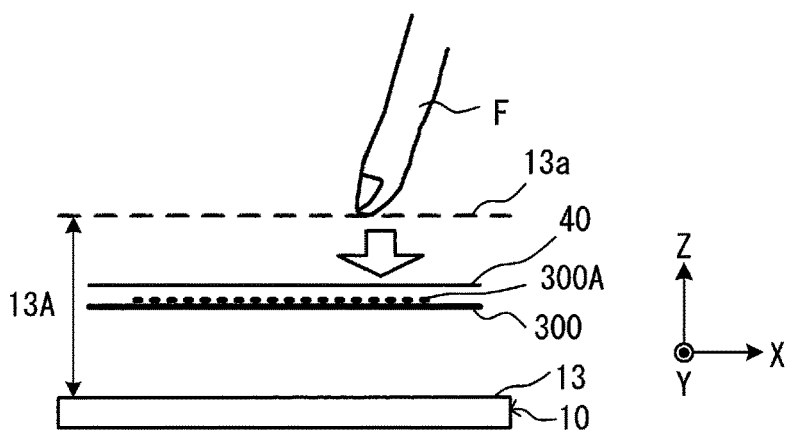
Figure 7:
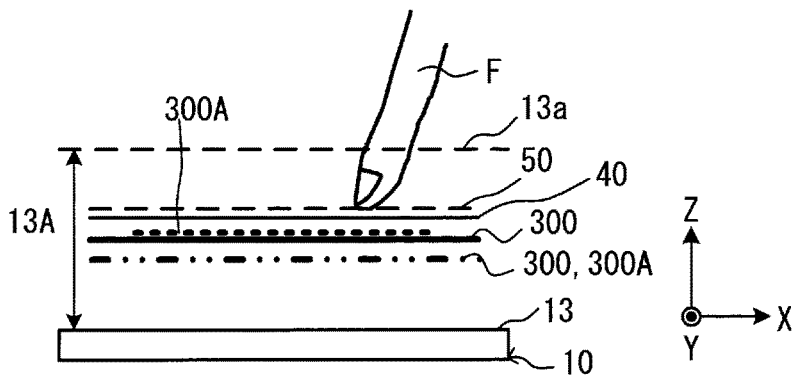
Figure 7:
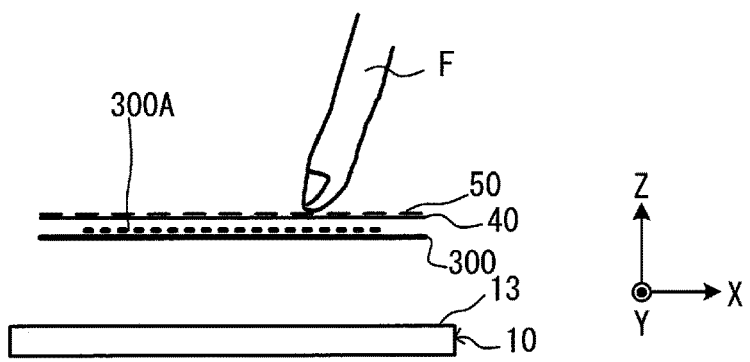
Figure 7:
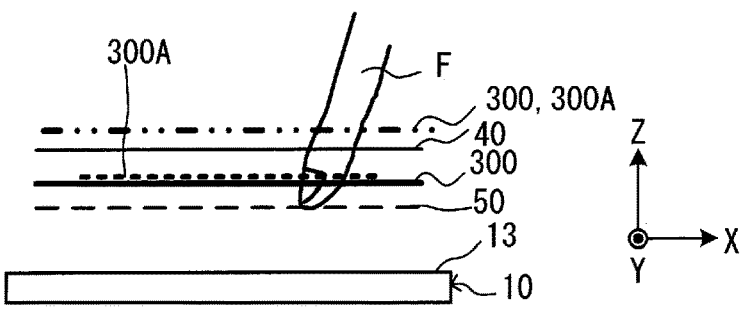

In reference to FIGS. 4 through 7, the position of the user's finger relative to the midair image 300 and the display mode for the midair image 300, assumed during the calibration processing, will be explained. FIG. 7 presents sectional views, each schematically illustrating the relationship among the operation detector 13, the midair image 300, the detection reference 40 and the position of a finger F.

The detection reference control unit 204 sets the detection reference 40 at a position near the midair image 300, e.g., slightly above the midair image 300, as indicated in FIG. 7(a). It will be obvious that the detection reference control unit 204 may instead set the detection reference 40 so as to align it with the midair image 300 or may be set it at a position slightly below the midair image 300. In this situation, the image generation unit 201 brings up on display the midair image 300 shown in, for instance, FIG. 4(a), FIG. 5(a) or FIG. 6(a).

The user, following the instructions in the message superimposed on the icon 300A in the midair image 300, moves his fingertip F down toward the icon 300A, as shown in FIG. 7(a). As the fingertip F reaches the electrostatic capacitance detection range 13A of the operation detector 13 shown in FIG. 2, the operation detector 13 detects the movement of the user's fingertip F toward the icon 300A, i.e., the downward movement, as a change in the electrostatic capacitance. At this time, the control unit 20 ascertains the position at which the user operation is being performed in the detection reference outside range 41, detected by the operation detector 13.

FIG. 7(b) shows the fingertip F having moved further down and having reached a position indicated by a dotted line 50 slightly above the detection reference 40. It is assumed that the user feels that his fingertip F has reached the display position of the icon 300A, has performed an operation of pressing down the icon 300A, and will move the fingertip F upward by a predetermined distance. The operation detector 13 detects the downward movement of the fingertip F described above, i.e., the fingertip F pressing down on the icon 300A, and the subsequent upward movement by the predetermined distance as changes in the electrostatic capacitance. Once the operation detector 13 detects the fingertip F pressing down the icon 300A and the subsequent upward movement of the fingertip F by the predetermined distance as described above, the detection reference control unit 204 decides that an operation has been performed at the display position of the icon 300A. It is to be noted that the furthest reach position to which the user's fingertip F moves downward in order to press down the icon 300A for an operation at the display position of the icon 300A before the fingertip F moves upward by the predetermined distance will be referred to as a reach position. Namely, the position indicated by the dotted line 50 will be referred to as the reach position.

If the reach position 50 is located closer to the user (toward the Z direction + side) relative to the detection reference 40, as shown in FIG. 7(b), the operation detector 13 cannot detect the fingertip F of the user at the detection reference 40. In this situation, the reach position 50 must move closer to the midair image 300 (further away from the user), i.e., toward the Z direction − side, compared to the position shown in FIG. 7(b), in order for the user's fingertip F to be detected at the detection reference 40. In this embodiment, the display mode for the icon 300A is adjusted so as to lead the user to move his fingertip F, at the reach position 50, toward the Z direction − side in comparison to the position indicated in FIG. 7(b). Namely, the user is made to experience a perception as if the midair image 300 and the icon 300A are located at the position indicated by the two-point chain line in FIG. 7(b) so as to lead the user to move his fingertip F toward the Z direction − side relative to the position indicated in the figure. During this process, the image generation unit 201 determines the direction along which the display position of the icon 300A is to be altered in the user's perception based upon the positional relationship between the reach position 50 and the detection reference 40. If the reach position 50 is located closer to the Z direction + side relative to the detection reference 40, as shown in FIG. 7(b), the image generation unit 201 determines that the direction along which the display position of the icon 300A is to be altered in the user's perception is toward the Z direction − side. The image generation unit 201 switches the display mode for the icon 300A, currently on display as shown in FIG. 4(a), so that its display position and size change, as shown in FIG. 4(b). Namely, the image generation unit 201 generates display image data that include the icon 300A taking a display position shifted toward the Y direction − side and a reduced size. It is to be noted that if the midair image 300 shown in FIG. 5(a) appears in the initial display, the image generation unit 201 alters the display position of the icon 300A so that it moves closer to the vanishing point on the reference line 313, as does the icon 300A1 in FIG. 5(b). In addition, if the midair image 300 shown in FIG. 6(a) appears in the initial display, the image generation unit 201 alters the display position of the icon 300A so that the display position moves closer to the vanishing point in an area between the reference line 312 and the reference line 313, as does the icon 300A1 in FIG. 6(b). In other words, the image generation unit 201 adjusts the icon 300A constituting the first portion relative to the reference lines 310 through 314 constituting the second portion.

In addition, while the display mode for the icon 300A is adjusted by altering its display position and size in the example presented in FIG. 4(a) and FIG. 4(b) and by altering the display position of the icon 300A in the examples presented in FIGS. 5 and 6, the image generation unit 201 may instead adjust the size of the icon 300A without altering its display position. In such a case, the image generation unit 201 may reduce the size of the icon 300A, as shown in FIG. 4(d). By reducing the size of the icon 300A relative to the reference lines 310 through 314, a user perception is created as if the display position of the icon 300A has moved toward the Z direction − side, as in the example presented in FIG. 4(b).

The image generation unit 201 adjusts the display mode for the icon 300A as described above so that the user experiences a perception as if the display position of the icon 300A has moved along a direction determined based upon an operation performed by the user to press down the icon 300A. It is to be noted that the user performing a press-down operation does not need to move his finger strictly along the Z direction. Even when the user performs a press-down operation at an angle relative to the Z axis, if a Z direction component is included in the direction of the gesture, the control unit 20 may decide that the user has performed a press-down operation. In response, the image generation unit 201 may adjust the display mode for the icon 300A so as to create a user perception as if the display position of the icon 300A has moved along the Z direction, i.e., the direction determined based upon the press-down operation.

It is to be noted that the image generation unit 201 may adjust the display mode for the icon 300A based upon a press-down operation performed by the user so as to create a user perception as if the display position of the icon 300A has moved along a direction matching that of the press-down operation performed by the user, determined based upon the press-down operation.

The image generation unit 201 determines a displacement quantity representing the extent to which the icon 300A is to move and a change quantity representing the extent to which its size is to be altered based upon the amount of offset between the detection reference 40 and the reach position 50, i.e., based upon the distance between them along the Z direction. The correlation among the distance between the detection reference 40 and the reach position 50, the displacement quantity representing the extent to which the icon 300A is to move and the change quantity with respect to the size of the icon 300A is determined in advance based upon the results of testing and the like and is stored as correlation data in the storage unit 205. The image generation unit 201 determines the displacement quantity and the change quantity for the icon 300A by referencing the correlation data and adjusts the display mode for the icon 300A accordingly.

Figure 8:
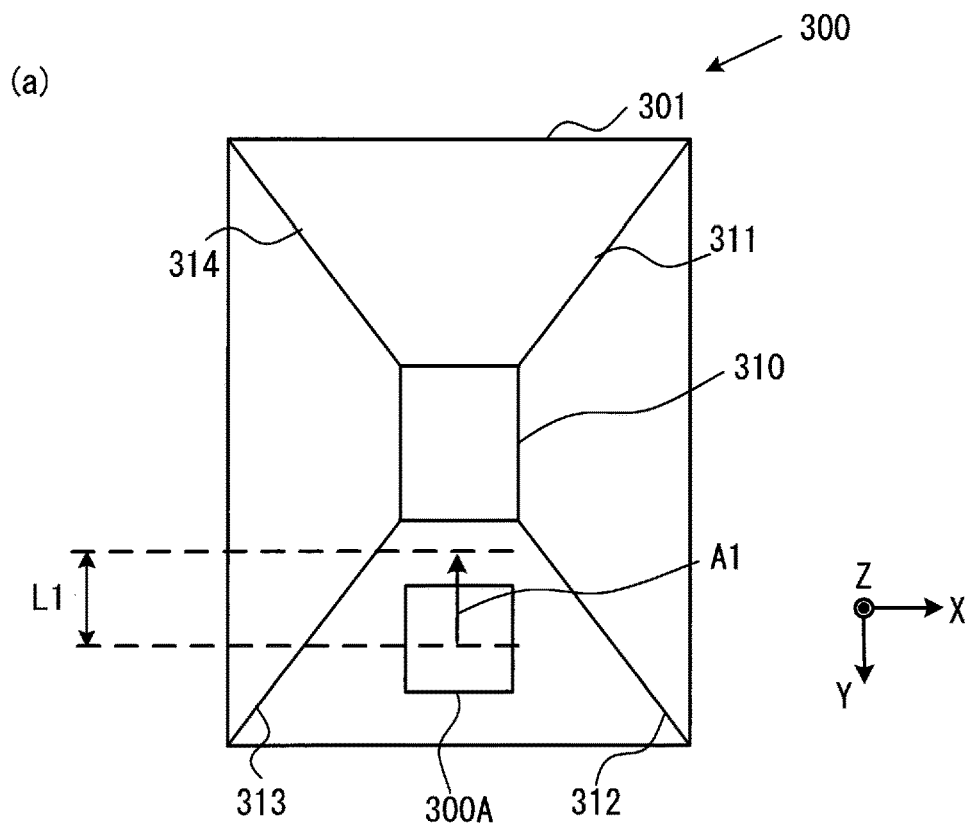
FIG. 8 Schematic illustrations each indicating the extent and direction of displacement of an icon display position occurring during the calibration processing FIG. 9 A schematic presentation of a midair image brought up on display in a midair image operation mode following the calibration processing FIG. 10 A flowchart of the calibration processing executed in a first calibration processing mode in the first embodiment FIG. 11 An illustration indicating the positional relationship among the midair image, the detection reference and the furthest reach position, to which the finger reaches, that may be observed in a second calibration processing mode in the first embodiment FIG. 12 A flowchart of the calibration processing executed in a second calibration processing mode in the first embodiment FIG. 13 Schematic illustrations each showing how the icon display mode may be adjusted in variation 1 of the first embodiment FIG. 14 Schematic illustrations each showing how the icon display mode may be adjusted in variation 1 of the first embodiment FIG. 15 Schematic illustrations each showing how the icon display mode may be adjusted in variation 1 of the first embodiment FIG. 16 A perspective presenting an external view of the display device in variation 2 of the first embodiment FIG. 17 Illustrations each indicating the relationship between a midair image and index marks present at the frame member in the display device as observed in variation 2 of the first embodiment FIG. 18 Illustrations of another display device in variation 2 of the first embodiment, in a perspective showing the external appearance of the display device in (a) and in a block diagram showing the essential configuration of the display device in (b)
Figure 8:
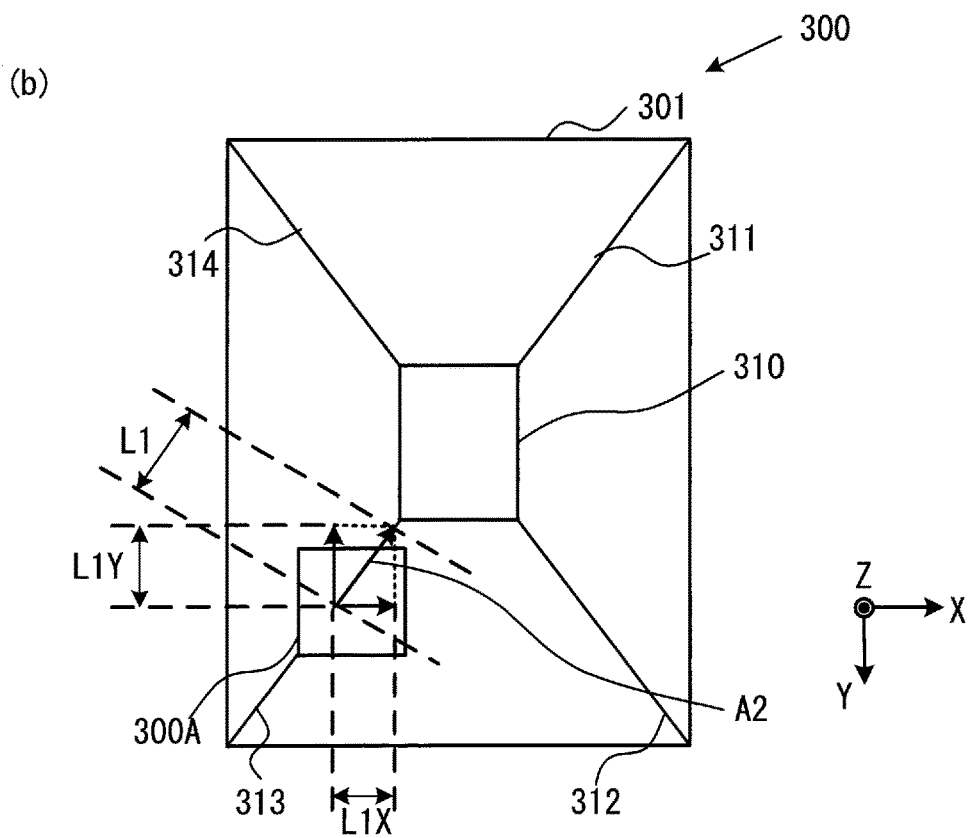

Next, in reference FIG. 8, the displacement quantity and the direction of displacement along which the icon 300A moves will be explained. FIG. 8(a), similar to FIG. 6(a), shows an icon 300A in an initial display at a display position between the reference line 312 and the reference line 313. In this situation, the image generation unit 201, having read out a displacement quantity L1 from the storage unit 205, sets a position shifted by the displacement quantity L1 toward the vanishing point along a direction indicated by an arrow A1, i.e., toward the Y direction − side along the Y axis, as the display position for the icon 300A.

When the icon 300A in the initial display is located between the reference lines 311 and 312, the image generation unit 201 may move the display position of the icon 300A by the displacement quantity L1 toward the X direction − side along the X axis, i.e., toward the vanishing point. When the icon 300A is located between the reference lines 313 and 314, the image generation unit 201 may move the display position of the icon 300A by the displacement quantity L1 toward the X direction + side along the X axis. When the icon 300A is located between the reference lines 311 and 314, the image generation unit 201 may move the display position of the icon 300A by the displacement quantity L1 toward the Y direction + side along the Y axis.

It is to be noted that the displacement quantity and the displacement direction for the icon 300A indicated in FIG. 4(a) are the same as those for the icon 300A described above in reference to FIG. 8(a).

Next, in reference to FIG. 8(b), the displacement quantity and the displacement direction for an icon 300A displayed on the reference line 313 will be explained. FIG. 8(b), similar to FIG. 5(a), shows the icon 300A taking a position on the reference line 313. In this case, the image generation unit 201, having read out a displacement quantity L1 from the storage unit 205, sets a position shifted by the displacement quantity L1 toward the vanishing point along the reference line 313 as indicated by the arrow A2, as the display position for the icon 300A. The image generation unit 201 moves the display position for the icon 300A by a displacement quantity L1X toward the X direction + side and by a displacement quantity L1Y toward the Y direction − side.

It is to be noted that if the icon 300A takes a position on the reference line 311 in the initial display, the image generation unit 201 may move the display position of the icon 300A by the displacement quantity L1 along the reference line 311. If the icon 300A takes a position on the reference line 312 in the initial display, the image generation unit 201 may move the display position of the icon 300A by the displacement quantity L1 along the reference line 312. If the icon 300A takes a position on the reference line 314 in the initial display, the image generation unit 201 may move the display position of the icon 300A by the displacement quantity L1 along the reference line 314 (toward the Y direction + side and the X direction + side).

It is to be noted that when the icon 300A takes a position near a reference line among the reference lines 311, 312, 313 and 314 in the initial display, it is moved by a predetermined displacement quantity along a direction running parallel to the reference line among the reference lines 311, 312, 313 and 314.

In addition, while the display mode is adjusted by moving the icon 300A along a reference line in the description provided above, it is not strictly necessary that the icon 300A be moved along a reference line, as long as the image generation unit 201 moves the icon 300A along a direction other than the direction running perpendicular to the reference line.

The displacement quantities along the X direction and the Y direction determined for the icon 300A as described above are stored into the storage unit 205.

If the adjustment in the display mode for the icon 300A includes a change in its size, as in the example presented in FIG. 4, the image generation unit 201 determines the size of the icon 300A by referencing the correlation data stored in the storage unit 205 and stores the size thus determined as a change quantity into the storage unit 205.

The change quantity with respect to the size of the icon 300A and the displacement quantity with respect to the display position of the icon 300A are determined so that they increase/decrease based upon an increase/decrease in the distance between the reach position 50 and the detection reference 40. The change quantity with respect to the size of the icon 300A and the displacement quantity with respect to the display position of the icon 300A may be determined so that they increase/decrease linearly based upon an increase/decrease in the distance between the reach position 50 and the detection reference 40 or may instead be determined so that they increase/decrease in steps each corresponding to an increase/decrease by a predetermined extent in the distance between the reach position 50 and the detection reference 40. Furthermore, the change quantity with respect to the size of the icon 300A and the displacement quantity with respect to the display position of the icon 300A may be determined so that they are each changed by a predetermined fixed value regardless of the distance between the reach position 50 and the detection reference 40 and, in such a case, the predetermined value may be selected by the user.

The display control unit 202 brings up on display a midair image 300 that includes the icon 300A1 displayed in a display mode adjusted from that for the icon 300A, expressed with the display image data generated by the image generation unit 201 as described above. As a result, the display device 1 is able to create a user perception as if the icon 300A has moved toward the Z direction − side, i.e., away from the user. In other words, the user experiences a perception as if the midair image 300 and the icon 300A, which actually remain unmoved along the Z direction, have moved to the position indicated by the two-point chain line in FIG. 7(b). The user, perceiving as if the icon 300A is now displayed at a position further away from himself, is expected to perform an operation with respect to the icon 300A by positioning his fingertip F further toward the Z direction − side. As a result, the reach position 50 of the user's fingertip F will move further toward the Z direction − side relative to the reach position shown in FIG. 7(b), and the reach position 50 will arrive at the detection reference 40 as indicated in FIG. 7(c). Consequently, the operation detector 13 will be able to detect the user's fingertip F at the detection reference 40 and the control unit 30 will be able to ascertain the user operation position detected at the detection reference 40.

In the example described above, the reach position 50 of the finger is above (toward the Z direction + side) relative to the detection reference 40 and, as a result, the user operation cannot be detected at the detection reference 40. When the reach position 50 is located under (toward the Z direction − side) relative to the detection reference 40 and the user operation thus cannot be detected at the detection reference 40, too, the detection reference control unit 204 determines the reach position 50 and the image generation unit 201 adjusts the display mode for the icon 300A based upon the reach position 50 thus determined, in the same way as that described above. The positional relationship between the reach position 50 and the detection reference 40 under such circumstances is illustrated in FIG. 7(d). In this situation, the reach position 50 must move closer to the user, i.e., closer to the Z direction + side, compared to the position shown in FIG. 7(d), in order for the user's fingertip F to be detected at the detection reference 40. Namely, the user is made to experience a perception as if the midair image 300 and the icon 300A are located at the position indicated by the two-point chain line in FIG. 7(d) so as to lead the user to move his fingertip F toward the Z direction + side relative to the position indicated in the figure. The image generation unit 201 thus determines the direction along which the display position of the icon 300A is to be altered in the user's perception based upon the positional relationship between the reach position 50 and the detection reference 40. If the reach position 50 is located closer to the Z direction − side relative to the detection reference 40, as shown in FIG. 7(d), the image generation unit 201 determines the direction along which the display position of the icon 300A is to be altered in the user's perception toward the Z direction + side. The image generation unit 201 adjusts the display mode for the icon 300A, currently on display as shown in FIG. 4(a), so that its display position and size change, as shown in FIG. 4(c). Namely, the image generation unit 201 moves the display position of the icon 300A toward the Y direction + side and increases the size of the icon 300A. It is to be noted that if the icon 300A shown in FIG. 5(a) or FIG. 6(a) appears in the initial display, the display mode for the icon 300A is adjusted as shown in FIG. 5(c) or FIG. 6(c). In other words, the image generation unit 201 adjusts the icon 300A constituting the first portion relative to the reference lines 310 through 314 constituting the second portion.

In this case, too, the image generation unit 201 determines the extent to which the icon 300A is to move and the extent to which its size is to be altered based upon the amount of offset between the detection reference 40 and the reach position 50, i.e., based upon the distance between them along the Z direction, as in the adjustment of the display mode for the icon 300A1. The image generation unit 201 determines the displacement quantity and the size change quantity for the icon 300A by referencing the correlation data, and generates display image data that include the icon 300A2 with an adjusted display mode. The displacement quantity by which the icon 300A is to move along the X direction and the Y direction and the change quantity indicating the extent to which the size of the icon 300A changes thus determined are stored into the storage unit 205. The display control unit 202 brings up on display a midair image 300 that includes the icon 300A2 displayed in a display mode adjusted from that for the icon 300A expressed with the display image data generated by the image generation unit 201. As a result, the display device 1 is able to create a user perception as if the icon 300A has moved toward the Z direction + side, i.e., closer to the user. The user, perceiving as if the icon 300A is now displayed at a position closer to himself, is expected to perform an operation with respect to the icon 300A by positioning his fingertip F further toward the Z direction + side. Consequently, the reach position 50 of the user's fingertip F will move further toward the Z direction + side relative to the furthest reach position shown in FIG. 7(d), and the reach position 50 will arrive at the detection reference 40 as indicated in FIG. 7(c). As a result, the operation detector 13 will thus be able to detect the user's fingertip F at the detection reference 40.

The image generation unit 201 adjusts the display mode for the icon 300A as described above so as to create a user perception as if the display position of the icon 300A has moved along a direction opposite from the direction determined based upon the press-down operation performed by the user as if to press down on the icon 300A. It is to be noted that the user performing a press-down operation does not need to move his finger strictly along the Z direction. Even when the user performs a press-down operation at an angle relative to the Z axis, as long as a Z direction component is included in the direction of the gesture, the control unit 20 decides that the user has performed a press-down operation. In response, the image generation unit 201 may adjust the display mode for the icon 300A so as to create a user perception as if the display position of the icon 300A has been altered along the Z direction, i.e., a direction determined based upon the press-down operation.

It is to be noted that the image generation unit 201 may adjust the display mode for the icon 300A based upon a press-down operation performed by the user so that a user perception is created as if the display position of the icon 300A has been altered along a direction opposite that of the press-down operation performed by the user, determined based upon the press-down operation.

It is to be noted that when the reach position 50 is at the detection reference 40, too, the detection reference control unit 204 determines the reach position 50 in much the same way as that described above. However, since the reach position 50 is at the detection reference 40, the image generation unit 201 does not adjust the display mode for the icon 300A to create a user perception as if the depthwise position of the icon 300A has changed.

In addition, when the reach position 50 is further downward relative to the detection reference 40, the fingertip F passes through the detection reference 40 before the fingertip F reaches the reach position 50. In this situation, the detection reference control unit 204 decides that the finger has reached the detection reference 40 based upon the detection output provided by the operation detector 13. However, the image generation unit 201 does not switch the display at the display unit 13 in the first calibration processing mode. Likewise, when the reach position 50 is aligned with the detection reference 40, the image generation unit 201 does not switch the display at the display unit 11 either. It will be obvious that when the fingertip F has moved to reach the detection reference 40, the image generation unit 201 may notify the user that the fingertip F has reached the detection reference 40 with, for instance, a highlighted display of the icon 300A by flashing the icon 300A.

While the user presses down on the icon 300A as an operation performed at the display position of the icon 300A in the example described above, the present invention is not limited to this example. Namely, when the operation detector 13 has detected a predetermined non-contact operation performed by the user in relation to the icon 300A, the image generation unit 201 may adjust the display mode for the icon 300A based upon the location where the predetermined non-contact operation was performed, i.e., based upon the position at which the predetermined non-contact operation has been detected by the operation detector 13. The predetermined non-contact operation may be performed by the user by making a gesture as if to touch the icon 300A. In response, the image generation unit 201 may adjust the display mode for the icon 300A based upon the position at which the user has made the gesture of touching the icon 300A. The operation performed by the user making a gesture of touching the icon 300A may be, for instance, a gesture of swiping the icon 300A with the user's hand. In addition, the position at which the user has performed the operation by making a gesture of touching the icon 300A may be determined based upon the position at which the user's hand, having made the swiping gesture, is determined to have become still or based upon the position at which the user has started making the swiping gesture.

In addition, the user may perform the predetermined non-contact operation by moving his finger F downward by a distance L1, then making a U-turn and moving it upward by the distance L1. Namely, the predetermined non-contact operation in this instance follows a U-turn trajectory with the descending distance and the ascending distance matching each other. Furthermore, the predetermined non-contact operation may follow a trajectory in the shape of the letter V instead of a U. Moreover, the predetermined non-contact operation may be performed by first moving the finger F downward by the distance L1 and then moving it back upward by the distance L1 along the descending trajectory. In addition, the descending distance L1 and the ascending distance L1 in the predetermined non-contact operation may be different from each other. Namely, the predetermined non-contact operation simply needs to be performed by moving the finger upward continuously after it has been moved downward.

Furthermore, the user may perform the predetermined non-contact operation by first moving the finger F downward by the distance L1 and then holding the finger F still over a predetermined length of time, or by first moving the finger F downward by the distance L1 and then moving the finger F laterally over at least a predetermined distance L2.

The predetermined non-contact operations that may be performed are not limited to those represented by the various trajectories of the finger F described above and the user may perform a non-contact operation that follows another trajectory as long as the trajectory of movement (the trajectory of the movement of the finger F or a hand) can be detected by the operation detector 13. It is to be noted that an optimal detection position, corresponding to a given predetermined non-contact operation, may be set as the predetermined non-contact operation detection position for the operation detector 13. For instance, when the user performs the predetermined non-contact operation by moving his finger F downward by the distance L1, making a U-turn and moving his finger F upward by the distance L1, the non-contact operation may be detected at the lowermost position at which the U-turn is made. In another example, the predetermined non-contact operation detection position may be set at a point halfway through the distance L1.

It is to be noted that the method through which the reach position 50 is determined by the detection reference control unit 204 is not limited to that described above, in which the reach position 50 is determined based upon the shift from the downward movement to the upward movement by the predetermined distance, and it may be determined through any of the various other methods to be described below. For instance, the user, perceiving that his fingertip F, having reached the display position of the icon 300A, has pressed down on the icon 300A, may stop moving his finger downward, i.e., may stop pressing down the icon. In this case, the detection reference control unit 204 may decide that the finger has stopped pressing down when there is no longer any significant change in the value of the electrostatic capacitance detected by the operation detector 13, and may determine, i.e., confirm, the position at which the finger has stopped pressing down as the reach position 50. It is to be noted that it may decide that the downward movement has stopped when the value of the electrostatic capacitance detected by the operation detector 13 has remained unchanged for a short span of time of, for instance, 0.1 sec through 1 sec. In another method, the detection reference control unit 204 may detect the velocity vector of the movement of the user's finger, i.e., the finger movement velocity and the finger movement direction, based upon a change in the electrostatic capacitance. Namely, based upon a change in the electrostatic capacitance, the detection reference control unit 204 may detect that the direction of the finger velocity vector has changed from the downward direction to the opposite direction and that the velocity vector along the opposite direction has reached a predetermined level and, accordingly, may designate the position taken by the finger when the velocity vector achieving the predetermined level along the opposite direction is detected as the reach position 50. If the predetermined level for the velocity vector is set substantially equal to 0, the position taken by the finger when the direction of the velocity vector shifts from downward to the opposite direction, i.e., the lowermost position, will be determined to be the reach position. If, on the other hand, the predetermined level is set to a value other than 0 in this method, a position taken by the finger, set apart from the lowermost position by a predetermined distance along the upward direction is determined as the reach position 50. As explained above, the reach position 50 is set at the lowermost position taken by the fingertip F as the finger is judged by the detection reference control unit 204 to have performed an operation at the display position of the icon or at a position near the lowermost position.

In addition, the detection reference control unit 204 determines the reach position in reference to the part of the finger or the stylus appearing to come in contact with the icon 300A in the midair image 300, i.e., the position of the fingertip or the position of the lowermost part of the stylus in the example presented above. As an alternative, the detection reference control unit 204 may determine the reach position in reference to the position of the fingernail tip of the user's finger or in reference to the position of the first joint of the finger. Furthermore, the icon may be operated with the user's foot or elbow instead of the user's finger, and in such a case, the detection reference control unit 204 may determine the reach position in reference to the foot or the elbow. When the icon operation is performed via a stylus, a specific position on the stylus may be marked and the detection reference control unit 204 may determine the reach position in reference to the marked position. It is desirable that when the reach position is determined in reference to the position of the first joint of the finger, the position of a mark on the stylus or the like, the operation detector 13 be configured with an image-capturing device or the like, such as that to be described later in reference to variation 9, instead of the capacitive panel.

Furthermore, while the detection reference 40 is a single plane or multiple planes defined in stages in the description provided above, the detection reference 40 may be formed as a zone with a predetermined depth present between an upper plane and a lower plane. In such a case, the lower plane of the detection reference 40 may be set above (toward the Z direction + side) relative to the midair image 30, the upper plane may be set below (toward the Z direction − side) relative to the midair image 30, or the detection reference 40 may be set so that the midair image 30 is positioned between the upper plane and the lower plane. In conjunction with this detection reference, the detection reference control unit 204 is able to make an even more reliable decision regarding the operation performed at the display position. For instance, the user's finger may move downward from a position diagonally above the icon 30A instead of a point directly above the icon 30A. In such a case, if the detection reference 40 is a planar reference such as that shown in FIG. 3, the finger may not pass through the detection reference 40 directly above the icon 30A and instead may pass through an area beside the detection reference 40. Under such circumstances, the detection reference control unit 204 may not be able to make a decision regarding the operation performed by the finger at the display position of the icon 30A. If, on the other hand, the detection reference 40 assumes a predetermined thickness, the detection reference control unit 204 is able to detect the finger entering the detection reference 40 with high reliability even when the finger moves downward from a point diagonally above. Moreover, even when the finger moves parallel to the midair image 30 to perform an operation at the display position of the icon 30A, too, the detection reference control unit 204 is able to detect with high reliability that the finger has entered the detection reference 40 since it has a predetermined thickness.

It is to be noted that if the predetermined non-contact operation is not performed within the detection reference 40 assuming a predetermined thickness as described above, the detection reference control unit 204 makes a decision that the predetermined non-contact operation has not been performed. For instance, the user may perform the predetermined non-contact operation by first moving his finger F downward by a predetermined distance L1, then making a U-turn and moving the finger F upward by the distance L1. However, the user, having moved his finger F downward by the distance L1 within the detection reference 40 may only move the finger F upward over a distance short of the distance L1. In such a case, the detection reference control unit 204 makes a decision that the predetermined non-contact operation has not been performed by the user.

Figure 9:
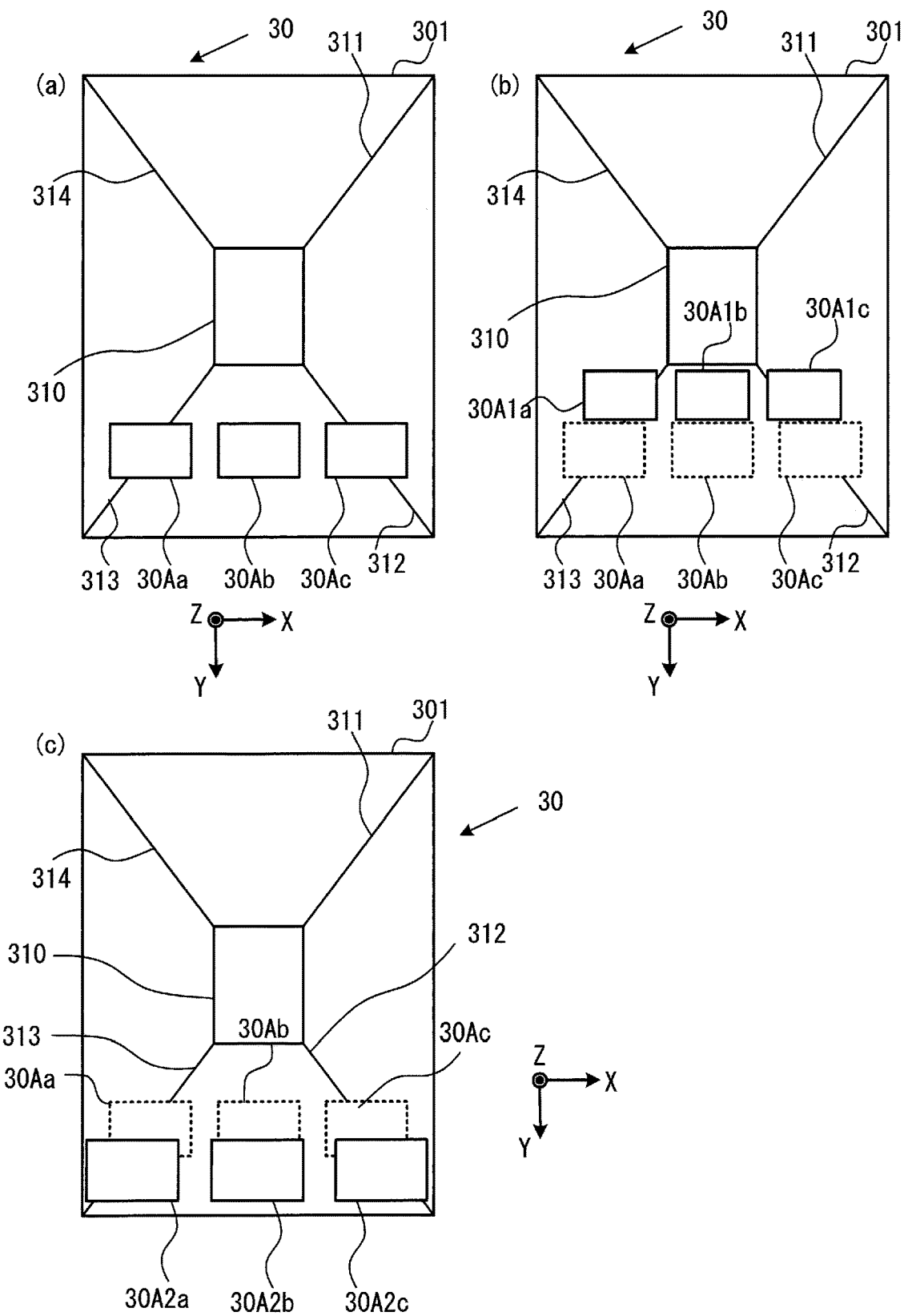

Based upon the results of the calibration processing executed in the first calibration processing mode as described above, the display mode for an icon 30A on display in the midair image operation mode as shown in FIG. 3(*a*) is adjusted. Namely, the image generation unit 201 adjusts the display mode for an icon 30A on display in the midair image operation mode based upon the results of the calibration processing by referencing the displacement quantity and the displacement direction for the icon 300A stored in the storage unit 205 for and the change quantity with respect to the size of the icon 300A. FIG. 9 shows a midair image 30 on display in the midair image operation mode, which reflects the results of the calibration processing executed in the first calibration processing mode, as described above. FIG. 9(a), similar to FIG. 3(a), shows a midair image 30 in the initial display. In FIG. 9(a), the icons 30A disposed over one row by three columns are assigned, starting from the left side in the drawing, with reference signs 30Aa, 30Ab and 30Ac. Namely, a reference line closest to the display position at which the icon 30Aa is displayed is the reference line 313, reference lines closest to the display position at which the icon 30Ab is displayed are the reference lines 312 and 313, and a reference line closest to the display position at which the icon 30 Ac is displayed is the reference line 312.

FIG. 9(b) shows a midair image 30 reflecting the results of calibration processing executed when the reach position 50 is above the detection reference 40 (see FIG. 7(b)). Namely, FIG. 9(b) shows a midair image 30 with the display mode adjusted so that a user perception is created as if the icons 30A have moved further away from the user. It is to be noted that the icons 30A in the initial display are indicated by dotted lines in FIG. 9(b) so as to facilitate the explanation.

Icons 30A1a, 30A1b and 30A1c are respectively displayed by adjusting the display mode for the icons 30Aa, 30Ab and 30Ac in the initial display. The icon 30A1a, smaller than the icon 30Aa, is displayed at a position moved toward the vanishing point along the reference line 313. The icon 30A1b, smaller than the icon 30Ab, is displayed at a position moved toward the vanishing point along the Y axis. The icon 30A1c, smaller than the icon 30Ac, is displayed at a position moved toward the vanishing point along the reference line 312. As a result, the user perceives as if the icons 30A1a, 30A1b and 30A1c have moved further away from the user in relative terms with respect to the reference lines 312 and 313.

FIG. 9(c) shows a midair image 30 reflecting the results of calibration processing executed when the reach position 50 is below the detection reference 40 (see FIG. 7(d)). Namely, FIG. 9(c) shows a midair image 30 with the display mode adjusted so that a user perception is created as if the icons 30A have moved closer to the user. It is to be noted that the icons 30A in the initial display are indicated by dotted lines in FIG. 9(c) so as to facilitate the explanation.

Icons 30A2a, 30A2b and 30A2c are respectively displayed by adjusting the display mode for the icons 30Aa, 30Ab and 30Ac in the initial display. The icon 30A2a, larger than the icon 30Aa, is displayed at a position moved further away from the vanishing point along the reference line 313. The icon 30A2b, larger than the icon 30Ab, is displayed at a position moved further away from the vanishing point along the Y axis. The icon 30A2c, larger than the icon 30Ac, is displayed at a point moved further away from the vanishing point along the reference line 312. As a result, the user perceives that the icons 30A1a, 30A1b and 30A1c have moved closer to the user in relative terms in reference to the reference lines 312 and 313.

Through the process described above, a midair image 30 is displayed by adjusting the display mode for the icons 30A in the midair image operation mode based upon the distance between the user operation position, detected in the first calibration processing mode, and the detection reference 40.

It is to be noted that while the image generation unit 201 adjusts the display mode for all of the plurality of icons 30Aa, 30Ab and 30Ac based upon the results of the calibration processing in the example presented in FIG. 9, the present invention is not limited to this example. The image generation unit 201 may adjust the display mode for at least one of the icons 300A among the plurality of icons 30Aa through 30Ac, or it may individually adjust the display mode for each of the icons 30Aa, 30Ab and 30A.

Figure 10:
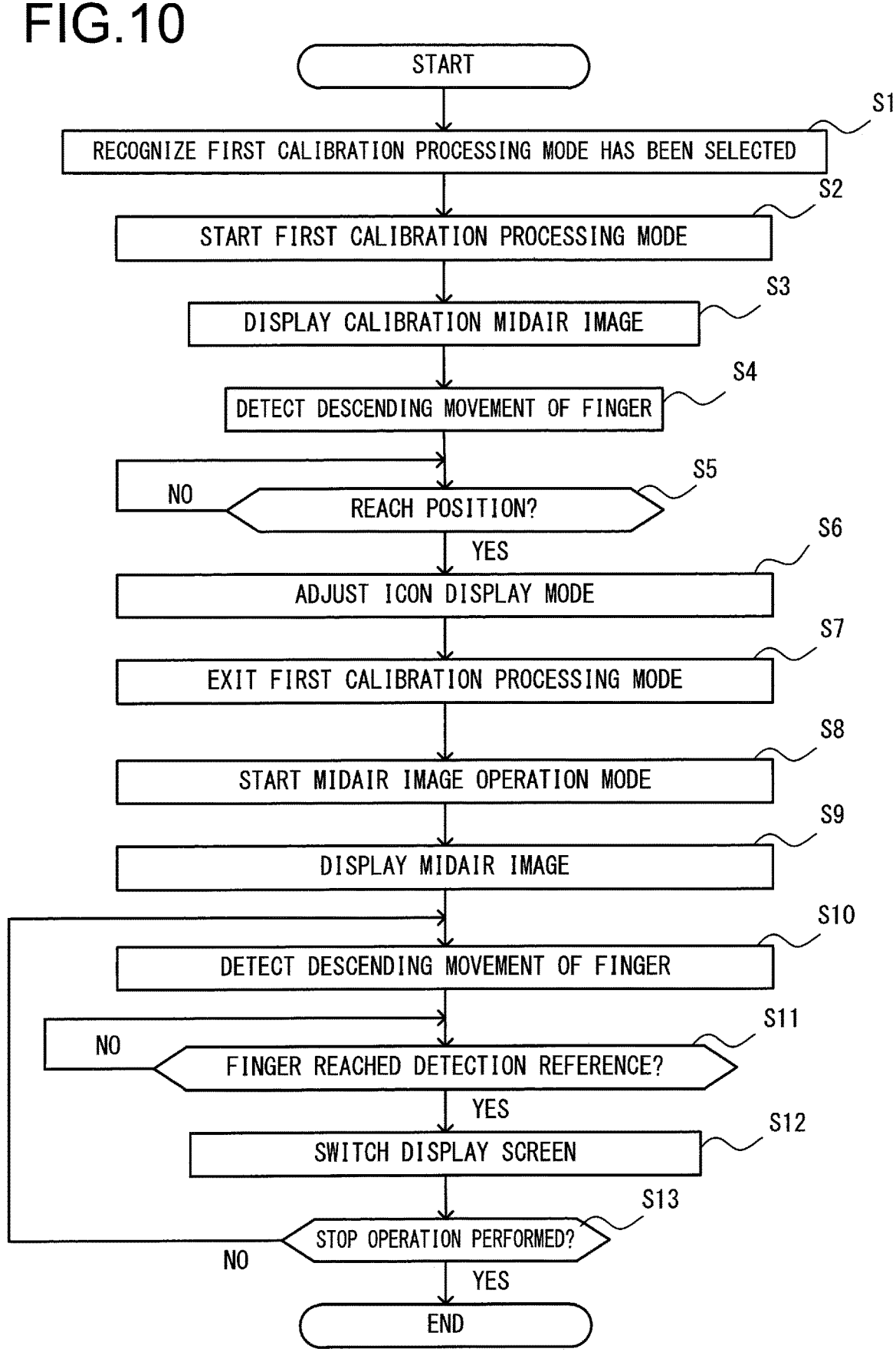

The relationship between the first calibration processing mode described above and the midair image operation mode will be described in reference to the flowchart presented in FIG. 10. After the display device 1 is started up, the processing in the flowchart presented in FIG. 10 is executed by the control unit 20 is based upon a program. The program is stored in the storage unit 205.

In step S1, the first calibration processing mode, selected by the user via the calibration processing mode selector operation button, is recognized as the selected mode, and then the operation proceeds to step S2. In step S2, the calibration unit 203 shown in FIG. 2 starts the first calibration processing mode before the operation proceeds to step S3.

In step S3, the image generation unit 201 generates display image data for a calibration display image, the display control unit 202 brings up on display at the display unit 11 the calibration image based upon the display image data and the detection reference control unit 204 sets the detection reference 40 at a predetermined initial position. The display image at the display unit 11 is the calibration midair image 300 in FIG. 4 generated via the image-forming optical system 12. The midair image 300 includes the icon 300A, the reference lines 310 through 314, with the message "Touch this icon for calibration". In step S4, the operation detector 13 detects a downward movement of the user's fingertip F, and the operation proceeds to step S5.

In step S5, the detection reference control unit 204 shown in FIG. 2 makes a decision, based upon the detection output provided by the operation detector 13, as to whether or not the finger has reached the reach position 50. If an affirmative decision is made in step S5, i.e., if it is decided that the finger has reached the reach position, the operation proceeds to step S6. If a negative decision is made in step S5, i.e., if it is decided that the finger has not become still, the operation waits in standby until an affirmative decision is made. In step S6, the detection reference control unit 204 adjusts the display mode for the icon 300A based upon the distance between the reach position 50 and the detection reference 40. In addition, the image generation unit 201 stores data indicating the displacement quantity with respect to the display position of the icon 300A and the change quantity with respect to the size of the icon 300A into the storage unit 205 shown in FIG. 2, before the operation proceeds to step S7.

In step S7, the operation exits the first calibration processing mode and proceeds to step S8. In step S8, the midair image operation mode is started, and the operation then proceeds to step S9. In step S9, the midair image 30 for the midair image operation mode shown in FIG. 9, which includes icons 30A, is displayed. At this time, the image generation unit 201 reads out the data indicating the displacement quantity with respect to the display position of the icon 300A and the change quantity with respect to its size, having been stored into the storage unit 205 in step S6, from the storage unit 205. Based upon the data thus read out, the image generation unit 201 sets the display positions and the sizes of the icons 30A for the midair image operation mode.

Through this process, a midair image 30, having icons 30A optimized for the user operation characteristics through the first calibration processing mode, is brought up on display in the midair image operation mode.

As the user moves his finger down toward the midair image 30 in order to perform an operation at the display position of an icon 30A, the operation detector 13 shown in FIG. 2 detects the downward movement of the user's finger in step S10, and then the operation proceeds to step S11. In step S11, the detection reference control unit 204 makes a decision based upon the detection output provided by the operation detector 13 as to whether or not the finger has reached the detection reference 40. If an affirmative decision is made in step S11, i.e., if it is decided that the finger has reached the detection reference 40, the operation proceeds to step S12. If a negative decision is made in step S11, i.e., if it is decided that the finger has not reached the detection reference 40, the operation waits in standby until an affirmative decision is made. In step S12, the display control unit 202 switches the display image at the display unit 11 to a display image corresponding to the icon 30A having been operated, and then the operation proceeds to step S13. In step S13, a decision is made as to whether or not an operation has been performed to stop or shut down the display device 1. If an affirmative decision is made in step S13, i.e., if an operation has been performed to stop the display device 1, the display device 1 stops. If a negative decision is made in step S13, however, the operation returns to step S10.

While the first calibration processing mode is executed immediately after the display device 1 is started up so as to precede the midair image operation mode in the example described above, the first calibration processing mode may instead be executed following the midair image operation mode. For instance, the user, having experienced frustration while performing an operation at the display position of an icon 30A in the midair image operation mode, may operate the calibration processing mode selector operation button at the display device 1 in order to select the first calibration processing mode. In this case, the first calibration processing mode is executed by interrupting the midair image operation mode that is underway and the midair image operation mode is then resumed after the first calibration processing mode ends. It is to be noted that while the display device 1 selects the first calibration processing mode in response to a user operation of the operation button in the example described above, the calibration unit 203 may detect signs of annoyance experienced by the user, which is likely attributable to difficulty in performing an operation at the display position of the icon 30A, and may implement the first calibration processing mode instead. The display device 1 may, for instance, detect the pulse rate of the user (biometric information) and a pulse rate exceeding a predetermined value may be determined to be a sign of user discomfort.

Next, the second calibration processing mode will be described in reference to FIG. 11 and FIG. 12. It is to be noted that the processing described earlier in reference to the first calibration mode may also be executed, as appropriate, in the second calibration processing mode described below.

Figure 11:
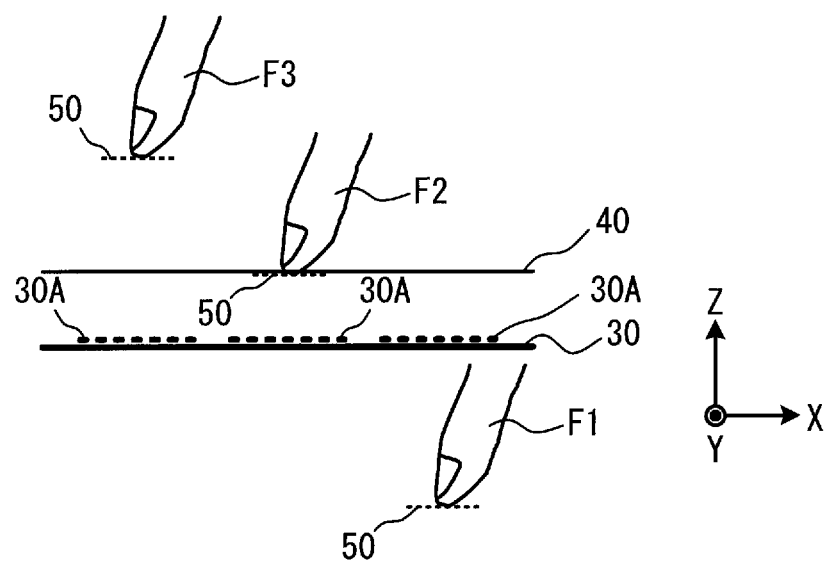
Figure 12:
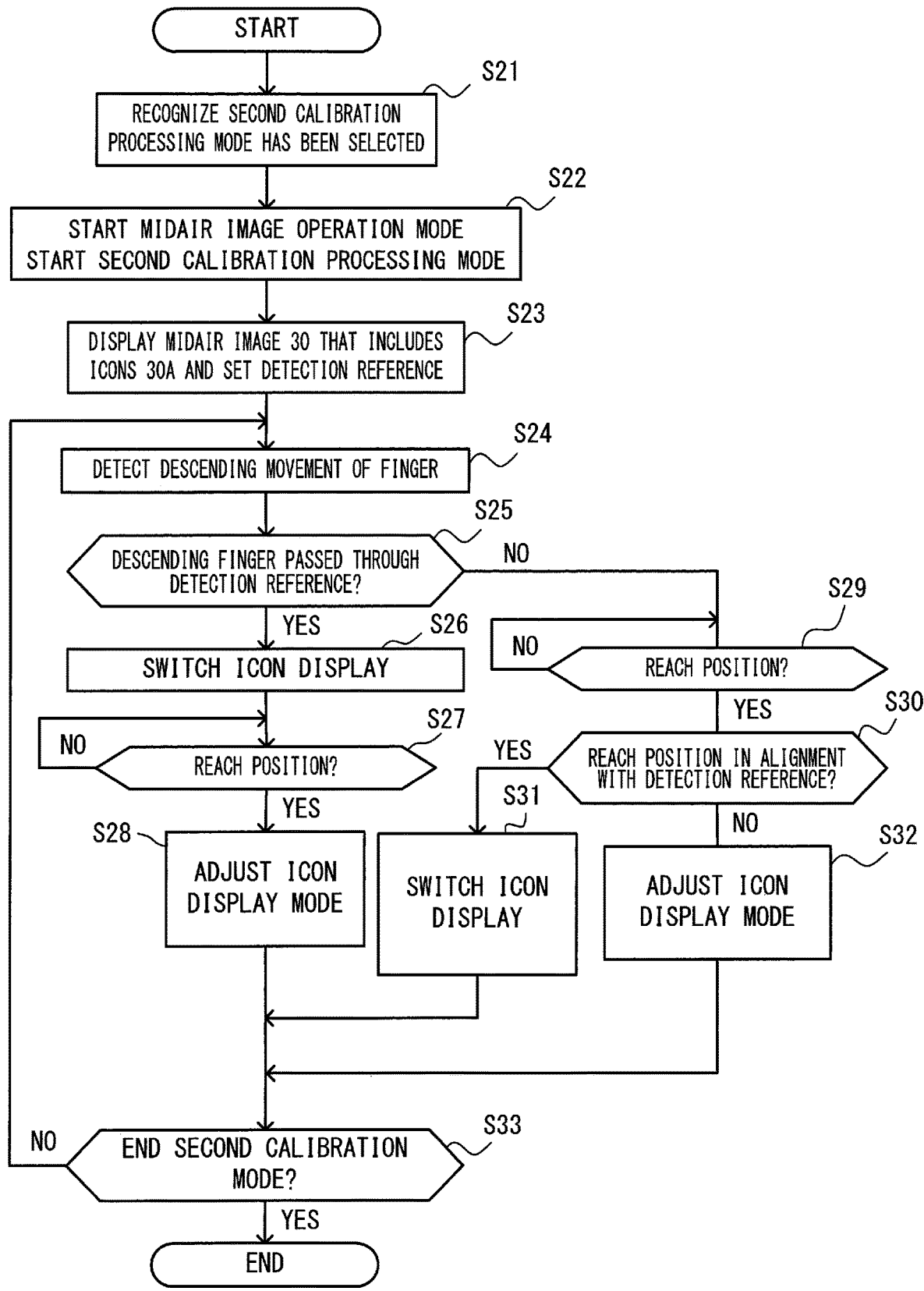

FIG. 11 illustrates a midair image 30 for the midair image operation mode, the detection reference 40 and the reach position 50 to which the fingertip F reaches, whereas FIG. 12 presents a flowchart of the operation executed in the second calibration processing mode. The processing is executed in the steps in the flowchart presented in FIG. 12, by the control unit 20 based upon a program, following startup the display device 1.

In step S21, the second calibration processing mode is recognized as the selected mode, and then the operation proceeds to step S22. In step S22, the midair image operation mode and the second calibration processing mode start concurrently, before the operation proceeds to step S23. In step S23, the midair image 30 shown in FIG. 3, which includes the icons 30A, is displayed and the detection reference control unit 204 in FIG. 2 sets the detection reference 40 at a predetermined initial position, e.g., at the position taken by the midair image 30 or at a position slightly above the position taken by the midair image 30, before the operation proceeds to step S24. At this time, a message "Calibration executed during icon operation" is briefly displayed in the midair image 30. However, it is not essential that this message be displayed.

As the user moves his finger downward in order to perform an operation at the display position of an icon 30A, the operation detector 13 starts detection of finger movement in step S24, and then the operation proceeds to step S25. In step S25, the detection reference control unit 204 makes a decision based upon the detection output provided by the operation detector 13 as to whether or not the finger moving downward has passed through the detection reference 40. If an affirmative decision is made in step S25, i.e., if the finger moving downward has passed through the detection reference 40 and has moved further down, the operation proceeds to step S26. F1 in FIG. 11 indicates the finger having passed through the detection reference 40 during its downward movement. In step S26, the detection reference control unit 204, having decided that the finger F1 has reached the detection reference 40, i.e., it has passed through the detection reference 40, executes icon display switchover so as to switch the midair image 30 in correspondence to the icon 30A having been operated. The operation then proceeds to step S27. In step S27, the detection reference control unit 204 makes a decision as to whether or not the finger F1 has reached the reach position 50, and if an affirmative decision is made, the operation proceeds to step S28, whereas if a negative decision is made, the operation is held until an affirmative decision is made. In step S28, the detection reference control unit 204 adjusts the display mode for the icons 30A based upon the distance between the reach position 50 and the detection reference 40, and then the operation proceeds to step S33. In more specific terms, the image generation unit 201 alters the display positions along a direction in which the icons 30A move away from the vanishing point and increases the size of the icons 30A, as shown in FIG. 9(c).

It is to be noted that if the detection reference control unit 204 detects in step S28 that the reach position 50 is not located further downward (toward the Z direction − side) beyond a predetermined range relative to the detection reference 40 by comparing the reach position 50 and the position of the detection reference 40, the image generation unit 201 does not need to adjust the display mode for the icons 30A. As an alternative, the image generation unit 201 may set the extent to which the display mode for the icons 30A is to be altered (i.e., the displacement quantity for the icons 30A) to 0 (in other words, the display mode for the icons 30A may remain substantially unchanged).

If a negative decision is made in step S25, i.e., if the finger moving downward has not passed through the detection reference 40, the operation proceeds to step S29. In step S29, the detection reference control unit 204 makes a decision based upon the detection output provided by the operation detector 13 as to whether or not the finger has reached the reach position 50, and if an affirmative decision is made, the operation proceeds to step S30. If, on the other hand, a negative decision is made, the operation is held until an affirmative decision is made. A finger F2 in FIG. 11 indicates that the reach position 50 is in alignment with the detection reference 40. In step S30, the detection reference control unit 204 makes a decision based upon the detection output provided by the operation detector 13 as to whether or not the reach position 50 is in alignment with the detection reference 40, and if an affirmative decision is made, the operation proceeds to step S31, whereas if a negative decision is made, the operation proceeds to step S32. In step S31, icon display switchover is executed since the reach position 50 is in alignment with the detection reference 40 without adjusting the display mode for the icons 30A, before the operation proceeds to step S33.

It is to be noted that the detection reference control unit 204 may decide that the reach position 50 is at the detection reference 40 even when the reach position 50 is not exactly in alignment with the detection reference 40, e.g., when the reach position 50 is detected within a predetermined range from the detection reference 40. In such a case, the detection reference control unit 204 may make a decision in step S25 in FIG. 12 as to whether or not the reach position 50 is located further downward relative to the predetermined range from the detection reference 40. Then, if the reach position 50 is located further downward beyond the predetermined range from the detection reference 40, an affirmative decision will be made in step S25 and the operation will proceed to step S26.

In addition, the detection reference control unit 204 may make a decision in step S30 as to whether or not the reach position 50 is located within a predetermined range relative to the detection reference 40. In this case, if the furthest reach position 50 is located within the predetermined range from the detection reference 40, an affirmative decision will be made in step S30 and the operation will proceed to step S31.

In step S32, with the reach position 50 located above the detection reference 40 as indicated by a finger F3 in FIG. 11, the detection reference control unit 204 adjusts the display mode for the icons 30A based upon the distance between the reach position 50 and the detection reference 40. More specifically, the image generation unit 201 alters the display positions of the icons 30A along a direction toward the vanishing point and reduces the size of the icons 30A, as shown in FIG. 9(b). In step S33, a decision is made as to whether or not an end operation has been performed in order to exit the second calibration processing mode, and if an affirmative decision is made, the second calibration processing mode is terminated, whereas if a negative decision is made, the operation returns to step S24.

In the second calibration processing mode described above, which is executed concurrently while the midair image operation mode is underway, the user is able to perform an operation at the display position of the midair image 30 by using the detection reference 40 optimized for the user without having to be aware that calibration processing is also in progress. It is to be noted that the first/second calibration processing mode selection does not necessarily need to be made by the user and instead, the display device 1 may automatically select either the first calibration processing mode or the second calibration processing mode. In addition, it is not essential that both the first calibration processing mode and the second calibration processing mode may be available and only one of these calibration modes may be available.

In the first embodiment, the image generation unit 201 adjusts the display mode for an icon 30A constituting a first image based upon an operation detected by the operation detector 13. More specifically, the image generation unit 201 adjusts the display mode for the icon 30A relative to the reference lines 310 through 314 used as a depth cue based upon the positional relationship between the detection reference 40 and the position at which the user operation is detected, obtained via the operation detector 13. As a result, a user perception can be created as if the spatial position of the icon 30A has changed, so as to lead the user to adjust the position at which he performs a subsequent operation with respect to the display position of the midair image 30.

In addition, the image generation unit 201 in the first embodiment adjusts the display mode for the icon 30A so as to create a user perception as if the display position of the icon 30A has moved toward or further away from the user. As a result, a perception can be created in the user as if the spatial position of the icon 30A along the Z direction has changed so as to lead the user to adjust the position along the Z direction at which he performs an operation in relation to the display position of the midair image 30. In other words, detection of a user operation at the detection reference 40 is enabled.

Moreover, the image generation unit 201 in the first embodiment determines the direction along which the display position of the icon 30A is to be altered based upon the positional relationship between the detection reference 40 and the position at which the user operation has been detected. This means that the direction along which the icon 30A is to be perceived to move in space is determined based upon the user operation performed during the calibration processing and thus, it is ensured that a subsequent user operation is performed at the display position at which the midair image 30 is displayed.

In addition, the image generation unit 201 in the first embodiment alters the display position of the icon 30A along a direction (toward the Z direction – side) determined based upon a press-down operation performed by the user on the midair image 30 or along the opposite direction (toward the Z direction + side). With the user led to adjust the position at which he performs an operation along the Z direction in this manner, detection of a user operation at the detection reference 40 is ensured.

Moreover, the image generation unit 201 in the first embodiment adjusts the display of the icon 30A so that the display position of icon 30A displayed in space, is altered along the direction determined based upon a press-down operation performed by the user when the press-down operation performed by the user does not reach the detection reference 40 (see FIG. 7(b)). Namely, a perception is created in the user as if the position of the icon 30A has been adjusted to move further away from the user. Since this leads the user to perform a press-down operation at a position further downward, it is ensured that a press-down operation by the user reaches the detection reference 40.

Furthermore, the image generation unit 201 in the first embodiment adjusts the display of the icon 30A so that the display position of the icon 30A displayed in space is altered along the direction opposite from the direction determined based upon a press-down operation performed by the user when the user press-down operation has reached the detection reference (see FIG. 7(d)). Namely, a perception is created in the user as if the position of the icon 30A has been adjusted to move closer to the user. Since this leads the user to perform a press-down operation at a position closer to the user, it is ensured that the user performs a press-down operation at the detection reference 40.

In addition, in the first embodiment, the position at which a user operation is detected is the reach position 50. Since this allows the display of the icons 30A to be adjusted based upon the position at which the user perceives that he has "touched" the display position of the midair image 30, the accuracy of the calibration processing can be improved.

The image generation unit 201 in the first embodiment adjusts the display of the icon 30A when a user operation is not detected at the detection reference 40. Since this leads the user to perform a press-down operation at a position further down, it is ensured that the press-down operation performed by the user is detected at the detection reference 40.

In addition, the image generation unit 201 in the first embodiment makes an adjustment so as to reduce the size of the icon 30A when a user operation is not detected at the detection reference 40. Since this creates a user perception as if the display of the icon 30A in space has moved further away from the user, the user is led to perform an operation at a position that aligns with position of the detection reference 40.

In addition, when the position at which the user operation is detected is closer to the user relative to the detection reference 40, the image generation unit 201 in the first embodiment adjusts the display of the icon 30A relative to the reference lines 310 through 314 so as to create a user perception as if the position of the icon 30A has moved further away from the user. Thus, the user, perceiving as if the midair display of the icon 30A has moved further away from the user, is led to perform a user operation at a position that aligns with the position of detection reference 40.

In addition, when the position at which a user operation is detected set apart from the detection reference 40 over a second distance greater than a first distance and is located further toward the user, the image generation unit 201 in the first embodiment adjusts the display of the icon 30A as described below. Namely, the image generation unit 201 adjusts the display of the icon 30A relative to the reference lines 310 through 314 so as to create a user perception as if the display position of the icon 30A has moved further away from the user by an extent greater than the extent to which the display position moves when the user operation detection position is set apart over the first distance. This means that the image generation unit 201 adjusts the display of the icon 30A relative to the reference lines 310 through 314 so as to create a user perception as if the display position of the icon 30A moves further away from the user by a greater extent as the distance between the user operation detection position and the detection reference 40 increases. Through these measures, it is ensured that a user operation reaches the detection reference 40 by creating different user perceptions with respect to the depth of the icon 30A based upon the distance between the detected user operation and the detection reference 40.

Moreover, the image generation unit 201 in the first embodiment adjusts the display mode for the icon 30A so as to create a user perception as if the display position of the icon 30A has changed along the optical axis of the image-forming optical system 12. This means that a user operation can be detected at the detection reference 40 by leading the user to adjust the user operation position along the optical axis. It is to be noted that the present invention is not limited to an example in which a user perception is created that the display position of icon 30A has changed precisely along the optical axis of the image-forming optical system 12. In other words, the image generation unit 201 may adjust the display mode for the icon 30A so as to create a user perception as if the display position of the icon 30A has moved along a direction at an angle relative to the Z axis, i.e., along a direction other than the direction perpendicular to the optical axis of the image-forming optical system 12.

(Variation 1 of the First Embodiment)

In the first embodiment described above, the display mode for an icon 30A or 300A is adjusted by altering its display position and size. Other examples that may be adjusted in order to adjust the display mode for the icon 30A or 300A are described as variation 1 below.

Example 1

The image generation unit 201 adjusts the display mode by altering the sharpness with which an icon 30A in FIG. 3(a) or the icon 300A in FIG. 4(a) is displayed. The image generation unit 201 increases the sharpness of the icon 30A or 300A so as to create a user perception as if the icon 30A or 300A has moved closer to the user. The image generation unit 201 decreases the sharpness of the icon 30A or 300A so as to create a user perception as if the icon 30A or 300A has moved further away from the user. In this case, too, the reference lines 310 through 314 are used as a depth cue, as in the first embodiment. It is to be noted that if the sharpness of only one icon 30A among the plurality of icons 30A shown in FIG. 3(a) is altered, the other icons 30A, the sharpness of which remains unchanged, are used as a depth cue. The image generation unit 201 adjusts the sharpness by altering the degree of blur with which the icon 30A or 300A is displayed or by altering the degree of whiteness (haziness) in the display of the icon 30A or 300A based upon the concept of air perspective (the laws of air perspective).

The image generation unit 201 creates a user perception as if the icon 30A or 300A has moved closer to the user by reducing the degree of blur at the edges of the icon 30A or the icon 300A, or at a character, a pattern or the like superimposed over the icon and thus displaying it with better definition. The image generation unit 201 creates a user perception as if the icon 30A or 300A has moved further away from the user by increasing the degree of blur at the edges of the icon 30A or 300A or at a character, a pattern or the like superimposed thereupon. In addition, the image generation unit 201 creates a user perception ad if the icon 30A or 300A has moved closer to the user by decreasing the degree of whiteness rendered at the icon 30A or 300A. The image generation unit 201 creates a user perception as if the icon 30A or 300A has moved away the user by increasing the degree of whiteness rendered at the icon 30A or 300A. It is to be noted that the image generation unit 201 may alter only either the degree of blur or the degree of whiteness of the icon 30A or the icon 300A or it may alter both the degree of blur and the degree of whiteness of the icon 30A or the icon 300A.

It is to be noted that in the example described above, the display mode is adjusted by altering the display sharpness of icon 30A or 300A. However, the image generation unit 201 may alter the display position of the icon 30A or 300A and its size or may alter either the display position or the icon size, in addition to altering the sharpness of the icon 30A or 300A.

In example 1 of variation 1, the image generation unit 201 alters the sharpness with which the icon 30A or 300A is displayed based upon the positional relationship between the user operation and the detection reference 40. As a result, the user, perceiving as if the display position at which the icon 30A or 300A is displayed in space has moved, is led to adjust the position at which he performs an operation with respect to the midair image 30.

Example 2

The image generation unit 201 adjusts the display mode by altering the color with which an icon 30A in FIG. 3(*a*) or the icon 300A in FIG. 4(*a*) is displayed. Under normal circumstances, an object taking on a cold color is perceived to be located further away than an object in the same size taking on a warm color. The image generation unit 201 creates a user perception as if the icon 30A or 300A has moved further away from the user by rendering the icon 30A or 300A in a cold, receding color, such as blue. The image generation unit 201 creates a user perception as if the icon 30A or 300A has moved closer to the user by rendering the icon 30A or 300A in a warm, advancing color, such as red or yellow. In this case, the color of the reference lines 310 through 314 is used as a depth cue, as in the first embodiment. It is to be noted that if the color of only one icon 30A among the plurality of icons 30A shown in FIG. 3(*a*) is altered, the other icons 30A, the color of which remains unchanged, are used as a depth cue.

It is to be noted that in the example described above, the display mode is adjusted by altering the color of the icon 30A or 300A. However, the image generation unit 201 may alter the display position of the icon 30A or 300A and its size or may alter either the display position or the icon size, in addition to altering the color of icon 30A or 300A.

Example 3

The image generation unit 201 adjusts the display mode by altering the luminance with which an icon 30A in FIG. 3(*a*) or the icon 300A in FIG. 4(*a*) is displayed. The image generation unit 201 decreases the luminance of the icon 30A or 300A, thus rendering it darker, so as to create a user perception as if the icon 30A or 300A has moved further away from user. The image generation unit 201 increases the luminance of the icon 30A or 300A and thus renders it brighter so as to create a user perception as if the icon 30A or 300A has moved closer to the user. In this case, too, the luminance of the reference lines 310 through 314 is used as a depth cue, as in the first embodiment. It is to be noted that if the luminance of only one icon 30A among the plurality of icons 30A shown in FIG. 3(*a*) is altered, the other icons 30A, the luminance of which remains unchanged, are used as a depth cue.

In this example, as the luminance of the icon 30A or 300A is raised and thus its brightness increases, the user may perceive that the icon 30A or 300A is located closer to the user. In addition, the following effect may be created. Namely, as the icon 30A or the icon 300A is rendered brighter, the user is able to view the icon 30A or 300A with better clarity and thus the ease of operation improves.

It is to be noted that in the example described above, the display mode is adjusted by altering the luminance of the icon 30A or 300A. However, the image generation unit 201 may alter the display position of the icon 30A or 300A and their size or may alter either the display position or the icon size, in addition to altering the luminance of the icon 30A or 300A.

Example 4

Figure 13:
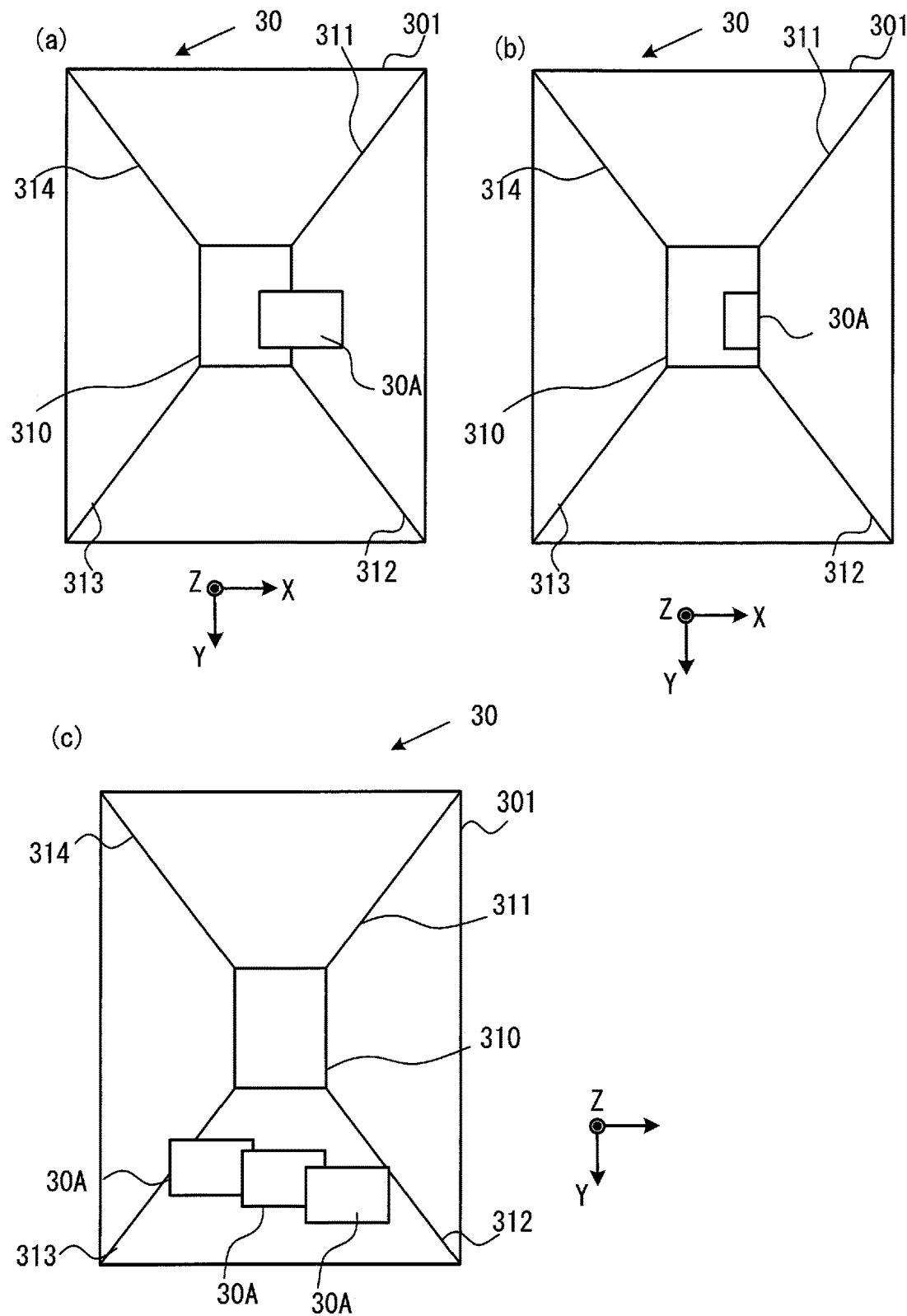

The image generation unit 201 adjusts the display mode by altering the extent to which the icon 30A or 300A overlaps with the reference lines 310 through 314 used as a depth cue. FIG. 13 provides schematic illustrations, each showing an example of a degree to which an icon 30A may overlap with the reference lines 310 through 314. In FIG. 13(*a*), the reference line 310 is partially obscured by the icon 30A, whereas in FIG. 13(*b*), the icon 30A is partially obscured by the reference line 310. It is to be noted that the icon 30A in FIG. 13(*a*) and the icon 30A in FIG. 13(*b*) are displayed in the same size and at the same position. When the reference line 310 is partially obscured behind the icon 30A, as shown in FIG. 13(*a*), a perception is created that the icon 30A is located closer than the icon 30A part of which ranges outside the reference line 310 and is obscured, as shown in FIG. 13(*b*). The image generation unit 201 uses this effect to create a user perception as if the icon 30A or 300A has moved further away from the user, by displaying the icon 30A or 300A so that it appears to be partially obscured behind a reference line. The image generation unit 201 creates a user perception as if the icon 30A or 300A has moved closer to the user, by displaying the icon 30A or 300A so that the reference line appears to be partially obscured behind the icon 30A or 300A. In this case, the image generation unit 201 creates a user perception as if the icon 30A or 300A has moved along the Z direction without actually moving the display position of the icon 30A or 300A on the midair image 30.

It is to be noted that the icon 30A or 300A is displayed at the same position in FIG. 13(*a*) and FIG. 13(*b*). The image generation unit 201 may also alter the display position and the size of the icon 30A or 300A or alter either the display position or the size of the icon 30A or 300A in addition to altering the degree of overlap with respect to the icon 30A or 300A.

In example 4 of variation 1, the image generation unit 201 alters the degree to which the icon 30A or 300A overlaps a reference line based upon the positional relationship between the user operation and the detection reference 40. As a result, the user, perceiving as if the display position of the icon 30A or 300A in space has moved, is led to adjust the position at which he performs an operation with respect to the midair image 30.

In addition, if detection references 40, each set in correspondence to one of three icons 30A, form steps along the Z direction as shown in FIG. 3(*c*), the image generation unit 201 may display the individual icons 30A in the midair image 30 with overlaps, as shown in FIG. 13 (*c*). Namely, the icon 30A corresponding to the detection reference 40 set at the position closest to the midair image 30 (located toward the left side of the drawing sheet (toward the X direction − side)), among the icons 30A in FIG. 3(*c*), is displayed so that it is partially obscured by the icon 30A located at the center along the X direction among the three icons 30A. In addition, the icon 30A at the center along the X direction among the three icons 30A, is displayed so that it is partially obscured by the icon 30A corresponding to the detection reference 40 set at the position furthest from the midair image 30 (located toward the right side of the drawing sheet (toward the X direction + side)), among the three icons 30A. It is to be noted that while FIG. 13(*c*) shows the individual icons 30A taking different positions along the Y direction to simplify the illustration, they may be displayed at positions in alignment with one another along the Y direction. The image generation unit 201 may set the extent to which the individual icons 30A are obscured, i.e., the extent of overlap, based upon the distances between the midair image 30 and the detection references 40.

As a result, the user experiences a perception as if the individual icons 30A are displayed at different positions from one another along the Z direction. This, in turn, makes it possible to detect the user operation at the corresponding detection reference 40 even when the detection references 40 corresponding to the individual icons 30A are set apart from the operation detector 13 over distances H2 different from one another.

It is to be noted that the image generation unit 201 may incorporate an effect rendered through motion parallax. Namely, the image generation unit 201 may adjust the display mode for the icons 30A as shown in FIG. 13(c), by moving one of the icon 30A and the other icons 30A, from the initial display state shown in FIG. 3(a) and altering the extent of their overlap as time elapses. Through these measures, the perceived movement of the icons 30A along the depthwise direction can be accentuated.

Example 5

Figure 14:
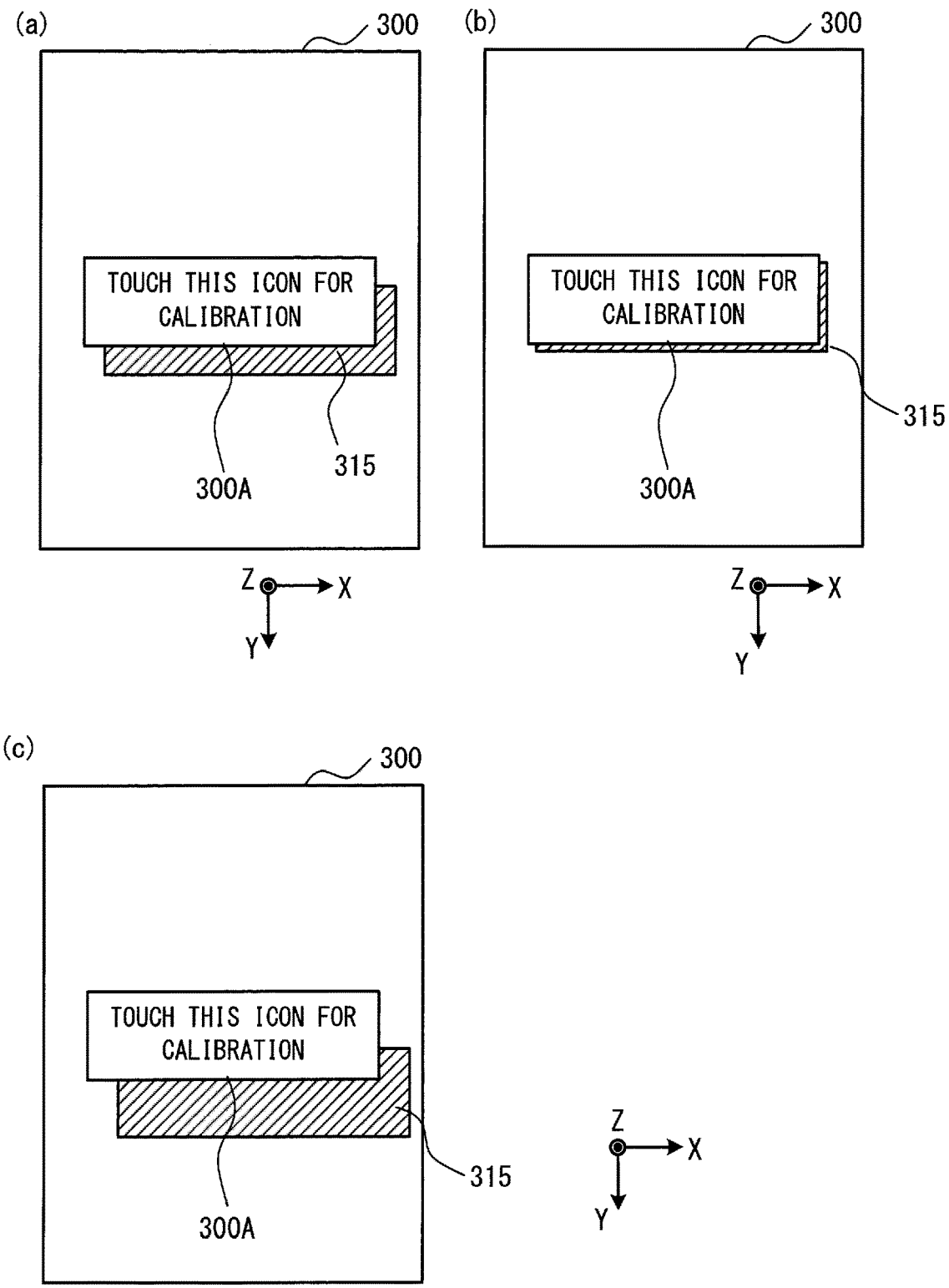

The image generation unit 201 adjusts the display mode by altering a shadow added to the icon 30A or 300A. FIG. 14 provides schematic illustrations, each showing an icon 300A and an example of a shadow image 315 that may be formed when hypothetical light is cast on the icon 300A from above. Namely, the shadow image 315 is used as a depth cue for the user in perceiving the position of the icon 300A along the Z direction in example 5. The areas of the shadow image 315 formed in correspondence to the icon 300A are different from one another in FIG. 14(a), FIG. 14(b) and FIG. 14(c). It is to be noted that the icon 300A assumes the same size and the same display position in the midair image 300 in FIG. 14(a) through FIG. 14(c).

The shadow image 315 in FIG. 14(b) assumes an area smaller than that of the shadow image 315 in FIG. 14(a). The icon 300A in FIG. 14(b), with the shadow image 315 assuming a smaller area, is perceived to be set apart from the shadow image 315 by a smaller distance compared to the distance between the icon 300A shown in FIG. 14 (a) and its corresponding shadow image 315. Namely, the user perceives as if the icon 300A shown in FIG. 14(b) is located further away from the user compared to the icon 300A shown in FIG. 14 (a).

The icon 300A shown in FIG. 14(c), with the corresponding shadow image 315 assuming a large area, will be perceived to be set apart from the shadow image 315 over a greater distance compared to the distance between the icon 300A shown in FIG. 14(a) and its shadow image 315. Namely, the user perceives as if the icon 300A shown in FIG. 14(c) is located closer to the user compared to the icon 300A shown in FIG. 14(a). The image generation unit 201 incorporates this effect and creates a user perception as if the icon 30A or 300A has moved further away from or closer to the user by controlling the area of the shadow image 315 corresponding to the icon 30A or 300A. Assuming that the midair image 300 in FIG. 14(a) is brought up in the initial display, the image generation unit 201 brings up on display the midair image 300 in FIG. 14(b) if the reach position 50 is located above the detection reference 40 (see FIG. 7(b)) during the calibration processing. If the reach position 50 is below the detection reference 40 (see FIG. 7(d)) during the calibration processing, the image generation unit 201 brings up on display the midair image 300 in FIG. 14(c). In other words, when the reach position 50 is not detected at the detection reference 40, the image generation unit 201 displays the shadow image 315, as shown in FIG. 14(b) or FIG. 14(c) based upon the positional relationship between the reach position 50 and the detection reference 40.

Figure 15:
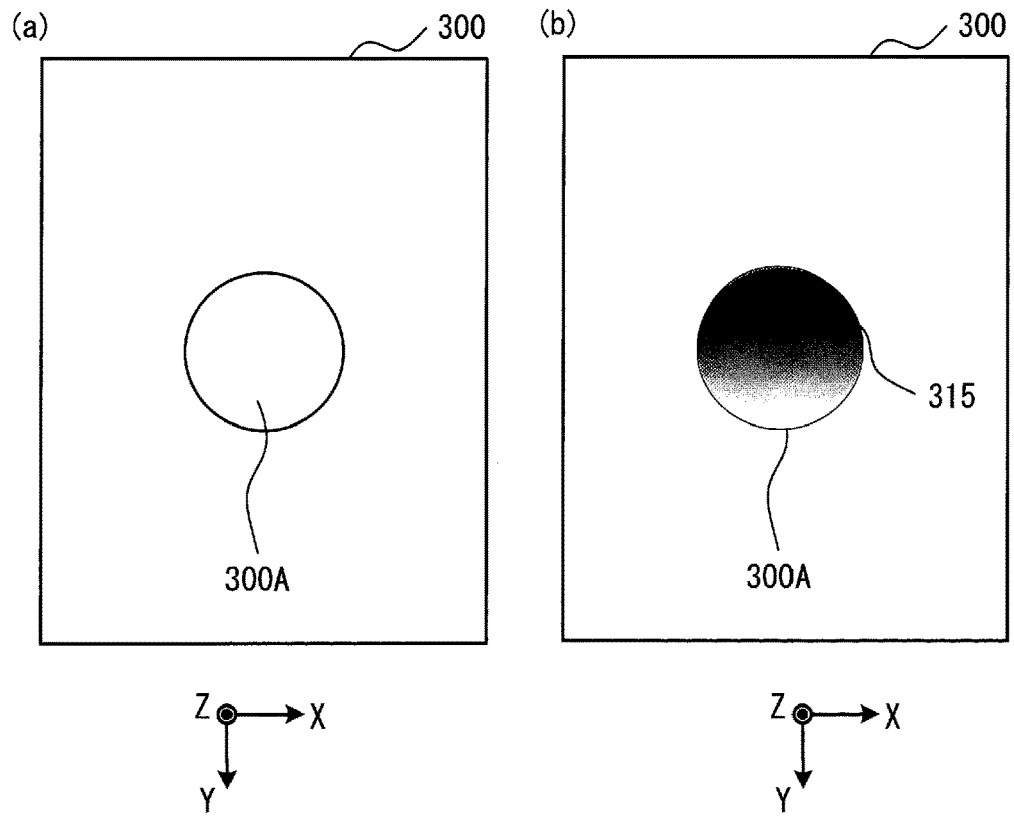
Figure 15:
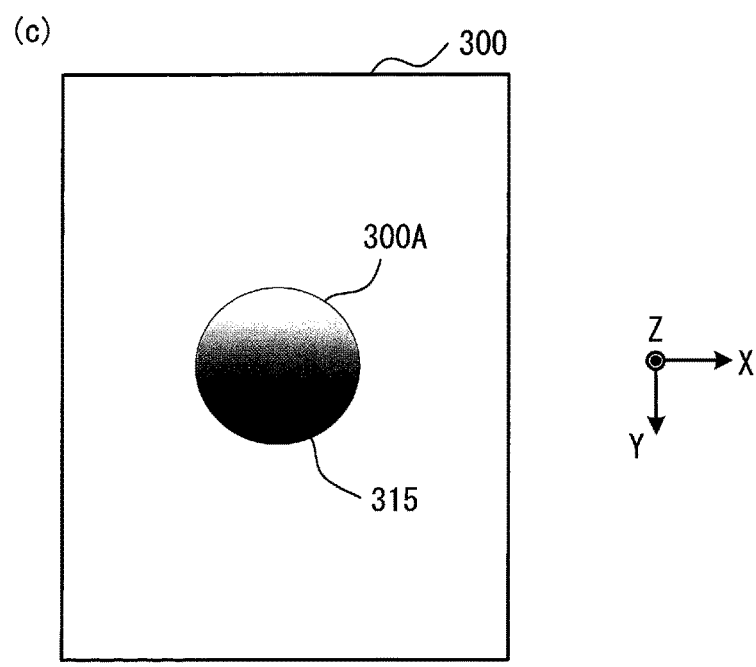

Instead of adjusting the size of the shadow image 315 that appears to be formed by the icon 30A or 300A as described above, the image generation unit 201 may alter an image of a shade formed at an icon 300A. FIG. 15 provides schematic illustrations, each showing a round icon 300A and presenting an example of a shade image added into the icon 300A as a means for display mode adjustment. FIG. 15(a), FIG. 15(b) and FIG. 15(c) are schematic illustrations, respectively presenting an example of the icon 300A that may be brought up in the initial display, an example of a shade image 315 formed over an upper area (toward the Y direction − side) at the round icon 300A and an example of a shade image 315 formed over the lower area (toward the Y direction + side) at the icon 300A.

The image generation unit 201 forms a shade image 315 at the icon 300A shown in FIG. 15(b), by graduating the luminance of the shade image 315 from lowest at the top (the Y direction − side) to highest at the bottom (the Y direction + side). With such a shade image 315 formed therein, the icon 300A in FIG. 15(b) can be perceived to recede toward the side opposite from the user (toward the Z direction − side) in comparison to the icon 300A in the initial display shown in FIG. 15(a). Namely, the icon 300A in FIG. 15(b) can be perceived to be located further away from the user compared to the icon 300A in the initial display. The icon 300A shown in FIG. 15(c), includes a shade image 315 formed by the image generation unit 201 by graduating the luminance of the shade image 315 from lowest at the bottom (the Y direction + side) to highest at the top (the Y direction − side). With such a shade image 315 formed therein, the icon 300A in FIG. 15(c) can be perceived to advance toward the user (toward the Z direction + side) in comparison to the icon 300A in the initial display shown in FIG. 15(a). Namely, the icon 300A in FIG. 15(c) can be perceived to be located closer to the user compared to the icon 300A in the initial display. Using this effect, the image generation unit 201 creates a user perception as if the icon 30A or 300A has moved further away from the user by forming the shade image 315 over an upper area in the icon 30A or 300A. Furthermore, the image generation unit 201 creates a user perception as if the icon 30A or 300A has moved closer to the user by forming the shade image 315 over a lower area in the icon 30A or 300A.

It is to be noted that the shade images 315 that may be formed at the icon 30A or 300A by the image generation unit 201 are not limited to those shown in FIG. 15. The image generation unit 201 may form a shade image 315 in the icon 30A or 300A by using, for instance, the "Ramachandran" crater illusion.

In example 5 of variation 1, the image generation unit 201 executes processing for adding a shadow/shade image at the icon 30A or 300A based upon the positional relationship between the user operation and the detection reference 40. As a result, the user perceiving as if the display position of the icon 30A or 300A has moved, is led to adjust the user operation position.

The image generation unit 201 may adjust the display mode by adopting one of the display mode adjustment methods in the first embodiment and examples 1 through 5, or it may execute display mode adjustment by combining a plurality of display mode adjustment methods. Namely, the image generation unit 201 may adjust at least one of; the display position of the icon 30A, the size of the icon 30A, the sharpness of the icon 30A and a shadow/shade added to the icon 30A, based upon the positional relationship between the user operation position and the detection reference 40. In this situation, the image generation unit 201 may alter at least one of; the display position, the size, the sharpness and the shadow/shade, with respect to the icon 30A, without displaying the reference lines 310 through 314. In addition, based upon the positional relationship between the user operation position and the detection reference 40, the image generation unit 201 may alter at least one of; the display position, the size and the luminance of the icon 30A, among the plurality of display mode adjustment examples explained above.

(Variation 2 of the First Embodiment)

The display device 1 in variation 2, uses a physical object as a depth cue for the second reference and displays an icon 30A or 300A in a midair image 30, without displaying the reference lines 310 through 314.

The display device 1 in variation 2 may adopt a structure similar to that of the display device 1 in the first embodiment illustrated in FIG. 1 and FIG. 2.

Figure 16:
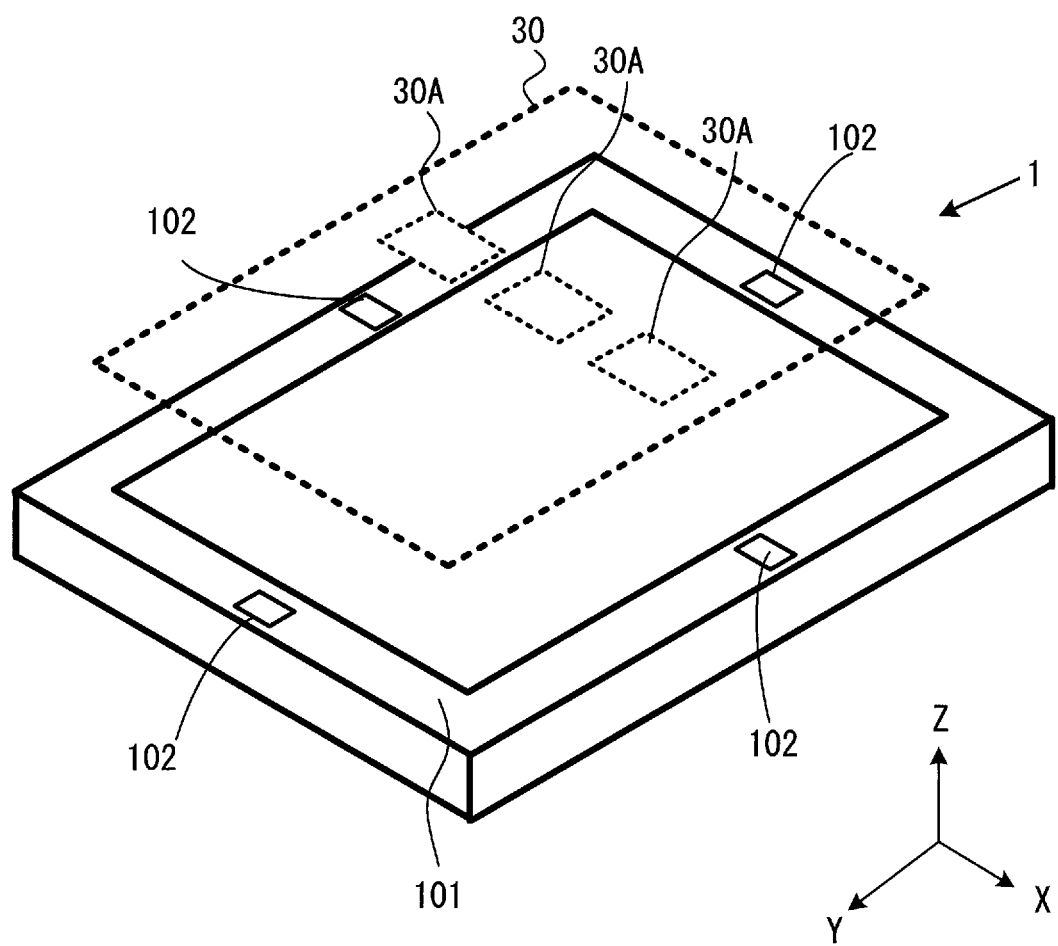

FIG. 16 presents an external view of the display device 1 in variation 2 in a perspective. At a surface of a body 10, (a surface located toward the Z direction + side, hereafter to be referred to as a frame member 101), index marks 102 to be used as a guide that will aid the user looking at a midair image 30 to ascertain the display position of the midair image 30 in space are disposed. The index marks 102 may be engraved in the frame member 101 or they may be decals or the like applied on the frame member 101. In other words, the index marks 102 used as the second reference are physical objects. In the example presented in FIG. 16, the index marks 102 are rectangular marks. It is to be noted that the index marks 102 may be round marks instead of rectangular marks, they may be symbols such as arrows or stars, or they may be characters such as alphabet letters. In addition, while one index mark 102 is disposed on each of the four sides of the frame member 101 in the example presented in FIG. 16, the present invention is not limited to this example and a plurality of index marks 102 may be disposed on each side of the frame member 101. Furthermore, index marks 102 do not need to be disposed on all sides of the frame member 101, and an index mark 102 may be disposed on at least one side.

Figure 17:
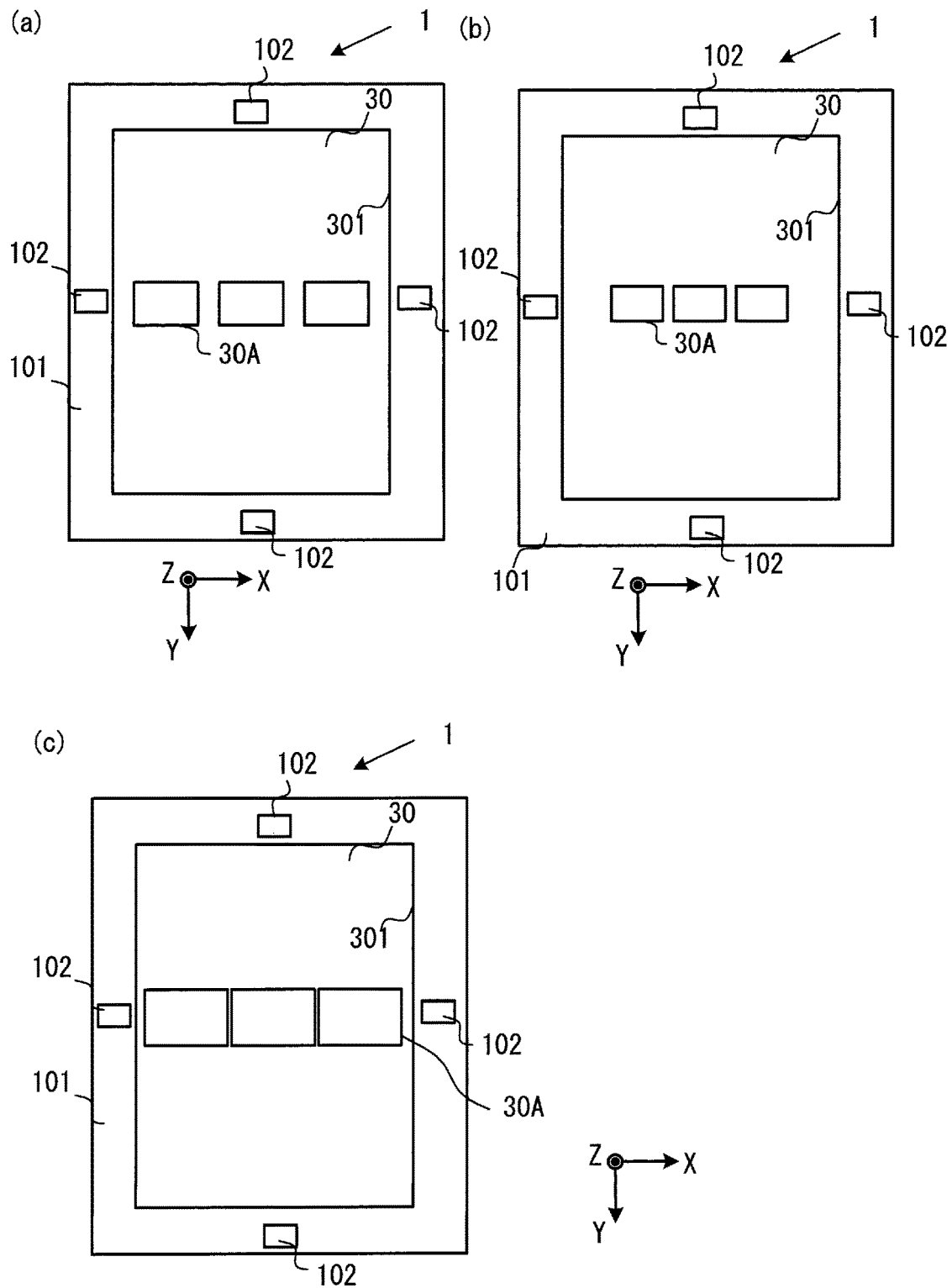

FIG. 17 shows icons 30A in a midair image 30 displayed at the display device 1 in variation 2 and index marks 102 disposed at the frame member 101. FIG. 17(a) shows the icons 30A in the initial display brought up before calibration processing is executed. FIGS. 17(b) and 17(c) each show the icons 30A displayed in a display mode adjusted by the image generation unit 201 through calibration processing. In the example presented in FIG. 17(b), the display mode for the icons 30A has been adjusted by reducing the size of the icons 30A in comparison to the size of the icons 30A in FIG. 17(a). In the example presented in FIG. 17(c), the display mode for the icons 30A has been adjusted by increasing the size of the icons 30A in comparison to the size of the icons 30A in FIG. 17(a).

Prior to the calibration processing, the user, looking at the icons 30A brought up in the initial display, as shown in FIG. 17 and the index marks 102, ascertains the positions taken by the icons 30A in space (positions taken along the Z direction) in reference to the index marks 102. The display of the icons 30A in FIG. 17(a) may be adjusted to that shown in FIG. 17(b) as a result of the calibration processing. In this case, the size of the icons 30A on display is reduced in comparison to that of the icons 30A in FIG. 17(a). Thus, the user, looking at the icons 30A by using the index marks 102 for reference, experiences a perception as if the icons 30A have moved further away from the user relative to those in FIG. 17(a). In addition, the display of the icons 30A in FIG. 17(a) may be adjusted to that shown in FIG. 17(c) as a result of the calibration processing. In this case, the size of the icons 30A on display is increased in comparison to that of the icons 30A in FIG. 17(a). Thus, the user, looking at the icons 30A by using the index marks 102 for reference, experiences a perception as if the icons 30A have moved closer to the user relative to those in FIG. 17(a).

Figure 18:
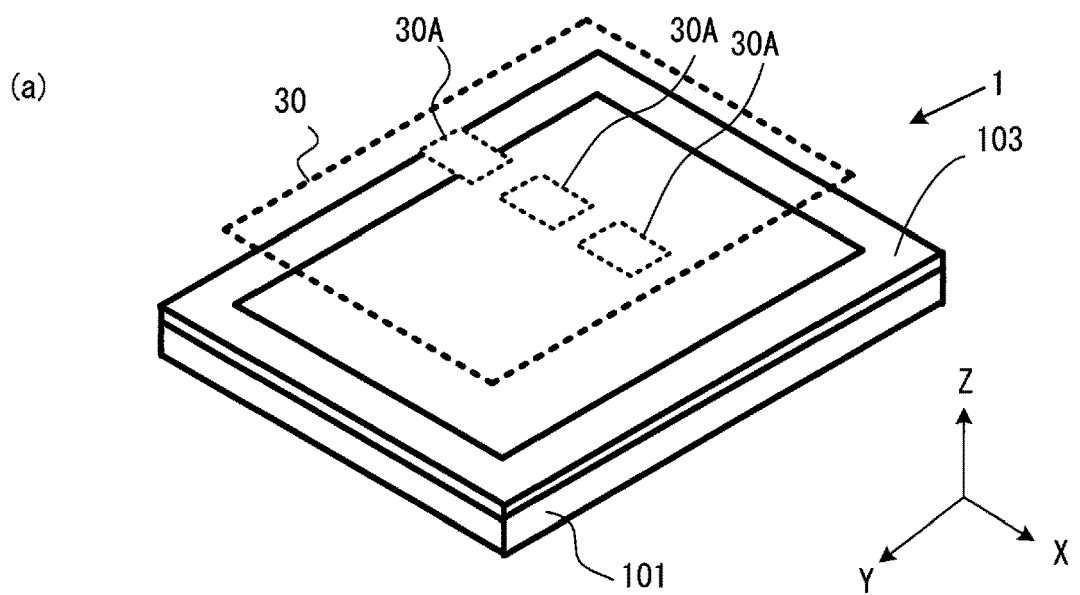
Figure 18:
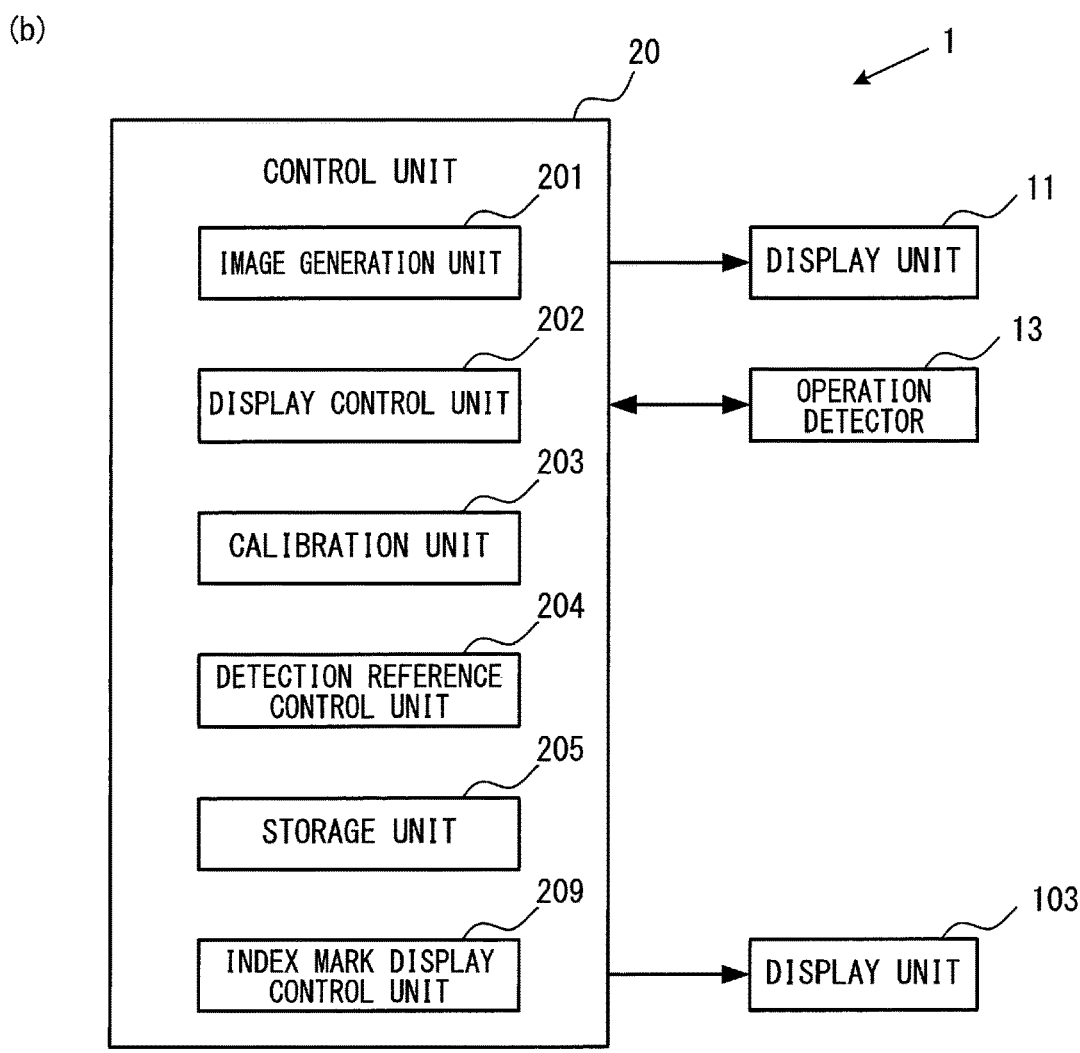

It is to be noted that instead of providing the index marks 102 at the frame member 101, an index mark 102 may be displayed at a display unit such as a liquid crystal monitor. In such a configuration, a display unit 103 will be disposed over the upper surface of the frame member 101 of the display device 1, as shown in FIG. 18(a). FIG. 18(b) is a block diagram that includes the control unit 20, as well as the display unit 11, the operation detector 13, the display unit 103, which are controlled by the control unit 20, among the structural elements constituting this display device 1. The control unit 20 further includes an index display control unit 209 that controls display at the display unit 103, in addition to the functions of the control unit 20 in the first embodiment shown in FIG. 2. The index display control unit 209 controls the display unit 103 to start displaying an index mark 102 when the display device 1 is started up to begin operation in the midair image operation mode or when the calibration processing mode is started up at a startup of display device 1. In other words, the index display control unit 209 starts display at the display unit 103 in step S2 in the flowchart presented in FIG. 10 or step S22 in the flowchart presented in FIG. 12, in reference to which the first embodiment has been explained. The index display control unit 209 brings up on display at the display unit 103 any of the various types of symbols, characters or the like mentioned earlier as an index mark 102. As a result, the user is able to perceive apparent movement of the icons 30A or 300A along the depthwise direction in reference to the index mark 102 displayed at the display unit 103, in the same way as when an index mark 102 disposed at the frame member 101 is used.

It is to be noted that while the image generation unit 201 adjusts the display mode by altering the size of the icons 30A or 300A in variation 2 described above, the present invention is not limited to this example. The image generation unit 201 may adjust the display mode by altering the sharpness, the color or the luminance, as has been explained in reference to the various examples of variation 1.

(Variation 3 of the First Embodiment)

Figure 19:
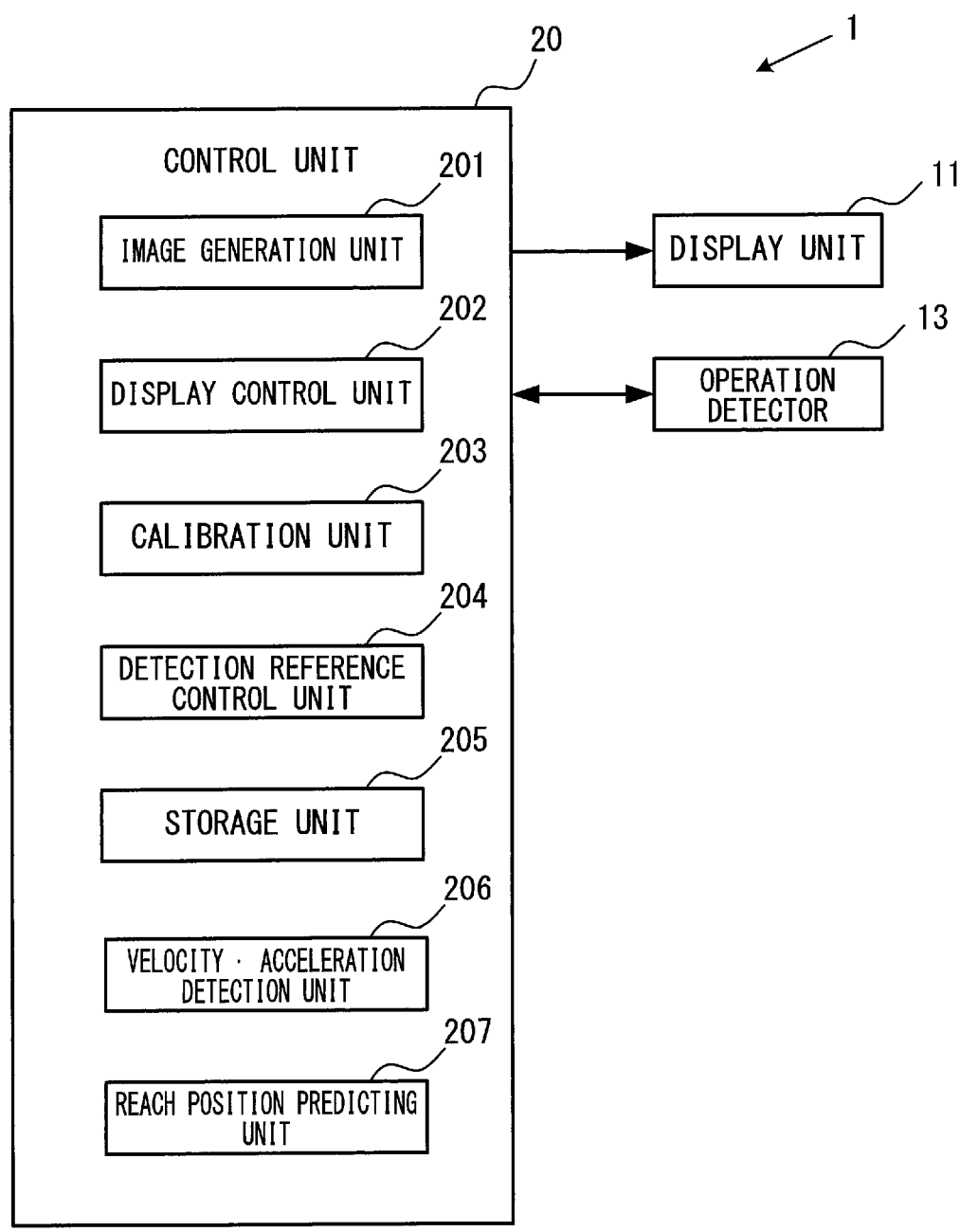
FIG. 19 A block diagram showing the essential configuration of the display device in variation 3 of the first embodiment FIG. 20 Illustrations of the calibration processing executed in variation 3 of the first embodiment in sectional views, each indicating the relationship among the operation detector, the midair image, the detection reference and the finger position in (a) and (b)

The display device 1 in the first embodiment or variation 1 or 2 thereof described above designates the lowest point to which the user's fingertip reaches as it first moves downward in order to perform an operation at an icon display position and then moves upward over a specific distance, as the reach position. The display device 1 then adjusts the display mode for the midair image based upon the distance between the reach position and the detection reference. The display device 1 in variation 3 instead calculates the velocity or the acceleration of the user's fingertip F based upon the detection output provided by the operation detector 13, and predicts a reach position of the user's fingertip F based upon the velocity or the acceleration having been calculated. The display device 1 then adjusts the display mode for the midair image based upon the distance between the predicted reach position and the detection reference. FIG. 19 is a block diagram showing the control unit 20 as well as the display unit 11 and the operation detector 13 controlled by the control unit 20, among the structural components in the display device 1 in variation 3.

The display device 1 in variation 3 will be described by focusing on its structural features different from those in the display device in the first embodiment. A velocity·acceleration detection unit 206 in FIG. 19 reads out the electrostatic capacitance value detected by the operation detector 13 after predetermined time intervals, calculates the velocity of the finger movement based upon a change occurring in the electrostatic capacitance value over each predetermined time interval and also calculates the acceleration of the finger movement based upon the velocity having been calculated. A reach position predicting unit 207 predicts the reach position for the finger based upon the finger movement velocity or acceleration output by the velocity·acceleration detection unit 206. The reach position predicting unit 207 is able to estimate the reach position for the finger by, for instance, detecting that the moving finger, having been accelerating or moving at a substantially constant speed, has shifted into a decelerating state and ascertaining the rate of deceleration. The image generation unit 201 adjusts the display mode for the midair image 30 based upon the reach position predicted by the reach position predicting unit 207.

Figure 20:
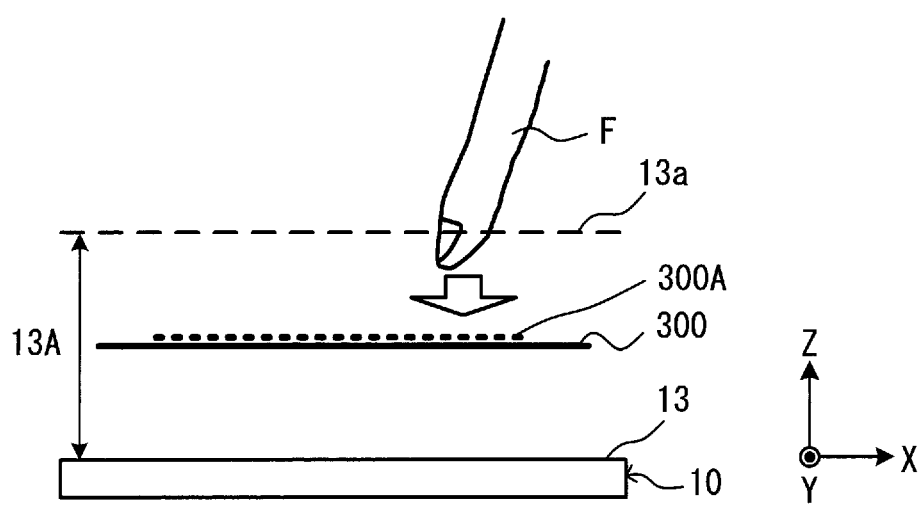
Figure 20:
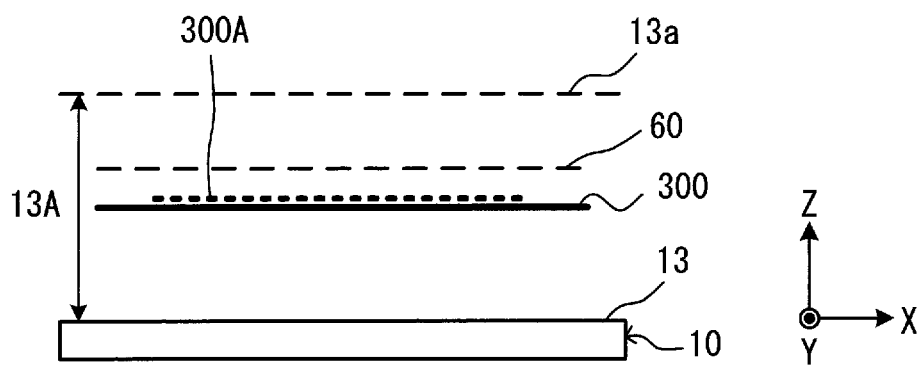
Figure 21:
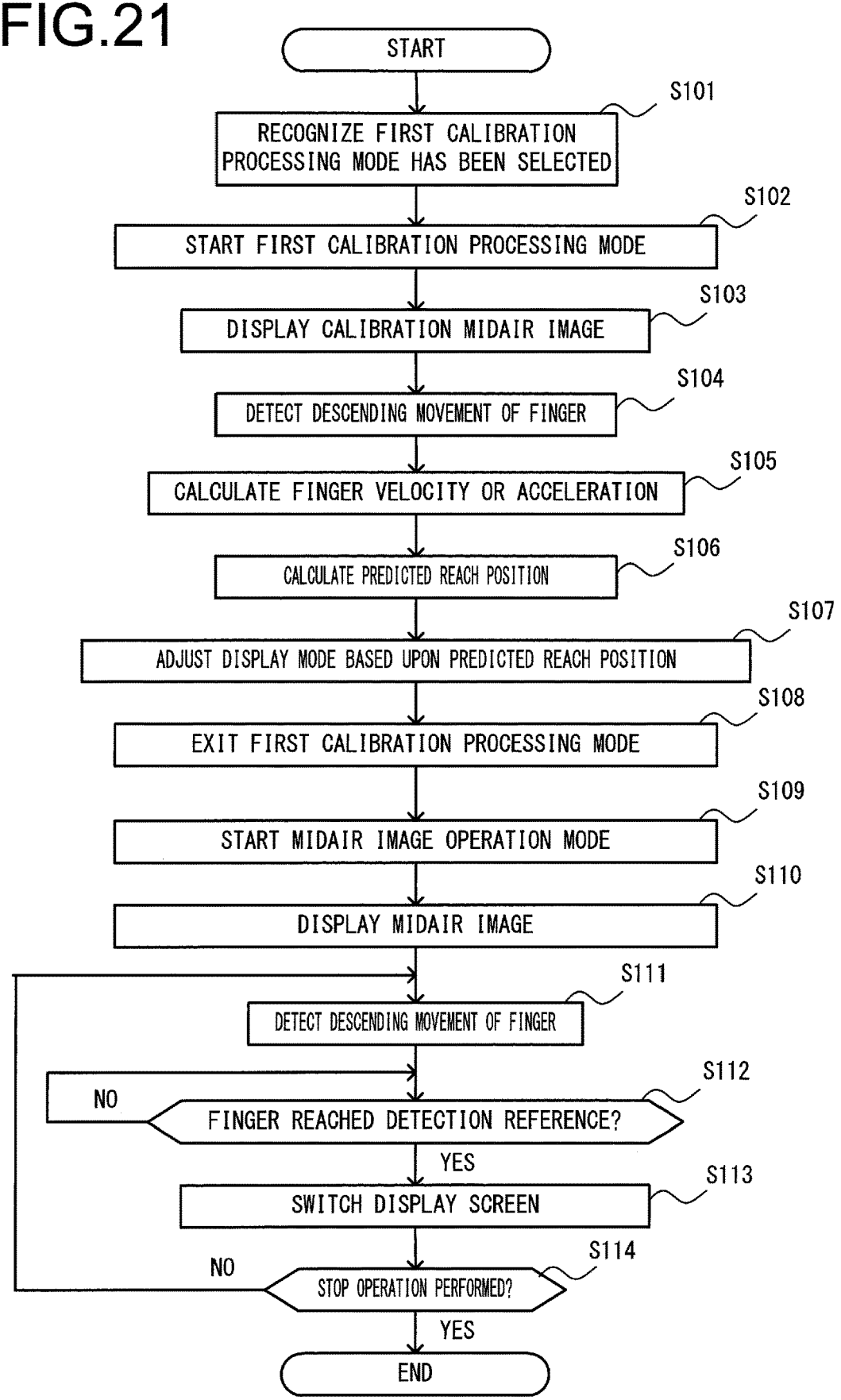
FIG. 21 A flowchart of the calibration processing executed in the first calibration processing mode in variation 3 of the first embodiment FIG. 22 A schematic illustration of a midair image brought up on display in the first calibration processing mode in variation 5 of the first embodiment FIG. 23 Illustrations of the calibration processing executed in variation 5 of the first embodiment, in sectional views, each indicating the relationship among the operation detector, the midair image, the detection reference and the finger position in (a) and FIG. 24 A flowchart of the calibration processing executed in the first calibration processing mode in variation 4 of the first embodiment FIG. 25 A block diagram showing the essential configuration of the display device in variation 8 of the first embodiment FIG. 26 Illustrations of the display device in variation 9 of the first embodiment, in a perspective showing the external appearance of the display device presented in (a) and in a block diagram showing the essential configuration of the display device in (b)

Next, the processing executed in the first calibration processing mode in the display device 1 in variation 3 will be explained in reference to FIG. 20 and FIG. 21. The processing executed in steps other than step S104 through step S107 in the flowchart presented in FIG. 21 is identical to that in the flowchart presented in FIG. 10, and accordingly, a repeated explanation is not provided. As the fingertip F moves into the predetermined detection range 13A of the operation detector 13, as shown in FIG. 11(*a*), the operation detector 13 detects the movement of the fingertip F as a change in the electrostatic capacitance value in step S104. In step S105, the velocity·acceleration detection unit 206 calculates the velocity or the acceleration of the movement of the fingertip F based upon the detection output provided by the operation detector 13. In step S106, the reach position predicting unit 207 calculates the reach position for the fingertip F based upon the velocity or the acceleration of the movement having been calculated by the velocity·acceleration detection unit 206. The reach position for the finger calculated by the reach position predicting unit 207, i.e., predicted by the reach predicting unit 207, is indicated by a dotted line 60 in FIG. 20(*b*). In step S107, the image generation unit 201 adjusts the display mode for the icon 300A based upon the predicted reach position 60, as indicated in FIG. 20(*b*). The image generation unit 201 stores data indicating the change quantity indicating the extent to which the size of the icon 300A is altered and the displacement quantity, with respect to the extent to which the display position is moved, into the storage unit 205. In a subsequent step S110, the image generation unit 201 generates, based upon the stored data, display image data expressing a midair image 30 with the display mode for an icon 30A adjusted, and the display control unit 202 brings up the display data on display as a midair image 30 in the midair image operation mode. It is to be noted that the reach position for the finger may be predicted based upon both the velocity and the acceleration of the finger movement or based upon either one of them.

It is to be noted that the velocity·acceleration detection unit 206 reads out the electrostatic capacitance value detected by the operation detector 13 after predetermined time intervals, calculates the velocity of the finger movement based upon a change occurring in the electrostatic capacitance value over each predetermined time interval and calculates the acceleration of the finger movement based upon the velocity thus calculated in the description provided above. However, the present invention is not limited to this method and it may be adopted in conjunction with a velocity·acceleration detection unit 206 configured with an image-capturing device. In addition, while the velocity·acceleration detection unit 206 calculates the velocity or the acceleration of the user's finger movement in the example described above, the velocity or the acceleration of the movement of the user's foot or elbow or the movement of a stylus pen held by the user may be calculated instead.

It is to be also noted that the reach position predicting unit 207 calculates a predicted reach position 60 for the user's finger based upon the velocity or the acceleration of the movement of the user's finger having been calculated and the image generation unit 201 adjusts the display mode for the midair image 30 based upon the predicted reach position 60 calculated for the user's finger. However, the reach position predicting unit 207 does not need to determine the predicted reach position 60 for the user's finger for each operation. If a predicted reach position 60 is calculated based upon an unintended movement of the user's finger occurring prior to a user operation, the display mode for the icon 30A or 300A may be adjusted too frequently and it may become difficult to guide the user's fingertip F to the optimal position. Such an undesirable result can be prevented by engaging the reach position predicting unit 207 in calculation of a reach position 60 and the image generation unit 201 in adjustment of the display mode for the midair image 30 based upon the predicted reach position 60 only when the velocity·acceleration detection unit 206 has detected a velocity and an acceleration of the user's finger movement each represented by a value equal to or greater than a predetermined threshold value.

In variation 3, in which the reach position 50 for the finger is predicted based upon the velocity or the acceleration of finger movement, calibration processing can be executed promptly.

While the calibration processing in this variation is adopted in the first calibration processing mode in the first embodiment in the example described above, the calibration processing may also be adopted in the second calibration processing mode. In the latter case, the processing in step S105 and step S106 in the flowchart presented in FIG. 21 will be executed after step S24 in the flowchart presented in FIG. 12 in reference to which the first embodiment has been described. Subsequently, the display mode for the midair image 30 will be adjusted based upon the predicted reach position 60 calculated in step S28 and step S32 without executing the processing in step S27 and step S29 in FIG. 12. By adopting variation 3 in the second calibration processing mode, it becomes possible to estimate in advance the reach position for the fingertip F of the user performing a midair image operation before the fingertip F reaches the detection reference 40 and the display mode for the midair image 30 can be adjusted based upon the predicted reach position. This means that even when the fingertip F of the user does not reach the detection reference 40, the user is comfortably able to perform an operation since an error such as a failure to execute icon display switchover can be prevented.

(Variation 4 of the First Embodiment)

In the first embodiment and variations 1 through 3 of the first embodiment, the display device 1 detects or predicts the reach position, and the image generation unit 201 adjusts the display mode for the midair image 30 based upon the distance between the reach position 50 and the detection reference 40 through a single session of calibration processing. As an alternative, the image generation unit 201 adjusts the display mode for the midair image 30 in the midair image operation mode based upon the distances between the reach positions detected through a plurality of sessions of calibration processing and the detection reference in the display device 1 in variation 4.

In the first session of the calibration processing, the detection reference control unit 204 determines the reach position 50 for the finger based upon the detection output provided from the operation detector 13. The image generation unit 201 calculates a change quantity with respect to the size of the icon 300A and a displacement quantity with respect to the display position based upon the reach position 50. The image generation unit 201 stores data indicating the change quantity and the displacement quantity thus calculated into the storage unit 205. A second session of the calibration processing is executed in succession and data indicating a change quantity and a displacement quantity are stored into the storage unit 205 in a similar manner. A third session of the calibration processing may be executed in succession following this session. Based upon the data indicating a plurality of sets of change quantities and displacement quantities stored in the storage unit 205 through the plurality of sessions of calibration processing having been executed successively as described above, the image generation unit 201 selects a single set of change quantity and displacement quantity for an icon 30A in a midair image 30 displayed in the midair image operation mode.

The display mode for a given icon 30A may be determined by using the plurality of sets of change quantities and displacement quantities through any of various procedures. For instance, the image generation unit 201 may calculate a single change quantity or displacement quantity for the icon 30A as the arithmetic mean of the plurality of change quantities or displacement quantities or as the geometric mean of the plurality of sets of change quantities and displacement quantities. As an alternative, the image generation unit 201 may determine a new change quantity or displacement quantity by applying optimal weight to each of the plurality of change quantities or displacement quantities. For instance, the image generation unit 201 may calculate a change quantity or displacement quantity for the icon 30A by weighting the change quantity or the displacement quantity $H_N$ determined through an Nth session and the change quantity or displacement quantity $H_N+1$ determined through an N+1th session at a ratio of 3:7. In more specific terms, using $H_N$ and $H_N+1$, the image generation unit 201 calculates a change quantity or displacement quantity for the icon 30A based upon the results of calculation executed as expressed as; $(H_N \times 3 + H_N+1 \times 7)/10$. The weighting ratio used in this calculation is not limited to 3:7 and the number of sessions is not limited to 2, either. Furthermore, it will be obvious that instead of individually calculating a change quantity and a displacement quantity based upon the reach position for the finger and storing them into the storage unit 205 in correspondence to each of the plurality of sessions of the calibration processing, reach positions for the finger, each detected in correspondence to a plurality of sessions of the calibration processing, may be stored into the storage unit 205 and a single change quantity or displacement quantity for the icon 30A may be calculated based upon the plurality of reach positions thus stored.

In addition, the image generation unit 201 does not need to adjust the display mode for the midair image 30 if the distance between the reach position 50 and the detection reference 40 is equal to or less than a predetermined value, i.e., if the reach position 50 is close to the detection reference 40.

Furthermore, the image generation unit 201 does not need to adjust the display mode for the icon 30A through each session of the calibration processing. Instead, the control unit 20 may calculate the number of times an operation at the icon display position has failed based upon the number of times that the reach position 50 has been determined and the number of times the reach position 50 has been judged to actually reach the detection reference 40 through a plurality of sessions of the calibration processing. The image generation unit 201 may adjust the display mode for the icon 30A only if the number of times a failure has occurred is judged to be equal to or greater than a predetermined value.

While the calibration processing in this variation is adopted in the first calibration processing mode in the first embodiment in the example described above, the calibration processing may also be adopted in the second calibration processing mode and in any of variations 1 through 3.

In the calibration processing executed in variation 4 described above, the control unit 20 determines the reach position 50 by detecting a natural operating motion that the user would normally make when performing an operation at the display position of an icon 30A in a midair image 30. Namely, the control unit 20 determines the furthest reach position 50 by detecting a downward movement of the finger as if to press down on the icon, which then shifts to an upward movement, or detecting a movement of the finger as if to come into contact with the icon, and then hold down the icon briefly. Thus, the calibration processing can be executed without the user being aware of the reach position 50 being detected and/or determined through the calibration processing, i.e., without the user being aware that calibration processing is in progress.

(Variation 5 of the First Embodiment)

In the first embodiment, the operation detector 13 determines the reach position 50 by detecting an operation the user performs with his finger at the display position of the midair image 30 and the image generation unit 201 adjusts the display mode for the midair image 30 based upon the reach position 50. As an alternative, the user may be allowed to specify the finger position at which he has experienced a perception of performing an operation at the display position of an icon in the midair image, and in such a case, the detection reference control unit 204 may recognize the specified position and the image generation unit 201 may adjust the display mode for the icon 30A based upon the specified position. The following is a description of a variation in which the user indicates the position at which he has had a perception of performing an operation at the display position of the midair image as a specified position. It is to be noted that while an example in which variation 5 is adopted in the first calibration processing mode in the first embodiment is described below, it may also be adopted in the second calibration processing mode and in variations 1 through 4 described earlier.

Figure 22:
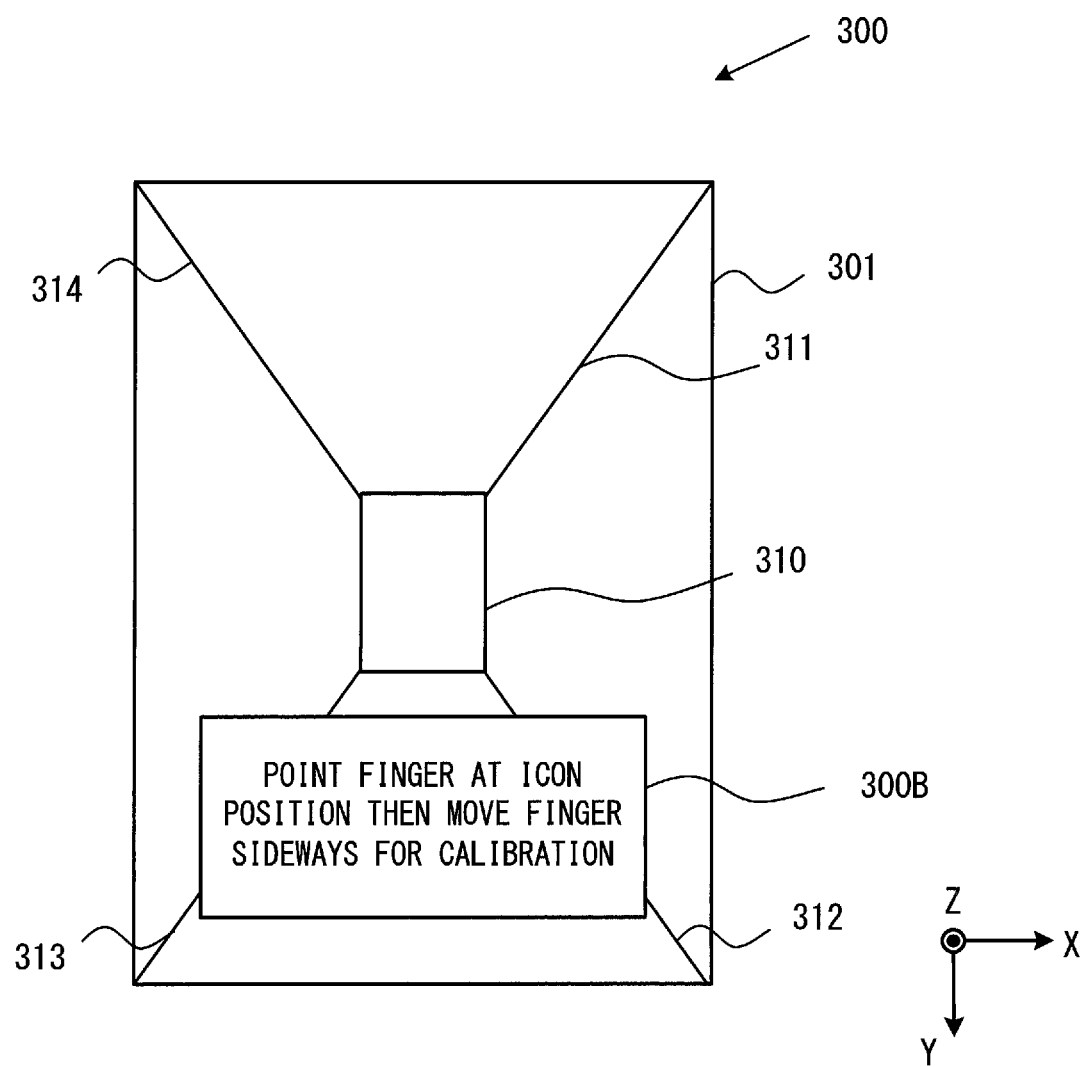

The following is a description of the display device in variation 5. As the display device 1 is started up and the user operates the calibration processing mode selector operation button to select the first calibration processing mode, the calibration unit 203 in FIG. 2 starts the first calibration processing mode. The image generation unit 201 generates display image data, and the display unit 11 brings up a display image to be used in the calibration processing based upon the display image data. FIG. 22 shows the display image generated for the calibration processing brought up as a midair image 300. The midair image 300 includes an icon 300B for calibration, and a message "Point at this icon with finger and move the finger sideways for calibration" is superimposed on the calibration icon 300B. In addition, the detection reference control unit 204 sets the detection reference 40 to an initial position near the midair image 300, as indicated in FIG. 23(*a*).

Figure 23:
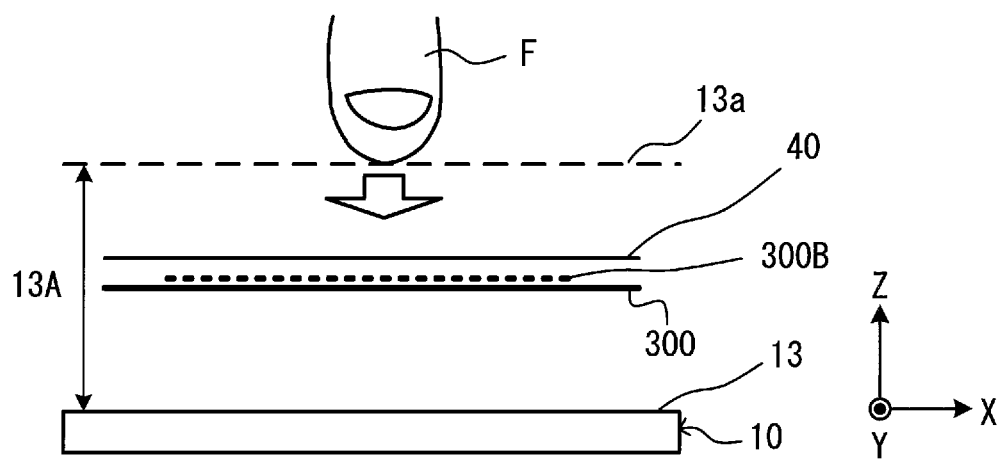
Figure 23:
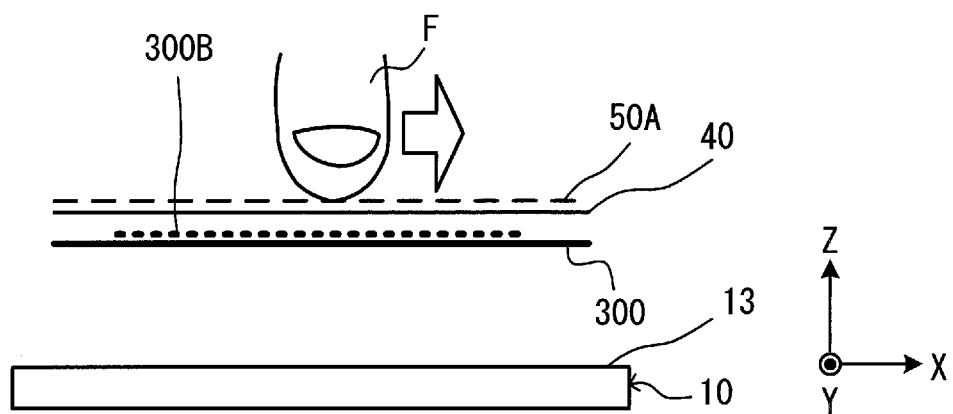

The user, following the instructions in the message superimposed on the icon 300B, moves his fingertip F down toward the icon 300B, as shown in FIG. 23(*a*), in order to perform an operation at the display position of the icon 300B. As the fingertip F reaches the electrostatic capacitance detection range 13A of the operation detector 13 shown in FIG. 2, the operation detector 13 detects the movement of the user's fingertip F toward the icon 300B, i.e., the downward movement, as a change in the electrostatic capacitance.

The user moves his finger further downward and upon feeling that the fingertip F has reached the display position of the icon 300B in the midair image 300, he moves the finger F sideways, as indicated by the arrow in FIG. 23(*b*). The operation detector 13 detects the downward movement and the lateral movement of the finger F. The detection reference control unit 204 designates the heightwise position of the finger F at the time point at which it determines that the downward movement has switched to lateral movement as the operation detector 13, having detected a downward movement of the finger thus far, detects a lateral movement of the finger F, as a specified position 50A. The image generation unit 201 adjusts the display mode for the icon 300B, i.e., calculates a change quantity with respect to the size of the icon 300B and a displacement quantity with respect to its display position, based upon the specified position 50A. Data indicating the change quantity and the displacement quantity for adjustment are stored into the storage unit 205. It is to be noted that while the specified position 50A is located further upward relative to the midair image 300 in the example presented in FIG. 23(*b*), the specified position 50A, i.e., the position at which the user experiences a perception as if his fingertip F has reached the icon 300B in the midair image 300, may be in alignment with the midair image 300 or may be further downward relative to the midair image 300.

It is to be noted that the detection reference control unit 204 designates the heightwise position taken by the finger when the downward movement of the finger F has shifted to the lateral movement as the specified position 50A in the description provided above, the present invention is not limited to this example. The detection reference control unit 204 may instead designate the height of the finger F at the end of the lateral movement following the downward movement as the specified position 50A. As a further alternative, the detection reference control unit 204 may designate the average or the median of the heights of the finger F assumed during the period of time elapsing between the start of the lateral movement of the finger F and the end of the lateral finger movement as the specified position 50A. As described above, the specified position 50A, at which the operation has been detected, is detected by the detection reference control unit 204.

Figure 24:
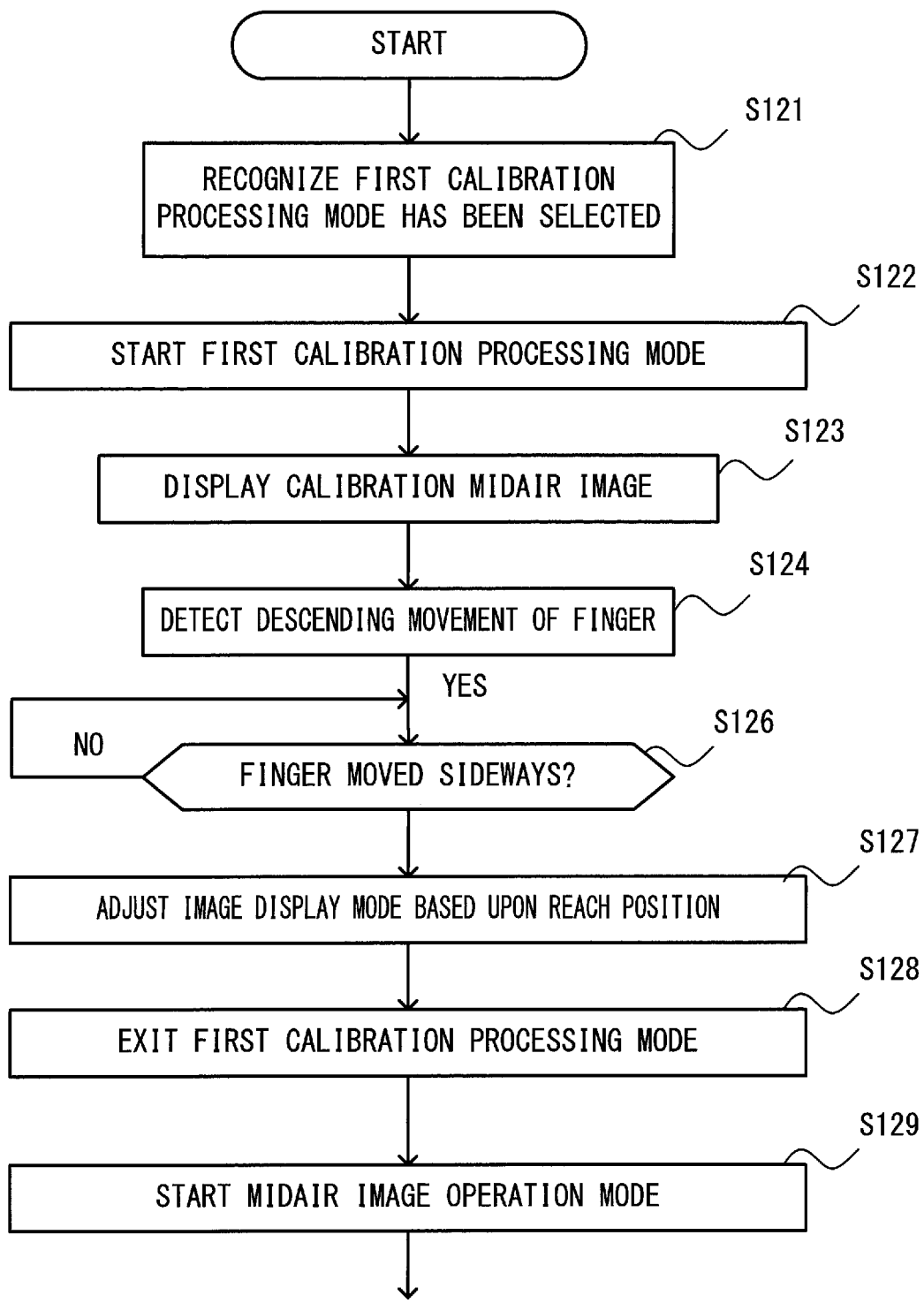

In reference to the flowchart presented in FIG. 24, the calibration processing executed in variation 5 will be described. It is to be noted that the flowchart in FIG. 24 only shows the processing executed in step S121 through step S129 and does not show the processing executed in subsequent steps. The processing executed in step S129 and subsequent steps is similar to the processing executed in step S109 and subsequent steps in the flowchart presented in FIG. 21.

The processing executed in step S121 through step S124 is similar to that executed in step S1 through step S4 in the flowchart presented in FIG. 10. In step S126, the operation detector 13 detects the lateral movement of the user's finger. In step S127, the detection reference control unit 204 decides, based upon the detection output from the operation detector 13, that a shift has occurred in the movement of the finger F from the downward movement to the lateral movement, designates the position taken by the finger F at the time of the shift as the specified position 50A. The image generation unit 201 adjusts the display mode for the icon 300B based upon the specified position 50A and stores data indicating the change quantity for the icon size and the displacement quantity for the icon display position into the storage unit 205 before the operation proceeds to step S128. In step S128, the first calibration processing mode ends and the operation proceeds to step S129. In step S129, the midair image operation mode starts. In the midair image operation mode, the image generation unit 201 adjusts the display mode for the icon 300B based upon the data indicating the change quantity and the displacement quantity read out from the storage unit 205.

It is to be noted that while the processing executed in the first calibration processing mode is explained above, processing will be executed in the second calibration processing mode as shown in the flowchart presented in FIG. 12, in reference to which the first embodiment has been described. However, if the detection reference control unit 204 detects that the finger F, having been moving downward, has switched to a lateral movement through detection of an operation performed by the user with respect to the icon 30A in step S24 in the flowchart presented in FIG. 12, the specified position 50A is determined instead of the reach position in step S27 and step S30. If the specified position 50A is determined in step S30, the detection reference control unit 204 makes a decision in step S30 as to whether or not the specified position 50A is in alignment with the position of the detection reference 40.

While the calibration processing in variation 5 is in progress, the user specifies a position at which he experiences a perception of having performed an operation at the display position of the midair image 300 with his finger F by switching the movement of his finger F from a downward movement to a lateral movement. In other words, the calibration processing is executed by the display device 1 by allowing the user to specify a position perceived as the display position operation position with respect to the icon 300B and thus, accurate calibration processing is enabled. In addition, indicating the specified position by switching the movement of the finger F from a downward movement to a lateral movement assures good operability and the calibration processing can be executed promptly.

(Variation 6 of the First Embodiment)

The user operating the display device 1 in variation 5 indicates the position at which he experiences a perception of performing an operation at the icon display position with his finger as a specified position by switching his finger movement from a downward movement to a lateral movement. The user of the display device 1 in variation 6 indicates the position at which he experiences a perception of performing an operation at the icon display position with his finger by operating another icon. The calibration processing executed in this variation will be described next. It is to be noted that while an example in which variation 6 is adopted in the first calibration processing mode in the first embodiment is described below, it may also be adopted in the second calibration processing mode and in variations 1 through 5 described earlier.

As the display device 1 is started up and the user operates the calibration processing mode selector operation button to select the first calibration processing mode, the calibration unit 203 in FIG. 2 starts the first calibration processing mode. The image generation unit 201 generates display image data, and the display unit 11 brings up a display image to be used in the calibration processing based upon the display image data. A midair image 300 brought up in this situation includes the icon 300B for calibration, shown in FIG. 22 in reference to which variation 5 of the first embodiment has been described, and another icon displayed near the icon 300B (e.g., to the left in the drawing). A message "Touch the icon on the left side with a finger of your left hand while pointing to this icon with a finger of your right hand for calibration", instead of the message shown FIG. 22, is superimposed on the calibration icon 300B.

The user, following the instructions in the message superimposed at the icon 300B, moves a fingertip F of his right hand down toward the icon 300B in order to perform an operation at the display position of the icon 300B. As the fingertip reaches the electrostatic capacitance detection range 13A of the operation detector 13, the operation detector 13 detects the movement of the user's finger moving closer to the display position of the icon 300B, i.e., the downward movement of the finger, as a change in the electrostatic capacitance. The user moves his finger further downward and as soon as he experiences a perception of the fingertip F performing an operation at the display position of the icon 300B in the midair image 300, he moves a fingertip of his left hand toward the other icon displayed near the icon 300B in order to perform an operation at the display position of the other icon with the fingertip F of his left hand as directed in the message. The operation detector 13 detects the movement of the fingertip F toward the other icon. The detection reference control unit 204 designates the position taken by the fingertip in the user's right hand at the time point at which the operation detector 13 detects that the user's finger is positioned on the other icon as a specified position 50A. The image generation unit 201 adjusts the display mode for the icon 300B by calculating, based upon the specified position 50A, a change quantity by which the size of the icon 300B is to be altered and a displacement quantity by which the display position is to move as it does in the first embodiment. The image generation unit 201 then stores data indicating the change quantity for the icon size and the displacement quantity for the icon display position having been calculated into the storage unit 205.

It is to be noted that since the position taken by the right hand finger when the user experiences a perception of performing an operation at the display position of the right hand-side icon 300B is designated as the specified position, the right hand finger needs to move down toward the midair image 300. However, the left hand finger only needs to be positioned above or below the other icon to perform an operation at the display position of the other icon on the left hand-side and thus, it is not strictly necessary to move the left hand finger downward. Namely, the left hand finger may move along, for instance, a direction parallel to the plane of the midair image 300, i.e., along a lateral direction, until it reaches a point above or below the other icon.

Furthermore, it is not essential that a left hand finger and a right hand finger be used, as long as the operations described above can be detected both on the icon 300B and on the other icon in the calibration midair image 300. For instance, these operations may be performed by using two fingers of one hand on either side. In addition, instead of performing an operation at the display position of the other icon, the user may press an OK button (not shown) at the display device 1 in variation 6.

Moreover, instead of designating the position taken by the right hand fingertip when the user performs an operation at the display position of the other icon or when the user presses the OK button (not shown) as the specified position, the position of the right hand fingertip assumed when the user makes a predetermined gesture with his left hand may be designated as the specified position. In such a case, the display device 1 will include an image-capturing device 18 in variation 9 to be described later (see FIGS. 26 and 27) so that a user gesture (e.g., the hand switching from the sign "stone" to the sign "paper") is detected by using images obtained via the image-capturing device 18.

In reference to the flowchart presented in FIG. 24 pertaining to variation 5 of the first embodiment, the calibration processing executed in the variation will be described. The following explanation will focus on the primary differences from the processing having been described and an explanation of steps in which similar processing is executed is not provided. In step S123 in FIG. 24, the icon 300B and the other icon are brought up on display, and in step S124, the operation detector 13 starts detection of a downward movement of the fingertip in the user's right hand. The user moves his finger further downward and then performs an operation at the display position of the other icon with his left hand fingertip at the time point at which he experiences a perception of the right hand fingertip performing an operation at the display position of the icon 300B in the midair image 300. In step S127, the position taken by the right hand fingertip at the time point at which the user has performed an operation at the display position of the other icon with his left hand is designated as the specified position 50A and the image generation unit 201 adjusts the display mode for the icon 300B based upon the specified position 50A. At this time, too, data indicating the size change quantity and the display position displacement quantity for adjustment are stored into the storage unit 205.

It is to be noted that while the processing executed in the first calibration processing mode is explained above, processing will be executed in the second calibration processing mode as shown in the flowchart presented in FIG. 12, in reference to which the first embodiment has been described. However, in step S24 in the flowchart presented in FIG. 12, the detection reference control unit 204 detects an operation performed by the user with respect to the icon 30A by using his right hand. While the user is performing an operation for the icon 30A with his right hand, the detection reference control unit 204 may detect an operation performed by the user using his left hand at the display position of the other icon. In such a case, the detection reference control unit 204 determines that the position of the fingertip of the user's right hand is the specified position 50A, instead of determining the reach position, in step S27 and step S29. In step S30, a decision is made as to whether or not the specified position 50A determined in step S29 is in alignment with the detection reference 40.

In variation 6, the user indicates a specified position at which the finger operates the icon during the calibration processing by operating another icon or by operating the OK button at the display device 1. The calibration processing allowing the user to specify the position at which he perceives the icon 300B can be executed with high accuracy in the display device 1. In addition, by allowing the user to indicate the specified position through an operation at another icon or at a button at the display device, the calibration processing can be executed promptly.

(Variation 7 of the First Embodiment)

The user of the display device in variation 7, perceiving that he has performed an operation at the display position of an icon with his fingertip, indicates a specified position by holding the finger still for a predetermined length of time. It is to be noted that while an example in which variation 7 is adopted in the first calibration processing mode in the first embodiment is described below, it may also be adopted in the second calibration processing mode and in variations 1 through 6 described earlier.

In this variation, a message "Point at this icon and hold the finger still for a moment for calibration" is brought up in a superimposed display in an icon included in the calibration midair image. The user, perceiving that he has performed an operation at the icon display position, briefly holds the finger still and, in response, the operation detector 13 detects cessation of the downward movement of the finger over a predetermined length of time. The detection reference control unit 204 designates the position at which the finger is held still as the specified position based upon the detection output provided by the operation detector 13 at this time.

The specified position is determined as described below. Namely, it is decided that an operation has been performed at the display position of an icon 300A when the fingertip F, having been moving downward, comes to a stop and is held still within a relatively small predetermined holding range taken along the up/down direction over a length of time equal to or greater than a predetermined time length. It is decided that an operation has been performed at the display position of the icon 300A with the fingertip F when the fingertip F stays within the specific holding range over the predetermined time length or longer, as described above, based upon the following rationale. Namely, the user operation at the display position of the icon 300A in the midair image 300 is different from an operation performed at a touch panel and the fingertip F may not become completely still at the display position of the icon 300A. It is to be noted that the predetermined holding range in reference to which the specified position is determined will be set to a value sufficiently small relative to the electrostatic capacitance detection range 13A of the operation detector 13, e.g., 5 mm, and the predetermined time length will be set to, for instance, 2 sec.

In variation 7, the user specifies a position at which he performs an icon operation with his finger by holding the fingertip F still during the calibration processing. Since the user is able to specify the position at which he perceives the icon 300A to be located, the display device 1 is able to execute accurate calibration processing.

(Variation 8 of the First Embodiment)

The user of the display device in variation 8 indicates with his voice the specified position at which he experiences a perception of performing an operation with his fingertip at an icon display position. It is to be noted that while an example in which variation 8 is adopted in the first calibration processing mode in the first embodiment is described below, it may also be adopted in the second calibration processing mode and in variations 1 through 7 described earlier.

Figure 25:
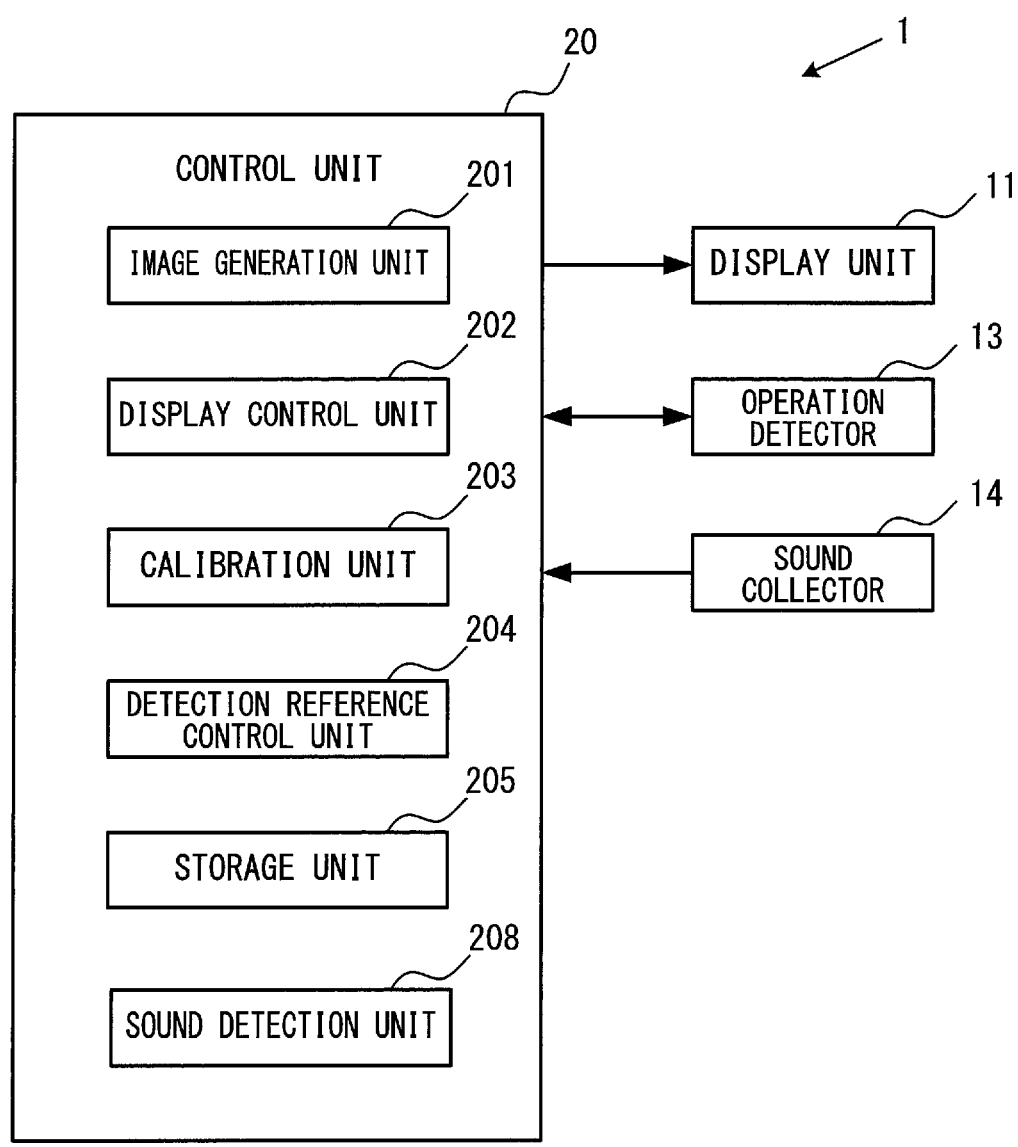

FIG. 25 is a block diagram showing the control unit 20, and the display unit 11 and an operation detector 13 controlled by the control unit 20, among the structural components in the display device 1 in this variation. The display device 1 includes a sound collector 14, with a sound detection unit 208 installed in the control unit 20. The sound collector 14 collects sound around the display device 1 and outputs the collected sound as audio data to the sound detection unit 208. The sound collector 14 may be a commonly available microphone. The sound detection unit 208 designates the audio data provided from the sound collector 14 and makes a decision as to whether or not the audio data express the word "yes".

After the calibration unit 203 in FIG. 25 starts up the first calibration processing mode, the image generation unit 201 generates display image data, and the display unit 11 brings up a display image to be used in the calibration processing based upon the display image data. A midair image 300 brought up on display in this situation includes the calibration icon 300B shown in FIG. 22 in reference to which variation 5 of the first embodiment has been described, and a message "Touch this icon and say yes for calibration", instead of the message in FIG. 22, is superimposed on the calibration icon 300B.

The user, following the instructions in the message brought up in the superimposed display at the icon 300B, movies his fingertip down toward the icon 300B in order to perform an operation at the display position of the icon 300B. The user says "yes" as directed in the message when he perceives that his fingertip has touched the icon 300B. The operation detector 13 detects the downward movement of the fingertip, and the sound collector 14 picks up the user's voice and outputs it as audio data to the sound detection unit 208. As the sound detection unit 208 decides that the audio data correspond to "yes", the detection reference control unit 204 designates the position taken by the fingertip, detected by the operation detector 13 at the exact time point, as a specified position 50A. The image generation unit 201 adjusts the display mode for the icon 300B by calculating a change quantity by which the size of the icon 300B is to be altered and a displacement quantity by which the display position is to move as it does in the first embodiment. The image generation unit 201 then stores data indicating the change quantity and the displacement quantity having been calculated into the storage unit 205.

The calibration processing described above will be explained in reference to the flowchart presented in FIG. 24 pertaining to variation 5 of the first embodiment. Since only the calibration processing executed in step S126 in FIG. 24 is distinguishable from that having been explained earlier, the explanation will focus on step S126 in FIG. 24 and a repeated execution of the processing executed in other steps will not be provided. In step S126 in FIG. 24, the sound detection unit 208 makes a decision as to whether or not the user has said "yes" based upon the output from the sound collector 14. If an affirmative decision is made in step S126, i.e., if it is decided that the user, perceiving that he has touched the icon 300B, has said "yes", the detection reference control unit 204 designates the position of the fingertip assumed at the time point at which the sound detection unit 208 recognizes the word "yes" as the specified position 50A, i.e., determines it to be the specified position 50A.

It is to be noted that while the processing executed in the first calibration processing mode is explained above, processing will be executed in the second calibration processing mode as shown in the flowchart presented in FIG. 12, in reference to which the first embodiment has been described. However, if a user operation performed with respect to the icon 30A is detected in step S24 in the flowchart presented in FIG. 12 and the sound detection unit 208 recognizes the word "yes", the detection reference control unit 204 designates the specified position 50A instead of determining the reach position in step S27 and step S29. In step S30, a decision is made as to whether or not the specified position 50A designated in step S29 is in alignment with the detection reference 40.

In variation 8, the user vocally indicates the specified position taken by his finger when he perceives that an operation has been performed at the display position of the icon 300B. By allowing the user to indicate the reach position with his voice, the display device 1 is able to execute the calibration processing promptly.

It is to be noted that the display device 1 does not need to include the sound collector 14 and the sound detection unit 208 in such a configuration may execute sound detection by using audio data obtained at an external sound collecting device and input from the external sound collecting device via either a wireless means or a wired means.

(Variation 9 of the First Embodiment)

While the downward movement of the user's fingertip is detected by the operation detector 13 configured with a capacitive panel in the description provided above, the position of the user's fingertip may be detected by an image-capturing device, instead. The display device 1 in variation 9 includes an image-capturing device (e.g., a digital camera) 18 to function as an operation detector, disposed at the upper surface of the display device 1, as shown in FIG. 26(a). A block diagram pertaining to such a display device 1 is provided in FIG. 26(b).

The control unit 20 of the display device 1 in the block diagram presented in FIG. 26(b) includes an image analysis unit 210. The image-capturing device 18 captures an image of an object located above the display unit 11, i.e., the user's finger, and the captured image is input to the image analysis unit 210. The image analysis unit 210 determines the position of the user's fingertip by analyzing the captured image input from the image-capturing device 18. Namely, the image analysis unit 210 makes a decision based upon the position of the image of the finger within the captured image, with respect to a specific icon, among the plurality of icons, being operated with the user's fingertip. In addition, the image analysis unit 210 compares the size of the finger image within the captured image with a standard finger size, and more specifically, with the size of a finger at a predetermined heightwise position, an image of which has been captured in advance, so as to determine the heightwise position of the finger, i.e., the position taken by the descending finger. Through this process, the position of the user's fingertip within the three-dimensional space can be determined. The display device 1 in variation 9 structured as described above is capable of obtaining, through analysis of the captured image provided via the image-capturing device 18, information similar to the information pertaining to the fingertip position obtained via the operation detector 13 configured with a capacitive panel. Thus, the display device in variation 9 is able to execute processing similar to that executed in the embodiment and the variations thereof described earlier, by using the image-capturing device 18 instead of the capacitive panel having been described in reference to the embodiment and the variations 1 through 8 thereof.

While the image analysis unit 210 in the display device 1 in variation 9 calculates the heightwise position of the finger based upon the size of the finger in the captured image, the image-capturing device 18 may instead detect the heightwise position of the finger via a phase focus detection device and an image recognition device mounted in the digital camera. In more specific terms, the image recognition device may recognize a finger, the phase focus detection device may detect a defocus quantity with respect to the finger recognized by the image recognition device and the heightwise position of the finger may be calculated based upon the defocus quantity. Furthermore, the heightwise position of the finger may be likewise detected via a contrast focus detection device that may be mounted in the digital camera instead of the phase focus detection device.

It may be ideal to configure the image-capturing device 18 with a camera having installed therein a TOF (time of flight) device instead of a phase focus detection device or a contrast focus detection device. A TOF camera emits infrared radiation from the camera body, receives infrared light that is reflected off a target object and then enters the TOF camera, and calculates the distance from the TOF camera to the target object based upon a phase change having occurred in the received light relative to the emitted light. Accordingly, by designating the user's fingertip as the measurement target object, emitting infrared light from the TOF camera toward the user's fingertip and receiving light reflected from the fingertip, the distance from the TOF camera to the user's fingertip can be determined. It is desirable that the image-capturing device 18 include an image-capturing lens constituted with a wide-angle lens so as to cover the entire midair image 30 and such an image-capturing lens may be a fisheye lens. In addition, the display device may include a plurality of image-capturing devices (e.g., two image-capturing devices) and the position of the user's fingertip may be detected based upon captured images provided from the plurality of image-capturing devices.

Figure 27:
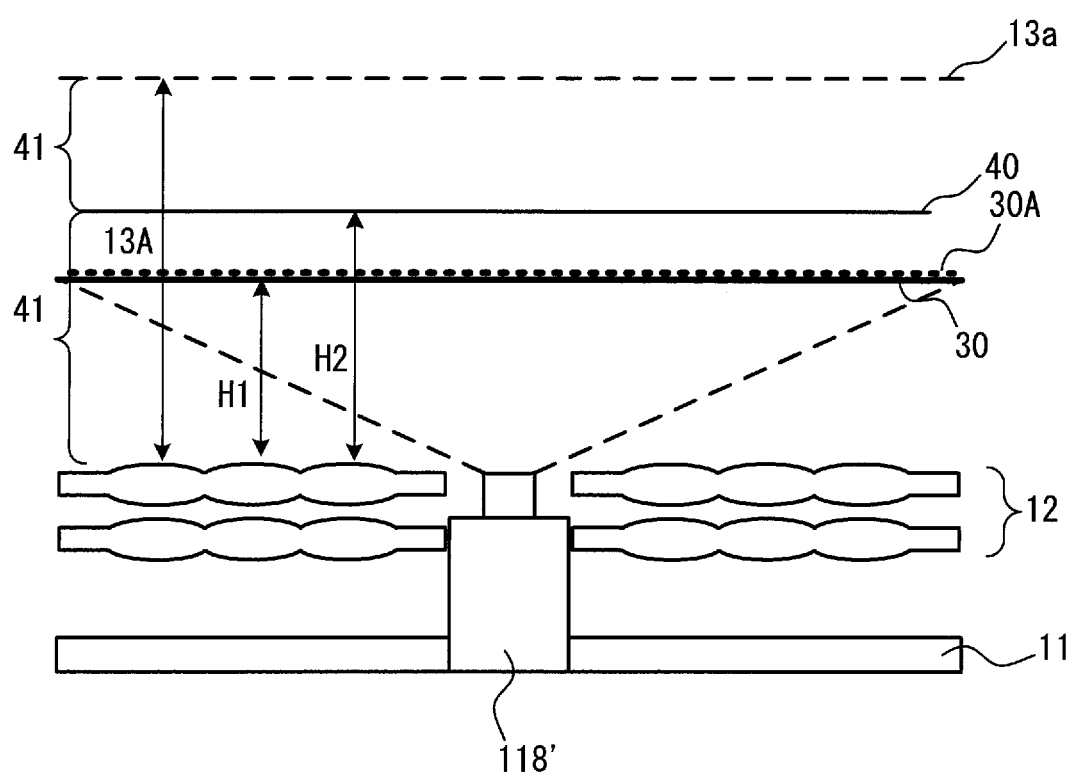
FIG. 27 A sectional view of the internal structure in the display device in variation 9 of the first embodiment FIG. 28 Illustrations each presenting an example of a midair image that may be brought up on display via the display device 1 in a second embodiment, with an initial display shown in (a) and midair images, each brought up on display after the display mode is adjusted, shown in (b) and (c)

FIG. 27 presents an example of a display device 1 equipped with a TOF camera. FIG. 27 simply shows the internal structure of the display device 1 and does not provide an illustration of the display device body. As FIG. 27 shows, an installation space for a TOF camera 118' is formed so as to take up a position corresponding to the centers of a display unit 11 and an image-forming optical element 12, and the TOF camera 118' is disposed in this installation space. The TOF camera 118' radiates infrared light onto the user's fingertip by scanning infrared light over a predetermined range and measures the distance from the TOF camera 118' to the user's fingertip based upon a change in the phase of reflected light. Based upon the distance and the infrared emission direction, the position of the user's fingertip in the three-dimensional space relative to the TOF camera 118' can be determined. In other words, the specific position within the midair image plane corresponding to the fingertip position and the distance that sets the fingertip position apart from the surface of the display device 1 can be determined. Information similar to detection information indicating the fingertip position obtained in conjunction with a capacitive panel can thus be obtained based upon the range-finding results provided by the TOF camera 118'. It is to be noted that while an installation space for the TOF camera 118' is formed so as to take up an area corresponding to the centers of the display unit 11 and the image-forming optical system 12 and the TOF camera 118' is disposed in this space in the description provided above, the present invention is not limited to this example and it may be adopted in a configuration that includes a TOF camera 118' installed outside the display unit 11.

At the display device 1 in variation 9, too, a midair image 30 is formed at a position above the image-forming optical system 12 of the display device 1, set apart from the image-forming optical system 12 by a distance H1, and the detection reference 40 is set at a position above the image-forming optical system 12, set apart from the image-forming optical system 12 by a distance H2 (H1<H2), as shown in FIG. 27. The TOF camera 118' assumes a detection range 13A for detection of the user's fingertip position, set further upward relative to the surface of the image-forming optical system 12. In FIG. 27, the limit to the range over which images can be captured is indicated by a dotted line 13a above the TOF camera 118' and the detection range 13A is defined by the detection limit 13a and the surface of the image-capturing optical system 12. In variations 9, too, the midair image 30 and the detection reference 40 are set inside the detection range 13A, as in the first embodiment and variations 1 through 8 described earlier. It is to be noted that while the detection reference 40 in FIG. 27 is set further upward relative to the midair image 30, it may instead be set further downward relative to the midair image 30 or in alignment with the position of the midair image 30, as long as it is set within the detection range 13A. In addition, a range other than the zone set as the detection reference 40 within the detection range 13A is referred to as a detection reference outside range 41 in the description of variation 9. It is to be noted that instead of setting the detection range 13A by defining the limit to the range over which an image can be captured with the TOF camera 118', the detection range 13A may be set as a range made up with part of the range over which an image can be captured by taking off part of the image-capturing enabled range (e.g., predetermined ranges at the left and the right ends in FIG. 27).

The display device 1 in variation 9 described above includes an image-capturing device 18 instead of an operation detector 13 configured with a capacitive panel. However, the display device 1 may include both an operation detector 13 and an image-capturing device 18. In such a case, the detection range 13A of the operation detector 13 shown in FIG. 3 may be divided into, for instance, two parts, i.e., a top part and a bottom part, so as to form a lower detection range (a detection range closer to the display unit 11) and an upper detection range (a detection range further away from the display unit 11), and the lower detection range and the upper detection range may be respectively designated as the detection range for the capacitive panel and as the detection range for the image-capturing device 18. In this configuration, as the user moves his finger downward in order to perform an operation at the display position, the image-capturing device 18 detects the first half of the descending movement of the finger and the capacitive panel detects the second half of the descending movement of the finger. Generally speaking, highly accurate detection is enabled via the capacitive panel over a range set above and in close proximity to the display unit 11, whereas it may not always be possible to capture an image with the image-capturing device 18 over a range set above and in very close proximity to the display unit 11. For this reason, it is desirable to assign different detection ranges to the capacitive panel and the image-capturing device 18 as described above. It is to be noted that the detection range 13A does not need to be divided into two equal parts along the up/down direction and instead, it may be divided into parts that are not equal. In addition, an operation detector 13 configured with another device, such as a proximity sensor, instead of the capacitive panel or the image-capturing device 18, may be used. This means that detection ranges formed by dividing the detection range 13A may be assigned to various operation detectors 13.

The velocity·acceleration detection unit 206 shown in FIG. 19 is also capable of calculating the velocity and the acceleration with which the finger moves based upon a captured image provided by the TOF camera 118' in FIG. 27. Accordingly, in correspondence to each of the upper and lower detection ranges formed by dividing the detection range 13A, the finger movement velocity or the finger movement acceleration may be calculated so as to enable the reach position predicting unit 207 to predict the reach position of the finger.

In addition, instead of the image-forming optical system 12 or 12A, having been explained in reference to the first embodiment and variations 1 through 9 thereof, an image-forming optical system configured with a half mirror and a retro-reflective member may be used. A retro-reflective member may be constituted with a reflecting member that includes, for instance, a plurality of three-dimensional right angle triangular pyramid prisms and reflects light having entered therein back along the same optical path. In a structure that includes such a component, light having departed the display unit 11 is reflected at the half mirror (or transmitted through the half mirror), then enters the retro-reflective member and is then reflected along the same optical path. The light reflected at the retro reflective member forms an image as it advances through the same optical path. The light having departed the retro-reflective member re-enters the half mirror, is transmitted through the half mirror (or is reflected at the half mirror) and forms a midair image by forming an image at a position conjugate with the display unit 11.

It is to be noted that while the display device 1 in the first embodiment and its variations 1 through 9 described above includes at least the control unit 20, the display unit 11 and the operation detector 13, the present invention may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described above may be added as needed in order to realize the various advantages described in reference to the first embodiment or any of variations 1 through 9. In addition, the control device described above may be built into any of various types of electronic devices adopting the first embodiment and the variations thereof.

Furthermore, the present invention may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to achieve the various advantages described in reference to the first embodiment or variations 1 through 9, a structural element among the structural elements described earlier may be added into the detection device as deemed necessary.

Second Embodiment

In reference to drawings, a display device 1 in the second embodiment will be described. The second embodiment will be described in reference to an example in which the display device 1 in the embodiment is mounted in an operation panel. It is to be noted that the display device 1 in the embodiment does not need to be mounted in an operation panel and may be mounted in any type of electronic apparatus as has been explained in reference to the first embodiment and variations thereof.

The display device 1 in the second embodiment may adopt a structure similar to that of the display device 1 in the first embodiment shown in FIG. 1 and FIG. 2. It is to be noted that it may include an image capturing device 18 as does the display device 1 in variation 9 of the first embodiment illustrated in FIG. 26. In addition, any of the various methods described in reference to the first embodiment and the variations of the first embodiment may be applied to the detection of the reach position or the specified position and a display mode for a midair image 30 in the display device 1 in the second embodiment.

Even after the display device 1 adjusts the display mode for an icon 300A, as has been described in reference to the first embodiment and the variations thereof, the operation detector 13 still may not be able to detect a user operation at the detection reference 40, since the icon 300A is displayed as part of a midair image 300 and even after the display mode is adjusted, a given user may perceive the display position of the icon 300A differently from another user. For instance, after the display mode is adjusted so as to create a user perception as if the icon 300A has moved further away from the user, a user may perceive that the icon 300A has moved by an extent equal to or greater than the extent of displacement intended to be perceived through the display mode adjustment. Under such circumstances, the user may perform an operation with respect to the icon 300A by an extent greater than the extent of change in the user operation expected to occur as a result of the display mode adjustment and the fingertip F of the user may thus be positioned further downward (toward the Z direction – side) than the detection reference 40. In another example, even after the display mode for the icon 300A is adjusted, the user may not perceive that the icon 300A has moved at all. Under such circumstances, the user may perform an operation for the icon 300A in the same way as he has done before the display mode adjustment for the icon 300A and thus the fingertip F of the user may not reach the detection reference 40 or may repeatedly pass through the detection reference 40.

The display device 1 in the second embodiment further adjusts the display mode for the icon 300A in such a situation so as to enable detection of a user operation at the detection reference 40. The processing executed when the user operation changes to an excessive extent after the display mode for the icon 300A is adjusted and the processing executed when no change occurs in the user operation even after the display mode for the icon 300A is adjusted will be individually explained below.

The following is an explanation of the calibration processing executed in the embodiment in the first calibration processing mode.

<When the User Operation Changes to an Excessive Extent after the Display Mode for an Icon 30A is Adjusted>

Figure 28:
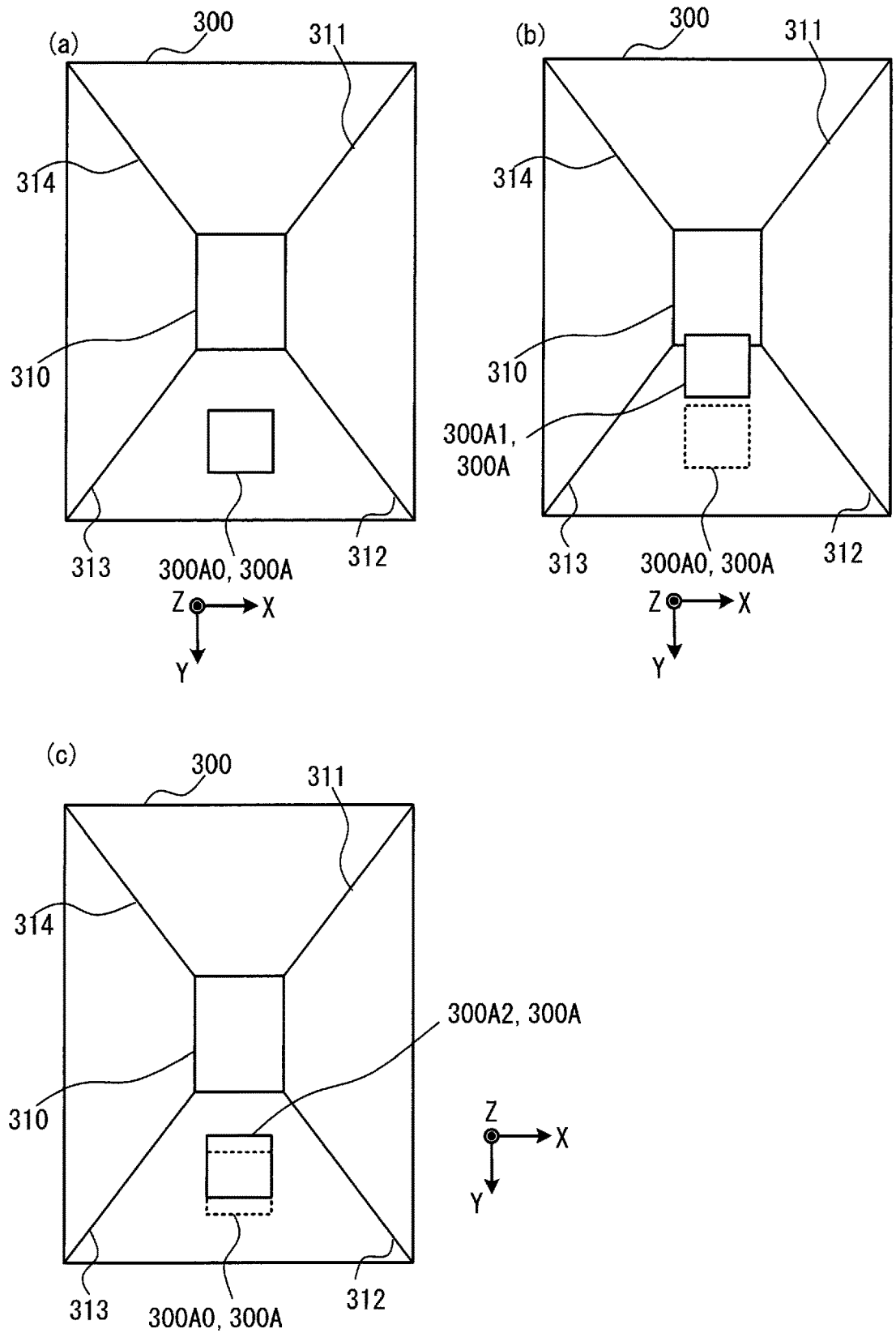

FIG. 28(*a*) is a schematic illustration presenting an example of a midair image 300 that may be displayed by the display device 1 in this embodiment. The midair image 300 in FIG. 28(*a*) is brought up in an initial display, as is the midair image 300 shown in FIG. 4(*a*) pertaining to the first embodiment. Even after the user performs an operation for an icon 300A (300A0) in the midair image 300 brought up in such an initial display, the reach position 50 may still be located above the detection reference 40, as shown in FIG. 7(*b*).

In the calibration processing executed under such circumstances, the image generation unit 201 adjusts the display mode for the icon 300A so as to create a user perception as if the icon 300A has moved further away from the user (toward the Z direction – side). In this example, the image generation unit 201 alters the display position of the icon 300A as a way of adjusting the display mode for the icon 300A. The image generation unit 201 moves the display position of the icon 300A closer to the vanishing point, as illustrated in FIG. 28(*b*). It is to be noted that the displacement quantity representing the extent to which the display position of the icon 300A is to move, is determined based upon the distance between the detection reference 40 and the reach position 50, as in the first embodiment. The processing executed as described above will be referred to hereafter as first processing, and the adjusted display mode for the icon 300A1 resulting from the first processing will be referred to as a first display mode.

The user performs a press-down operation with respect to the icon 300A1 having been switched to the first display mode, so that his fingertip F is positioned further toward the Z direction – side in comparison to its position in the first processing. At this time, if the user perceives as if the icon 300A on display in the first display mode has moved along the depthwise direction (toward the Z direction – side) by an excessive degree, the fingertip F of the user, i.e., the reach position 50, will be set further downward relative to the detection reference 40, as shown in FIG. 7(*d*).

In this situation, the image generation unit 201 adjusts the display mode for the icon 300A1 so as to create a user perception as if the icon 300A has moved closer to the user (toward the Z direction + side). The image generation unit 201 moves the display position of the icon 300A further away from the vanishing point, as illustrated in FIG. 28(*c*). It is desirable that the image generation unit 201 set the displacement quantity for the icon 300A to a value smaller than, e.g., approximately 75%, of the value representing the displacement quantity for the icon 300A1 determined through the first processing. The rationale for this is that if the icon 300A is displayed in the state prior to the first processing, i.e., in the state shown in FIG. 28(*a*), the user operation, too, may resume the state shown in FIG. 7(*b*). The processing executed as described above will be referred to hereafter as second processing and the adjusted display mode for the icon 300A2 resulting from the second processing will be referred to as a second display mode.

It is to be noted that while the image generation unit 201 sets the displacement quantity for the icon 300A2 to a value smaller than that representing the displacement quantity for the icon 300A1 determined through the first processing, it is not strictly necessary to set a smaller value than that corresponding to the first processing. For instance, the image generation unit 201 may select a displacement quantity matching the displacement quantity determined in the first processing and thus display the icon 300A2 at a position matching the display position shown in FIG. 28(*a*). In addition, the image generation unit 201 may select a greater displacement quantity for the icon 300A2 relative to the displacement quantity determined in the first processing so as to display the icon 300A2 at a position further toward the Y direction + side relative to the display position shown in FIG. 28(*a*). The rationale for the image generation unit 201 to execute processing as described above is that in this embodiment, a user perception is created as if the position of the icon 300A, taken along the Z direction, has changed by adjusting the display mode. This means that with respect to the position of the icon 300A along the Z direction, the depthwise position perceived when the display position of the icon 300A has been moved further away and the depthwise position perceived when the display position of the icon 300A has been moved closer may be different from each other (or they may be perceived as different positions depending upon the user). For this reason, there may be circumstances under which it is desirable to set the displacement quantity for the second processing equal to or greater than the displacement quantity for the first processing.

As the display mode for the icon 300A2 is adjusted to the second display mode through the second processing, a user perception as if the icon 300A has moved closer to the user is created. As a result, the user, realizing at the second processing that he has performed an excessive press-down operation with respect to the icon 300A, is expected to refrain from subsequently performing a second excessive press-down operation toward the Z direction − side.

In the explanation provided above, the user performs a press-down operation for the icon 300A in FIG. 28(*a*) above the detection reference 40. If the user has performed a press-down operation under the detection reference 40, the image generation unit 201 needs to execute processing the reverse of that described above. Namely, during the first processing, the image generation unit 201 adjusts the display mode so as to create a user perception as if the icon 300A1 has moved closer to the user (the Z direction + side). The image generation unit 201 switches to the first display mode through the first processing by moving the display position of the icon 300A1 further away from the vanishing point.

The user performs a press-down operation with respect to the icon 300A1 having been switched to the first display mode, so that his fingertip F is positioned further toward the Z direction + side in comparison to its position during the first processing. At this time, if the user perceives as if the icon 300A on display in the first display mode has been moved closer to the user (toward the Z direction − side) by an excessive degree, the fingertip F of the user, i.e., the reach position 50, will be set above the detection reference 40, as shown in FIG. 7(*a*). In this situation, the image generation unit 201 adjusts the display mode for the icon 30A1 so as to create a user perception as if the icon 300A1 has moved further away from the user (toward the Z direction − side). The image generation unit 201 switches to the second display mode in the second processing by moving the display position of the icon 300A toward the vanishing point. As the display mode for the icon 300A2 is adjusted to the second display mode through the second processing, a user perception as if the icon 300A2 has moved further away from the user is created. As a result, the user, recognizing that the press-down operation having been executed in the first processing has not reached the icon 300A (detection reference 40), is expected to adjust the extent of a subsequent press-down operation performed toward the Z direction − side.

While an explanation has been given above on an example in which the display mode for the icon 300A is adjusted by altering the display position, the present invention is not limited to this example. The display mode for the icon 300A may instead be adjusted by altering its size, by altering any of the other parameters listed in reference to variation 1 of the first embodiment or by altering any of these in combination. For instance, in order to create a user perception as if the display position of the icon 300A1 has moved further away from the user through the first processing by altering the size of the icon 300A, the image generation unit 201 reduces the size of the icon 300A1 to switch to the first display mode. In the second processing, the image generation unit 201 switches to the second display mode by increasing the size of the icon 300A2. In addition, in order to create a user perception as if the display position of the icon 300A1 has moved closer to the user through the first processing the image generation unit 201 increases the size of the icon 300A1 to switch to the first display mode. In the second processing, it switches to the second display mode by decreasing the size of the icon 300A2.

It is to be noted that the image generation unit 201 engaged in the second processing may first adjust the display mode so as to switch the icon 300A1 displayed in the first display mode back to the initial display and may then adjust the display mode for the icon 300A to the second display mode. Namely, following the first processing, the image generation unit 201 may switch the midair image 300 displayed as shown in FIG. 28(*b*) to the midair image 300 shown in FIG. 28(*a*). The image generation unit 201 may then execute the second processing by switching the display to the midair image 300 shown in FIG. 28(*c*).

In addition, the display mode does not need to be switched back to the initial display in the processing described above. For instance, the image generation unit 201 may first adjust the display mode for the icon 300A by selecting a display position corresponding to a displacement quantity amounting to, for instance, 75% of the displacement quantity representing the full distance between the icon 300A1 and the icon 300A0, and may then switch to the second display mode. As a further alternative, the image generation unit 201 may first adjust the display mode for the icon 300A by selecting a display position corresponding to a displacement quantity amounting to, for instance, 125% of the displacement quantity representing the full distance between the icon 300A1 and the icon 300A0, and then may switch to the second display mode.

Through these measures, the user is made aware that he has performed an operation to an excessive degree following the first processing and thus is expected to perform an operation at the position at which the detection reference 40 is located in the midair image operation mode during or after the second processing.

Furthermore, the image generation unit 201 may bring up on display an icon 300A2 in the second display mode while the icon 300A1 is still on display in the first display mode. For instance, the image generation unit 201 may provide a display in the first display mode in a cold color such as blue and may adjust the display mode by raising the luminance for the second display mode. Under such circumstances, the image generation unit 201 displays the icon 300A2 assuming a blue color and high luminance as a result of the switchover to the second display mode by raising the luminance of the blue icon 300A1. In this case, too, the user is made aware that he has performed an operation to an excessive degree following the first processing and thus is expected to perform an operation at the position at which the detection reference 40 is located in the midair image operation mode during or after the second processing.

<When the User Operation Remains Unchanged Even after the Display Mode for the Icon 300A is Adjusted>

Figure 29:
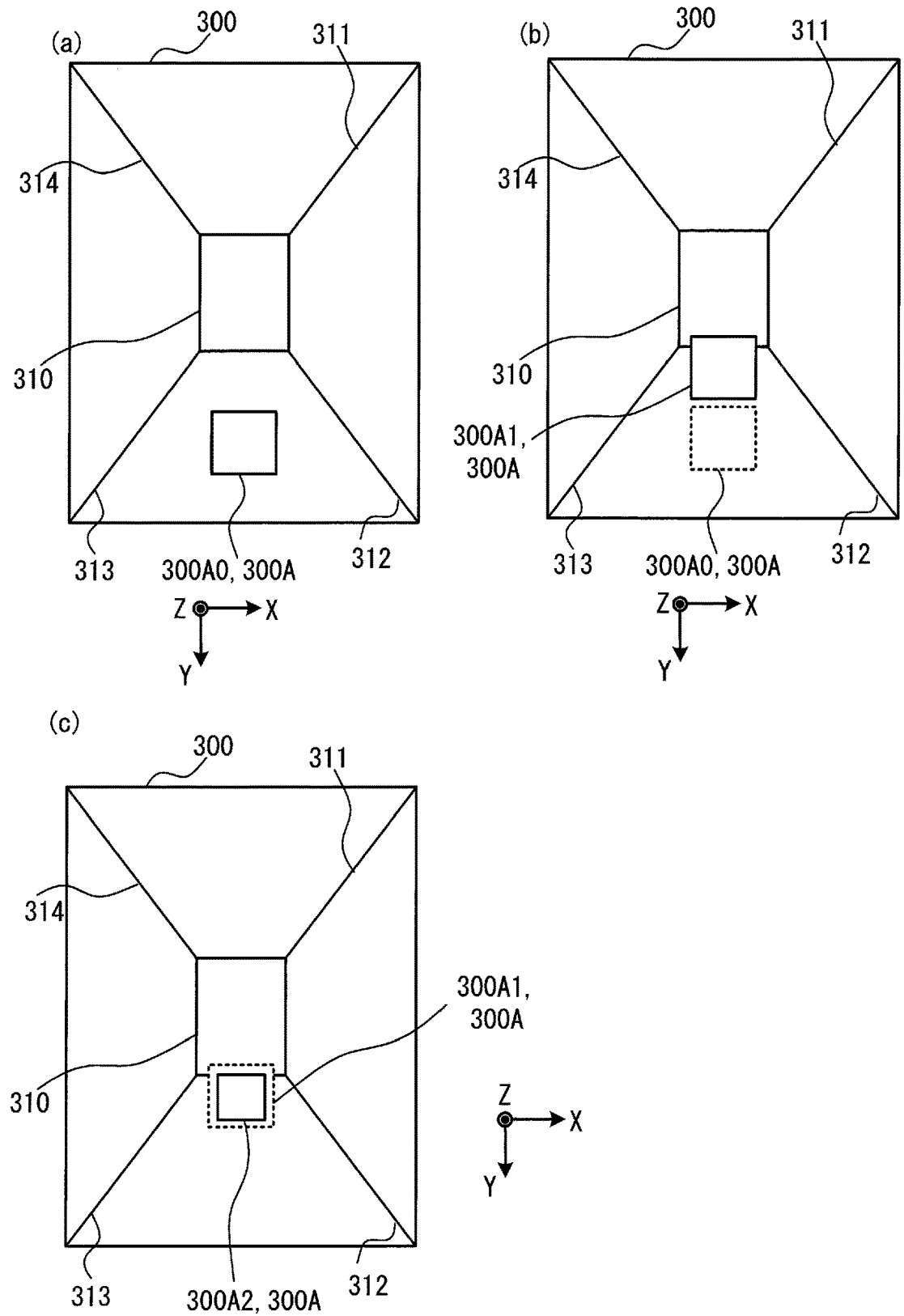
FIG. 29 Illustrations each presenting an example of a midair image that may be brought up on display via the display device 1 in the second embodiment, with an initial display shown in (a) and midair images, each brought up on display after the display mode is adjusted, shown in (b) and (c)

An explanation is given below in reference to an example in which a user operation is performed for an icon 300A (300A0) in a midair image 300 brought up in an initial display, as shown in FIG. 29(*a*). It is to be noted that the midair image 300 shown in FIG. 29(*a*) is similar to the midair image 300 in FIG. 28(*a*). The reach position 50 may be located above the detection reference 40, as shown in FIG. 7(*b*), with respect to this midair image 300.

Under these circumstances, the image generation unit 201 executes the first processing in the same way as it executes processing when the user operation changes to an excessive degree as described above. The image generation unit 201 adjusts the display mode for the icon 300A so as to create a user perception as if the icon 300A has moved further away from the user (toward the Z direction – side). Namely, the image generation unit 201 switches to the first display mode by moving the display position of the icon 300A1 closer to the vanishing point, as illustrated in FIG. 29(*b*). It is to be noted that the displacement quantity representing the extent to which the display position of the icon 300A1 is to move is determined based upon the distance between the detection reference 40 and the reach position 50, as in the first embodiment. In addition, the midair image 30 shown in FIG. 29(*b*) is similar to the midair image 300 in FIG. 28(*b*).

If the user does not perceive as if the icon 300A1 displayed in the first display mode has moved along the depthwise direction (toward the Z direction – side), the user is likely to perform a press-down operation for the icon 300A1 displayed in the first display mode resulting from display mode adjustment just as he has performed the press-down operation during the first processing. Namely, the fingertip F of the user is likely to be positioned above the detection reference 40, as illustrated in FIG. 7(*b*).

In this situation, in order to lead the user to perform a press-down operation at a position closer to the detection reference 40 compared to the current position, i.e., in order to set the reach position 50 at the detection reference 40, the image generation unit 201 adjusts the display mode for the icon 300A1 to the second display mode in the second processing. Even after the display position of the icon 300A has been altered, the user has not perceived as if the icon 300A has moved and accordingly, the image generation unit 201 switches to the second display mode by altering the size of the icon 300A2 in the second processing. At this time, the image generation unit 201 reduces the size of the icon 300A2 as shown in FIG. 29(*c*) in the second processing, so as to create a user perception as if the display position of the icon 300A2 has moved further away from the user. Namely, the image generation unit 201 switches the display mode for the icon 300A to the second display mode (related to the icon size) different from the first display mode (related to the icon display position) which has not elicited the required action of the user. As a result, the user is made aware at the second processing that the press-down operation he has performed has not reached the icon 300A (detection reference 40) and is thus expected to subsequently adjust the extent to which he performs the press-down operation toward the Z direction – side.

In the explanation provided above, the user performs a press-down operation for the icon 300A in FIG. 29(*a*) above the detection reference 40. If the user has performed a press-down operation under the detection reference 40, the image generation unit 201 needs to execute processing that is the reverse of that described above. Namely, during the first processing, the image generation unit 201 adjusts the display mode so as to create a user perception as if the icon 300A1 has moved closer to the user (the Z direction + side).

The image generation unit 201 switches to the first display mode through the first processing by moving the display position of the icon 300A1 further away from the vanishing point. If the fingertip F of the user is still positioned further downward relative to the detection reference 40 following the first processing, the image generation unit 201 switches to the second display mode by increasing the size of the icon 300A2 through the second processing.

It is to be noted that while the image generation unit 201 alters the display position of the icon 300A1 while the image generation unit 201 switches to the first display mode by altering the display position of the icon 300A1 and switches to the second display mode by altering the size of the icon 300A2 in the example described above, the present invention is not limited to this example. The image generation unit 201 may instead switch to the first display mode by altering the size of the icon 300A1 and switch to the second display mode by altering the display position of the icon 300A2. Moreover, the image generation unit 201 may switch to the first display mode by altering one of the various parameters listed in reference to variation 1 of the first embodiment and switch to the second display mode by altering another parameter among the various parameters.

It is to be noted that in this case, too, the image generation unit 201 may bring up on display the icon 300A2 in the second display mode while the icon 300A1 is still on display in the first display mode. For instance, the image generation unit 201 may provide a display in the first display mode in a cold color such as blue and may adjust the display mode by lowering the luminance for the second display mode. Under such circumstances, the image generation unit 201 displays the icon 300A2 assuming a blue color and low luminance as a result of the switch to the second display mode by lowering the luminance of the blue icon 300A1. As a result, the user is made aware that the operation performed after the first processing has not been much different from the operation performed during the first processing and accordingly is led to perform an operation at the position at which the detection reference 40 is located in the midair image operation mode during or after the second processing.

In addition, the image generation unit 201 engaged in the second processing may first adjust the display mode so as to switch the icon 300A1 displayed in the first display mode back to the initial display and then adjust the display mode for the icon 300A1 to the second display mode. Namely, following the first processing, the image generation unit 201 may switch the midair image 300 displayed as shown in FIG. 29(*b*) to the midair image 300 shown in FIG. 29(*a*). The image generation unit 201 may then execute the second processing by switching to the midair image 300 shown in FIG. 29(*c*). Under these circumstances, the image generation unit 201 does not need to adjust the display mode so that the icon 300A1 displayed in the first display mode temporarily resumes the initial display mode. For instance, the image generation unit 201 may first adjust the display mode for the icon 300A by selecting a display position corresponding to a displacement quantity amounting to, for instance, 75% of the displacement quantity representing the full distance between the icon 300A1 and the icon 300A0, and then may switch to the second display mode. As a further alternative, the image generation unit 201 may first adjust the display mode for the icon 300A by selecting a display position corresponding to a displacement quantity amounting to, for instance, 125% of the displacement quantity representing the full distance between the icon 300A1 and the icon 300A0, and then may switch to the second display mode.

As a further alternative, the image generation unit 201, having displayed the icon 300A2 in the second display mode through the second processing, may then display the icon 300A1 in the first display mode, switch the display mode so as to bring up the icon 300A0 in the initial display and further switch to the second display mode. In this case, the image generation unit 201 may bring up the icon 300A2 in FIG. 29(*c*) while the icon 300A1 shown in FIG. 29(*c*) is on display and may adjust the display mode for the icon 300A1 on display so as to match that for the icon 300A2.

As a result, the user is made aware that the operation performed after the first processing has not been much different from the operation performed during the first processing and accordingly is led to perform an operation at the position at which the detection reference 40 is located in the midair image operation mode during or after the second processing.

Figure 30:
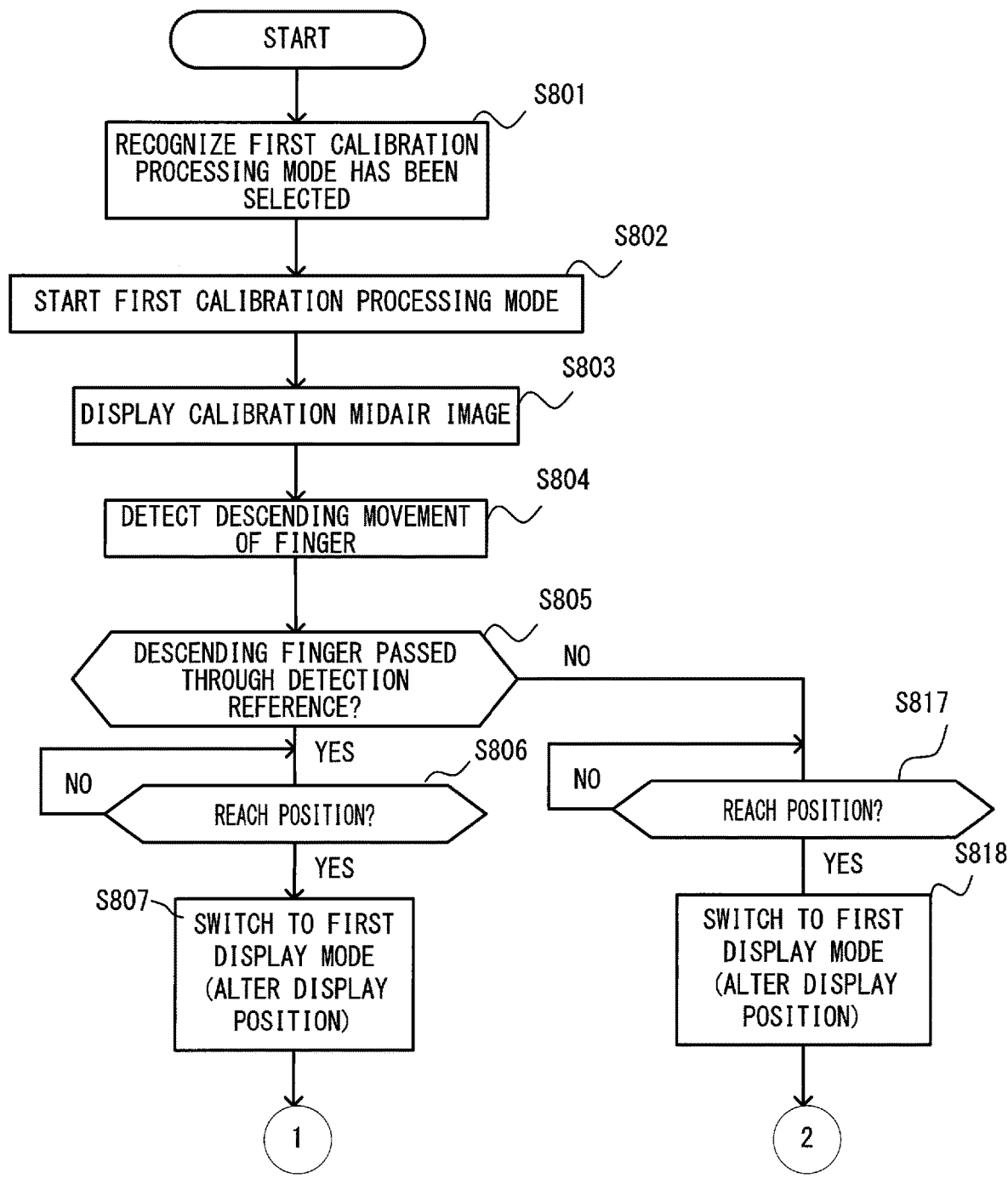
FIG. 30 A flowchart of the calibration processing executed in the second embodiment FIG. 31 A flowchart of the calibration processing executed in the second embodiment FIG. 32 A flowchart of the calibration processing executed in the second embodiment FIG. 33 A flowchart of the calibration processing executed in a third embodiment FIG. 34 Illustrations each presenting an example of a midair image that may be brought up on display via the display device in variation 3 of the third embodiment, with an initial display shown in (a) and midair images, each brought up on display after the display mode is adjusted, shown in (b) and (c)

The processing executed in the first calibration processing mode by the display device 1 in the second embodiment will be explained in reference to the flowchart presented in FIG. 30 through FIG. 32. Since the processing executed in step S801 through step S804 in the flowchart presented in FIG. 30 is identical to the processing executed in step S1 through step S4 in the flowchart presented in FIG. 10, a repeated explanation is not provided. In addition, the processing executed in step S805 and step S806 is identical to the processing executed in step S25 and step S27 in the flowchart presented in FIG. 12, and accordingly, a repeated explanation is not provided.

Figure 31:
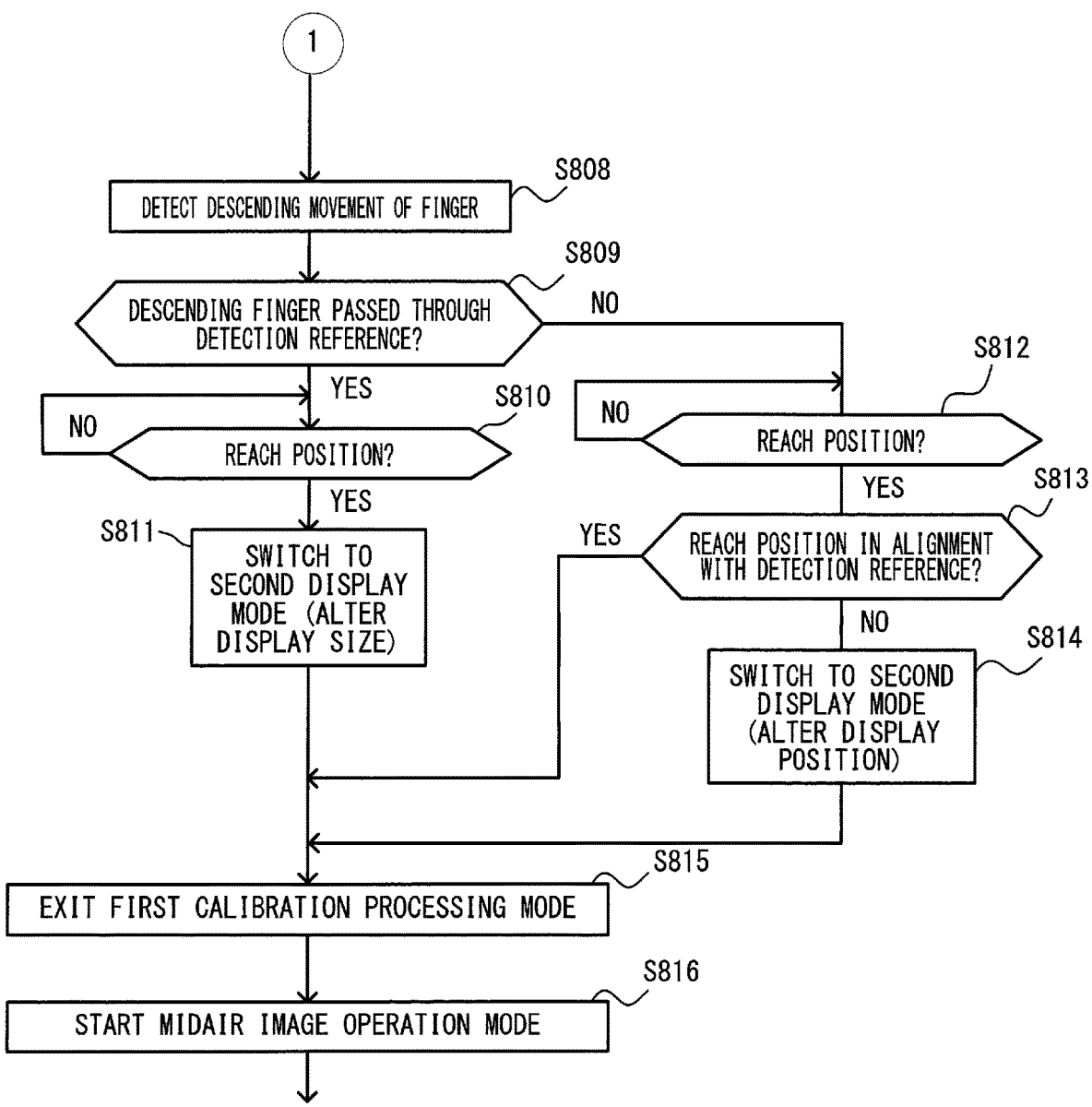
Figure 32:
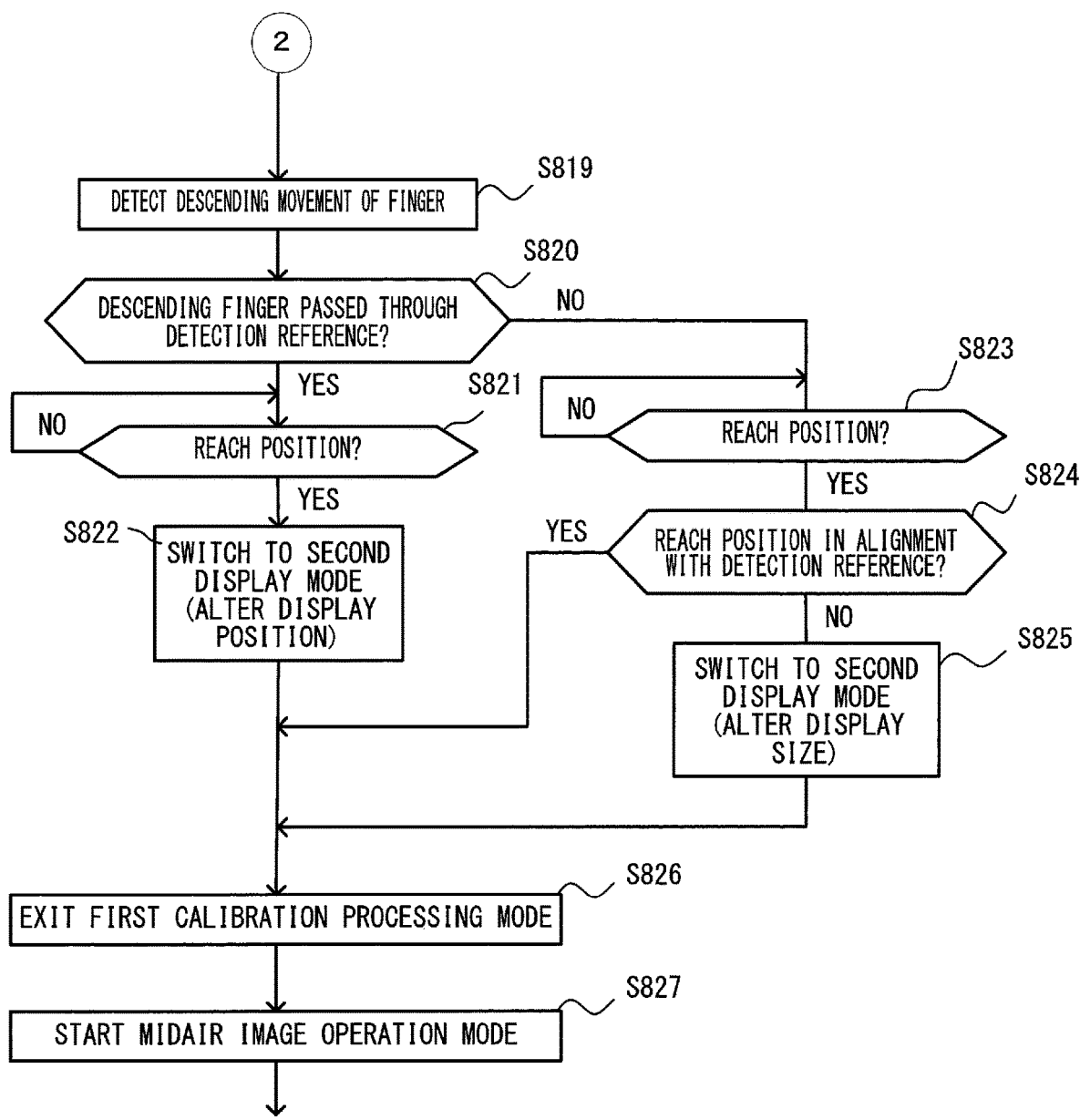

In step S807, the display position of the icon 300A is altered to switch to the first display mode through the first processing and then the operation proceeds to step S808 in FIG. 31. The processing executed in step S808 through step S810 in FIG. 31 is identical to the processing executed in step S804 through step S806 in FIG. 30. In step S811, the size of the icon 300A is altered to switch to the second display mode through the second processing, before the operation proceeds to step S815.

If a negative decision is made in step S809, processing similar to that executed in step S810 is executed in step S812. In step S813, processing similar to that executed in step S30 in the flowchart presented in FIG. 12 is executed. Upon making an affirmative decision in step S813, the operation proceeds to step S815, whereas upon making a negative decision in step S813, the operation proceeds to step S816. In step S816, the display position of the icon 300A is altered to switch to the second display mode and then the operation proceeds to step S815. The processing executed in step S815 and S816 is similar to that executed in step S7 and step S8 in FIG. 10. The processing executed subsequently is similar to the processing executed in step S10 and subsequent steps, as shown in FIG. 6, and is not included in the chart in FIG. 31.

If a negative decision is made in step S805 in FIG. 30, the operation proceeds to the step S817 to execute processing similar to that executed in step S806. In step S818, the display position of the icon 300A is altered to switch to the first display mode before the operation proceeds to step S819 in FIG. 32. The flowchart presented in FIG. 32 is identical to the flowchart presented in FIG. 31 except for the processing executed in step S822 and step S825, and accordingly, a repeated explanation is not provided. In step S822, the display position of the icon 300A is altered to switch to the second display mode. In step S825, the size of the icon 300A is altered to switch to the second display mode. It is to be noted that the processing executed following step S827, which is similar to the processing executed in step S10 and subsequent steps, as shown in FIG. 6 is not included in FIG. 32. In addition, a decision may be made in step S826 as to whether or not the user has performed an operation to exit the first calibration processing mode. In this case, if the user has performed an operation to exit the first calibration processing mode, the operation proceeds to step S827. If, on the other hand, the user has not performed an operation to exit the first calibration processing mode, the operation may return to step S804 in FIG. 30 to detect a descending movement of the user's finger.

It is to be noted that while the processing is executed in the first calibration processing mode in the explanation provided above, it may instead be executed in the second calibration mode. In such a case, the processing in step S804 in FIG. 30 through step S814 in FIG. 31 and the processing through step S826 in FIG. 32 will be executed instead of the processing executed in step S24 through step S32 in the flowchart presented in FIG. 12 pertaining to the first embodiment. However, if an affirmative decision is made in step S809 in FIG. 31, display switchover processing is first executed as in step S26 shown in FIG. 12, for the icon 30A before the operation proceeds to step S810 in FIG. 31. In addition, if an affirmative decision is made in step S813 in FIG. 31, display switchover processing is likewise executed as in step S31 in FIG. 12 for the icon 30A. In the processing executed as shown in FIG. 32, too, upon making an affirmative decision in step S820, display switchover is first executed as in step S26 in FIG. 12 for the icon 30A before the operation proceeds to step S821 in FIG. 32. If an affirmative decision is made in step S824 in FIG. 32, display switchover processing is executed as in step S31 in FIG. 12 for the icon 30A.

The image generation unit 201 in the second embodiment first switches the display mode for the icon 30A or 300A (first processing) and subsequently, if the operation detector 13 does not detect a user operation, the image generation unit 201 adjusts the display to create a user perception as if the icon 30A or 300A has moved along a direction opposite from the direction in which the user has perceived as if the icon 30A or 300A has moved as the display was adjusted through the first processing. As a result, the user is made aware that he has perceived as if the icon 30A or 300A has moved to an excessive extent and thus is expected to adjust the operating position at which he performs a subsequent press-down operation so that the reach position or the specified position can be detected at the detection reference 40.

In addition, the image generation unit 201 in the second embodiment first switches to the first display mode by increasing the size of the icon 30A or 300A and then switches to the second display mode by reducing the size of the icon 30A or 300A. As a result, the user is made aware that he has had a perception as if the icon 30A or 300A has moved to an excessive extent during the first processing.

In addition, the image generation unit 201 in the second embodiment first switches to the first display mode by moving the display position of the icon 30A or 300A and then switches the display mode for the icon 30A or 300A to the second display mode by moving the display position so as to create a user perception as if it has moved along a direction opposite the direction in which it has been perceived to have moved through the switchover to the first display mode. As a result, the user is made aware that he has had a perception as if the icon 30A or 300A has moved to an excessive extent during the first processing.

Moreover, the image generation unit 201 in the second embodiment switches the display mode for the icon 300A1 to the second display mode different from the first display mode if the user operation, performed with respect to the icon 300A1 displayed in the adjusted display mode, i.e., the first display mode, through the first processing, is not detected at the detection reference 40. Thus, the user is made aware that he has had a perception as if the icon 300A has remained stationary and is thus expected to adjust the operating position at which he performs a subsequent press-down operation to enable detection of the furthest reach position or the specified position at the detection reference 40.

It is to be noted that while the display device 1 in the second embodiment described above includes at least the control unit 20, the display unit 11 and the operation detector 13, the present invention may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described earlier may be added as needed in order to realize the various advantages described in reference to the second embodiment. In addition, the control device described above may be built into any of various types of electronic devices adopting the second embodiment.

Furthermore, the present invention may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to achieve the various advantages described in reference to the second embodiment, a structural element among the structural elements described earlier may be added into the detection device as deemed necessary.

Third Embodiment

In reference to drawings, a display device 1 in the third embodiment will be described. The third embodiment will be described in reference to an example in which the display device 1 in the embodiment is mounted in an operation panel. It is to be noted that the display device 1 in the embodiment does not need to be mounted in an operation panel and may instead be mounted in any type of electronic apparatus as described in reference to the first embodiment and the variations thereof.

Figure 26:
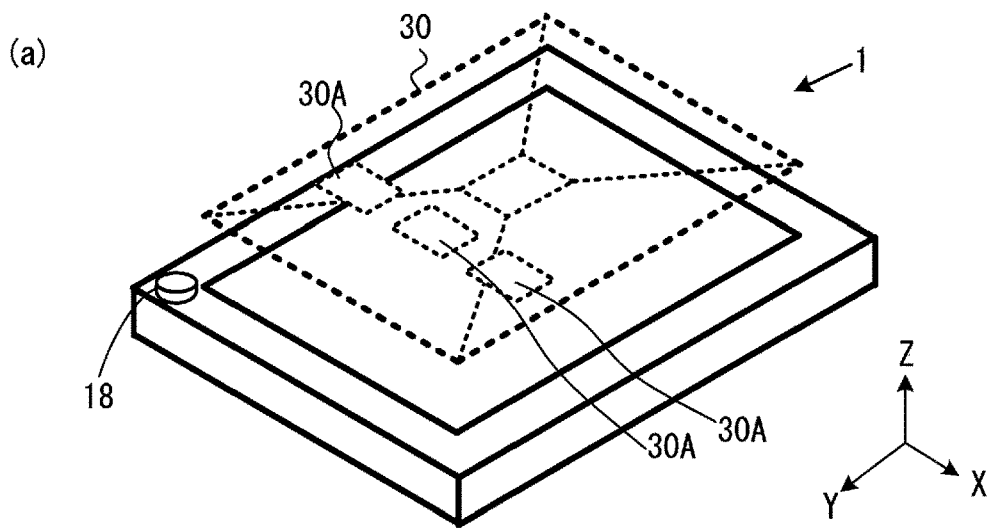
Figure 26:
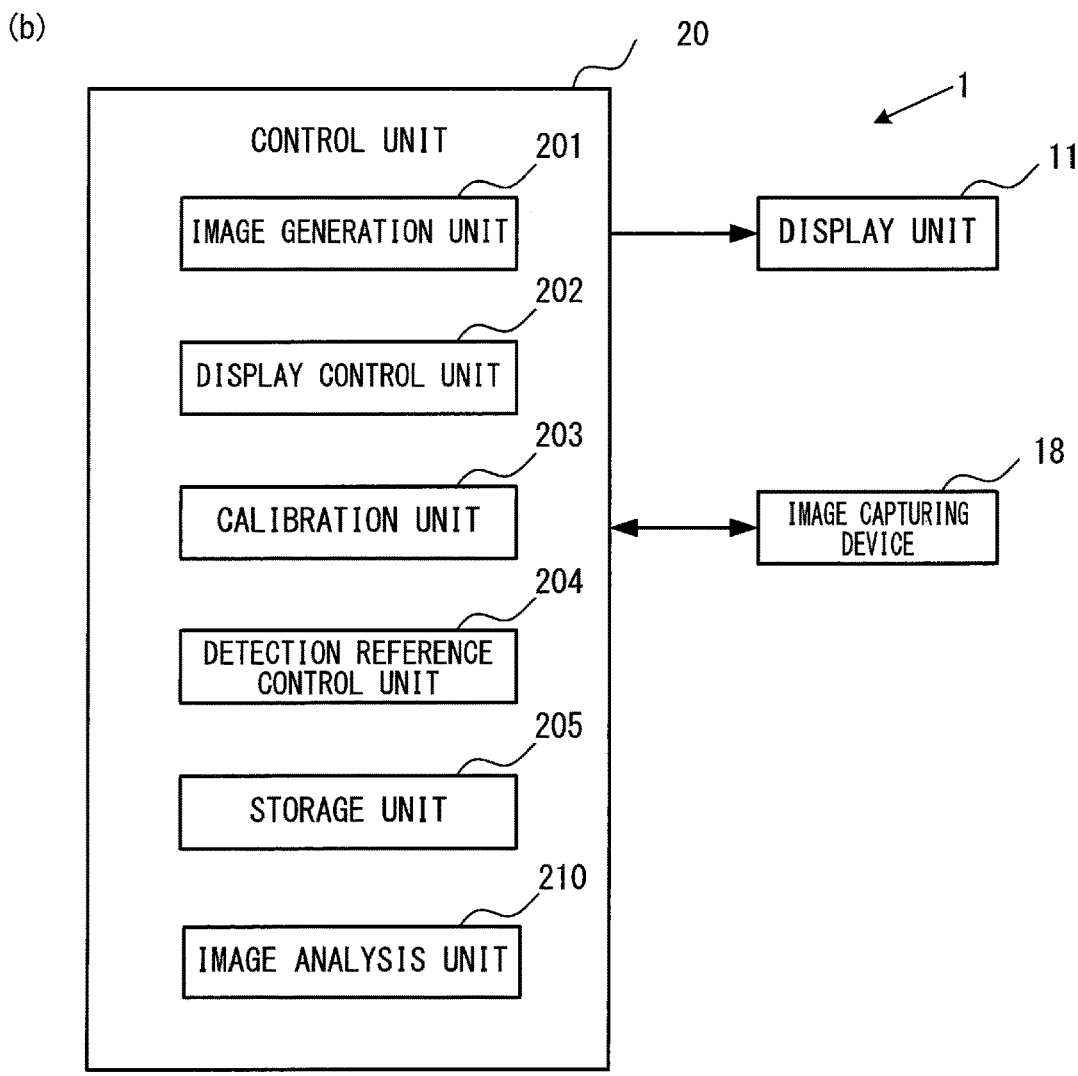

The display device 1 in the third embodiment may adopt a structure similar to that of the display device 1 in variation 9 of the first embodiment shown in FIG. 26. It is to be noted that the display device 1 in the third embodiment may detect the reach position or the specified position and adjust the display mode for a midair image 30 by adopting any of the various methods described in reference to the first embodiment, the variations of the first embodiment and the second embodiment.

The image generation unit 201 in the display device 1 in the third embodiment adjusts the display mode for an icon 30A or 300A based upon a user condition during calibration processing. The display device 1 in the third embodiment determines a user condition such as whether or not the user is looking at a midair image 30, and the image generation unit 201 adjusts the display mode for the icon 30A or 300A if the user is not looking at the midair image 30.

The following is an explanation of the calibration processing executed in the embodiment in the second calibration processing mode.

An image capturing device 18 captures an image of the user operating the icon 30A in the midair image 30. An image analysis unit 210 analyzes the captured image obtained by photographing the user via the image capturing device 18, and makes a decision as to whether or not the user is currently looking at the midair image 30 by determining the orientation of the user's face or body based upon the analysis results. If the image analysis unit 210 decides that the user is not currently looking at the midair image 30, the image generation unit 201 adjusts the display mode for the icon 30A. It is to be noted that in this embodiment, too, the detection reference control unit 204 calculates the distance between the reach position or the specified position and the detection reference 40 and the image generation unit 201 adjusts the display mode for the icon 30A based upon the calculated distance in the same way as that described in reference to the first embodiment, the variations thereof and the second embodiment. The user may find it visually disturbing if the display mode for the icon 30A is adjusted through calibration processing while he is looking at it. Accordingly, the image generation unit 201 in the display device 1 in the embodiment adjusts the display mode for the icon 30A while the user is looking away from the midair image 30 and since the user does not witness the display mode switchover, he does not experience the visual disturbance.

The display device 1 may include a line-of-sight detector that detects the line-of-sight of the user, in place of or in addition to the image capturing device 18, and may make a decision based upon a detection output provided from the line-of-sight detector as to whether or not the user is looking at the midair image 30. Based upon the decision-making results, the image generation unit 201 adjusts the display mode for the icon 30A while the user is not looking at the midair image 30.

Figure 33:
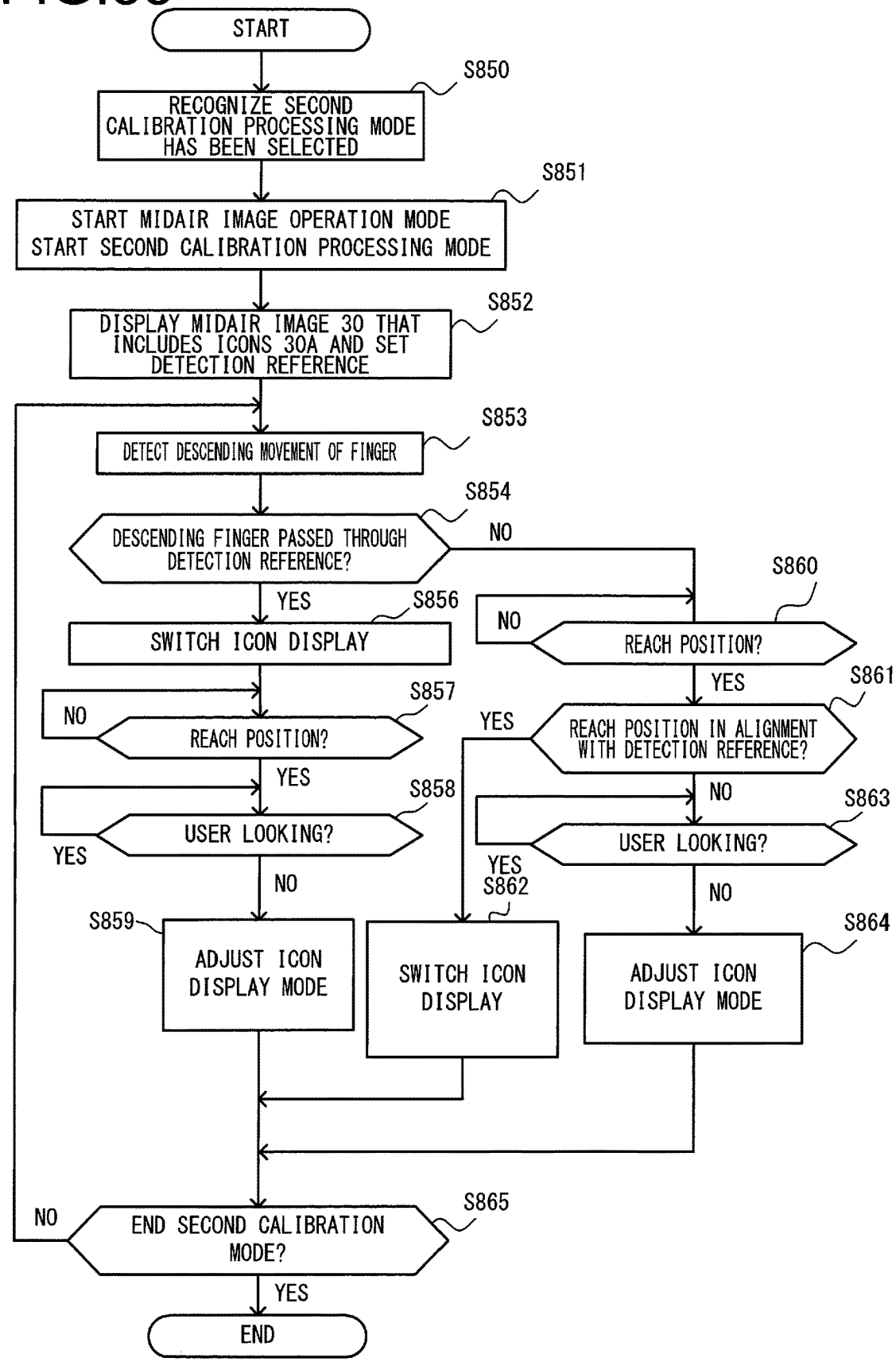

In reference to the flowchart presented in FIG. 33, the calibration processing executed by the display device 1 in the third embodiment will be explained. Since the processing executed in the flowchart presented in FIG. 33 is identical to that presented in FIG. 12 except for the processing executed in step S858 and step S863, a repeated explanation is not provided. If the reach position is determined in step S857, a decision is made in step S858 as to whether or not the user is looking at the midair image 30. If it is decided that the user is not currently looking at the midair image 30 based upon the orientation of the user's face or body, indicated in image capturing data generated by the image capturing device 18, a negative decision is made in step S858 and the operation proceeds to step S859. If, on the other hand, it is decided that the user is looking at the midair image 30, an affirmative decision is made in step S858 and the operation goes into standby in step S858. In addition, if a negative decision is made in step S862, processing similar to that in step S858 is executed in step S863.

It is to be noted that while the calibration processing is executed in the second calibration processing mode in the example explained above, it may instead be executed in the first calibration processing mode. In such a case, the processing in step S858 in the flowchart presented in FIG. 33 will be executed after making an affirmative decision in step S5 in the flowchart presented in FIG. 10 in reference to which the first embodiment has been explained.

In addition, the image-capturing device 18 or the line-of-sight detector described above does not need to be installed in the display device 1. The image-capturing device 18 may be installed outside the display device 1 and may transmit image-capturing data to the display device 1 through wireless communication or via a cable. In addition, the line-of-sight detector may be installed outside the display device 1 and may transmit the line-of-sight detection results to the display device 1 through wireless communication or via a cable.

It is to be further noted that the image generation unit 201 adjusts the display mode for the icon 30A when it is decided that the user is not looking at the midair image 30 in the example explained above in reference to the third embodiment. Instead, the image generation unit 201 may adjust the display mode for the icon 30A when it is decided that the user is looking at the midair image 30. In the latter case, the user, looking at the midair image 30, is able to sense the extent to which the display mode for the icon 30A is adjusted by the image generation unit 201. Thus, the user can be led to alter the operating position if necessary.

In addition, while control is executed in the display device 1 so as to adjust the display mode for the icon 30A when the user is not looking at the midair image 30 in the explanation provided above, control may instead be executed so as to adjust the display mode for the icon 30A based upon a value indicated in user biometric information. The user's pulse rate indicates a user condition, and may be obtained as such user biometric information. The user's pulse rate may be obtained via, for instance, a pulse rate counting device that the user puts on before starting to operate the display device 1. Then, the image generation unit 201 may execute control so as to adjust the display mode for the icon 30A when the user's pulse rate increases. The user's pulse rate may rise when the user, being unable to perform an operation smoothly, becomes frustrated. In this situation, adjustment of the display mode for the icon 30A at the display device 1 will assure better ease of operation for the user.

It is to be also noted that if the display mode for the icon 30A is adjusted upon detecting that the user has stopped looking at the midair image 30, the user may repeatedly perform an operation at the display position of the midair image 30 a plurality of times before he stops looking at the midair image 30. In such a case, the image generation unit 201 will adjust the display mode for the icon 30A based upon the results of the plurality of operations repeatedly performed, when the user is no longer looking at the midair image 30. For instance, the image generation unit 201 may adjust the display mode for the icon 30A based upon an average value representing the plurality of reach positions or specified positions, e.g., the arithmetic mean or the geometric mean of the plurality of reach positions or specified positions, a median of the plurality of reach positions 50, or the most recent reach position or specified position among the plurality of reach positions or specified positions.

The image generation unit 201 in the third embodiment adjusts the display mode for the icon 30A based upon a user condition. As a result, the sense of visual disturbance that the user may experience as the display mode for the icon 30A is altered can be reduced.

In addition, the image generation unit 201 in the third embodiment adjusts the display mode for the icon 30A while the user is not looking at the midair image 30. As a result, the sense of visual disturbance that the user may experience as the display mode for the icon 30A is altered can be reduced.

Furthermore, a decision is made as to whether or not the user is looking at the midair image 30 in the third embodiment based upon at least one of; information pertaining to the user's line-of-sight, information pertaining to the orientation of the user's face and information pertaining to the orientation of the user's body, obtained through detection. Thus, the display mode for the icon 30A can be adjusted while the user is not looking at the midair image 30.

(Variation 1 of the third embodiment)

A display device 1 in variation 1 of the third embodiment will be explained next. The display device 1 in variation 1 may adopt a structure similar to that of the display device 1 in the first embodiment shown in FIG. 1 and FIG. 2. It is to be noted that the display device 1 in the third embodiment may detect the reach position or the specified position and may adjust the display mode for a midair image 30 by adopting any of the various methods described in reference to the numerous variations of the first embodiment and in reference to the second embodiment.

The display device 1 in variation 1 starts display mode adjustment for a midair image 30 in response to a user operation during calibration processing. In this variation, after the user operation ends, the image generation unit 201 starts display mode adjustment for the midair image 30. The following is an explanation given in reference to the second calibration processing mode.

A decision as to whether or not the display position of the midair image is to be altered is made based upon the results of a decision as to whether or not a user operation has ended. Accordingly, the control unit 20 decides that the user operation has ended once the reach position or the specified position is determined. The decision as to whether or not the user operation has ended is made by determining the reach position or the specified position during the processing executed in step S857 and step S860 in the flowchart presented in FIG. 33 in reference to which the third embodiment has been described. In addition, the processing in step S858 and step S863 in the flowchart presented in FIG. 33 is not executed.

It is to be noted that once the reach position or the specified position is determined, the user operation may be determined to have ended, upon detecting a specific gesture signaling display position adjustment (such as the user switching from the "paper" sign to the "stone" sign). As an alternative, once the reach position or the specified position is determined, the user operation may be determined to have ended upon detecting that a display position adjustment button brought up on display in the midair image, has been pressed-down by the user. In this case, the decision as to whether or not the user operation has ended may be made instead of executing the processing in step S858 and step S863 in the flowchart presented in FIG. 33.

It is to be noted that while the calibration processing is executed in the second calibration processing mode in the example explained above, it may instead be executed in the first calibration processing mode. In such a case, a decision as to whether or not the user operation has ended will be made, after making an affirmative decision in step S5 in the flowchart presented in FIG. 10 in reference to which the first embodiment has been explained, and the operation will proceed to step S6 upon deciding that the user operation has ended.

In variation 1 of the third embodiment, the image generation unit 201 adjusts the display mode for the midair image 30 after the user operation ends. Thus any sense of visual disturbance that the user may experience when the display mode for the midair image 30 is adjusted can be lessened.

(Variation 2 of the Third Embodiment)

A display device 1 in variation 2 of the third embodiment will be explained next. The display device 1 in variation 2 may adopt a structure similar to that of the display device 1 in the first embodiment shown in FIG. 1 and FIG. 2. It is to be noted that the display device 1 in the third embodiment may detect the reach position or the specified position and may adjust the display mode for the midair image 30 by adopting any of the various methods described in reference to the numerous variations of the first embodiment and in reference to the second embodiment.

The following is an explanation given in reference to the second calibration processing embodiment.

When the image generation unit 201 in the display device 1 in variation 2 adjusts the display mode for an icon 30A so that it fades out and then fades back in during the period of time elapsing between the display mode adjustment start and the display mode adjustment end. Namely, at the start of the display mode adjustment for an icon 30A the image generation unit 201 gradually lowers the display luminance and then gradually raises the display luminance toward the end of the display mode adjustment. The user may find it visually disturbing to see the display mode for the icon 30A adjusted by the image generation unit 201 as he looks at it during calibration processing. Accordingly, the image generation unit 201 gradually lowers the display luminance as the display mode adjustment for an icon 30A begins. As a result, through display mode adjustment for the icon 30A is rendered less visible to the user to reduce the visual disturbance that may otherwise be experienced by the user.

The image generation unit 201 may lower the display luminance or the contrast of the icon 30A, may flash the display of the icon 30A at lowered luminance or contrast, or may even hide the display of the icon 30A. By rendering the display mode adjustment for the icon 30A, executed by the image generation unit 201 less noticeable, i.e., less visible, through these measures, the user experience will be improved.

As an alternative, the image generation unit 201 may render the icon 30A more noticeable while the display mode for the icon 30A is adjusted. The icon 30A may be rendered more noticeable by the image generation unit 201 by raising the display luminance or the contrast of the icon 30A, or by flashing the display of the icon 30A while the display mode for the icon 30A is being adjusted. The image generation unit 201 renders the display mode for the icon 30A undergoing adjustment more noticeable by rendering the icon 30A itself more noticeable while the display mode for the icon 30A is being adjusted so that the user's attention will be focused on the icon 30A itself rather than on the display mode adjustment for the icon 30A. Under such circumstances, the user will not be distracted by the display mode adjustment of the icon 30A.

The display of the icon 30A is controlled as described above as part of the processing executed in step S859 or step S864 in the flowchart presented in FIG. 33 during adjustment of the display mode the icon 30A.

It is to be noted that the user may be offered a choice of whether or not to render the midair image movement more noticeable as an option.

Furthermore, while the calibration processing is underway, the display mode adjustment for the icon 30A executed by the image generation unit 201 may be rendered more noticeable so as to ensure that the user is aware of the display mode adjustment for the icon 30A. The image generation unit 201 may raise the display luminance or the contrast of the icon 30A, or may flash the display of the icon 30A while the display mode adjustment for the icon 30A is underway. In contrast to the example explained earlier in which the display mode adjustment for the icon 30A is rendered less noticeable, the adjustment of the display mode for the icon 30A is rendered more noticeable to the user so that the user can recognize the display mode for the icon 30A resulting from the adjustment with better clarity.

It is to be noted that the display luminance of the icon 30A is altered as described above as part of the processing executed in step S859 or step S864 in the flowchart presented in FIG. 33 during adjustment of the display mode for the icon 30A.

It is also to be noted that while the calibration processing is executed in the second calibration processing mode in the example explained above, it may instead be executed in the first calibration processing mode.

In variation 2 of the third embodiment, the display mode for the icon 30A is adjusted by altering at least either the luminance of the icon 30A or the contrast of the icon 30A. As a result, the sense of visual disturbance the user may experience as the display mode for the icon 30A is adjusted can be reduced.

(Variation 3 of the Third Embodiment)

A display device 1 in variation 3 of the third embodiment will be explained next. The display device 1 in variation 3 may adopt a structure similar to that of the display device 1 in the first embodiment shown in FIG. 1 and FIG. 2. It is to be noted that the display device 1 in the third embodiment may detect the reach position or the specified position and may adjust the display mode for a midair image 30 by adopting any of the various methods described in reference to the numerous variations of the first mode and in reference to the second embodiment.

The following is an explanation given in reference to the second calibration processing mode.

The display device 1 in variation 3 adjusts the display mode by reflecting the results of calibration processing, executed based upon a user operation performed with respect to the display position of a midair image 30 corresponding to a given operation screen, in a midair image 30 corresponding to the next screen brought up on display as a changeover from the given operation screen occurs. In more specific terms, as a user operation is performed with respect to a menu icon displayed in a midair image 30, a plurality of application icons, via which various types of application programs (e.g., music, email and SNS apps) are started up, are brought up on display in a midair image 30. When the display is switched to include these application icons, the display mode of the menu icon is adjusted.

Figure 34:
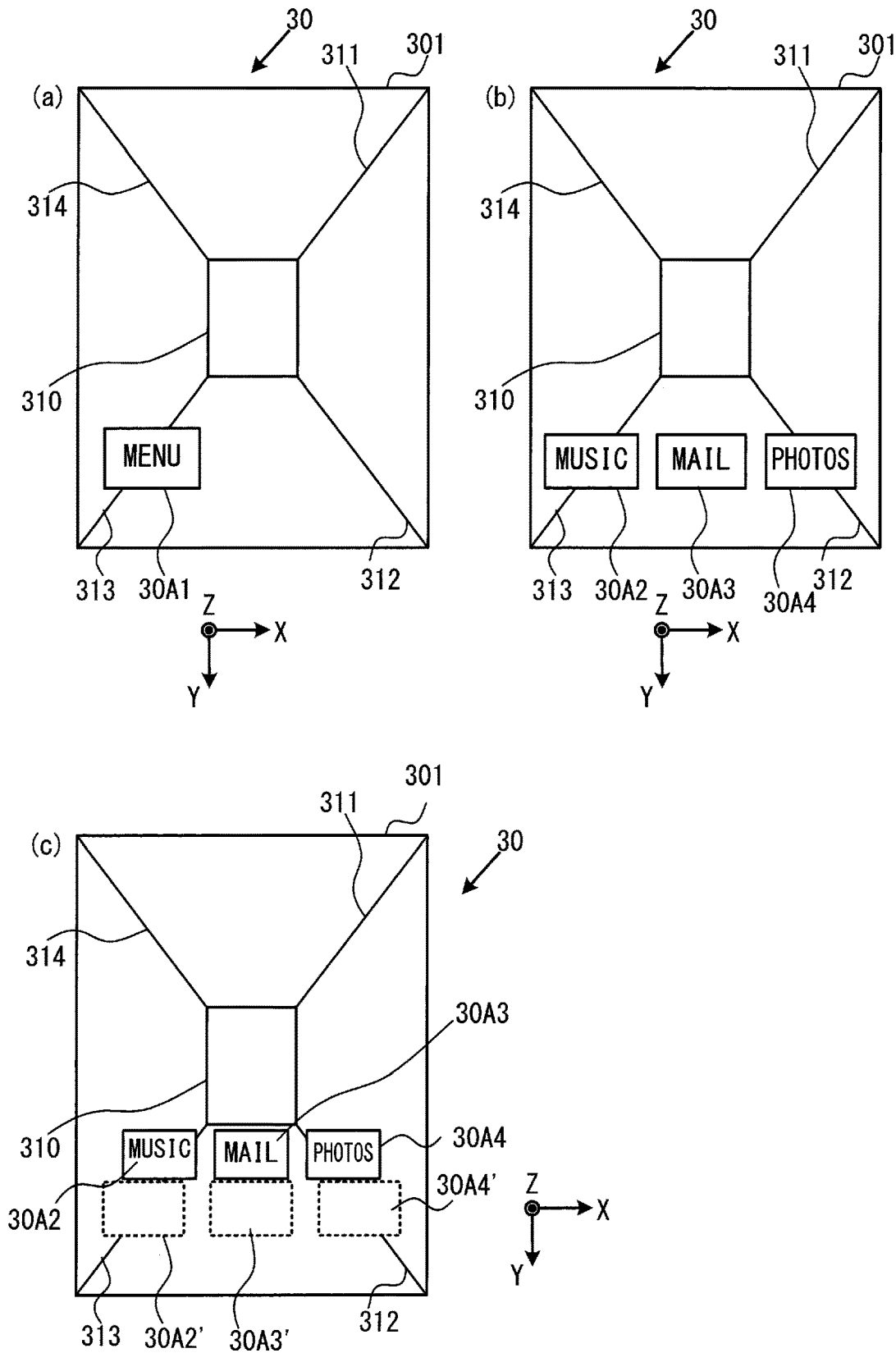

FIG. 34 presents examples of midair images 30 that may be brought up on display in variation 3. FIG. 34(a) shows a midair image 30 provided as a first display corresponding to an operation screen that includes a menu icon 30A1 and reference lines 310 through 314 (hereafter referred to as a first midair image). The image generation unit 201 displays the menu icon 30A1 in the first midair image 30 by sustaining the initial display state with respect to its size and display position.

FIG. 34(b) and FIG. 34(c) each show a midair image 30 provided as a second display (hereafter referred to as a second midair image) that corresponds to an operation screen that includes application icons 30A2, 30A3 and 30A4 and the reference lines 310 through 314. FIG. 34(b) shows the image in the initial display prior to any adjustment in the display mode for the application icons 30A2 through 30A4. FIG. 34(c) shows the image following adjustment in the display mode for the application icons 30A2 through 30A4. The reference lines 310 through 314 in the first and second midair images 30 shown in FIGS. 34(a) through 34(c) are similar to those described in reference to the first embodiment, the variations thereof, the second embodiment and the variations thereof. In addition, FIG. 34(c) shows a second midair image 30 brought up on display when the fingertip F of the user has been detected at a position above the detection reference 40 (toward the Z direction + side).

The user performs an operation by moving his fingertip F downward toward the menu icon 30A1 in the first midair image 30 brought up on display by the display control unit 202. If the operation detector 13 detects the reach position or the specified position at the detection reference 40 (see FIG. 7(c) pertaining to the first embodiment), the display control unit 202 switches the display from the first midair image 30 to a second midair image 30. In other words, if the operation detector 13 does not detect the reach position or the specified position at the detection reference 40 (see FIG.

7(b) or FIG. 7(d) pertaining to the first embodiment), the display control unit 202 does not switch the display from the first midair image 30 to a second midair image 30.

After the display device 1 is started up, if the operation detector 13 detects the reach position or the specified position at the detection reference 40 following a first operation performed by the user with respect to the menu icon 30A1, the display control unit 202 switches the display to the second midair image 30 shown in FIG. 34(b). Since the user operation for the menu icon 30A1 in the first midair image 30 has been performed at the detection reference 40, the user is expected to perform an operation at the detection reference 40 again when the application icons 30A2 through 30A4 are brought up in the second midair image 30 in the initial display as well. For this reason, the calibration unit 203 does not execute any calibration processing in response to the user operation.

If there has been an operation that was not detected at the detection reference 40 before the operation detector 13 detects the reach position or the specified position at the detection reference 40, the display control unit 202 switches the display to the second midair image 30 shown in FIG. 34(c). In this situation, before the display control unit 202 switches the display to the second midair image 30, the calibration unit 203 executes calibration processing based upon the operation that has not been detected at the detection reference 40. In the calibration processing, the detection reference control unit 204 individually calculates displacement quantities and sizes for the icons 30A2 through 30A4 based upon the distance between the reach position or the specified position and the detection reference 40, as has been explained in reference to the first embodiment, the variations thereof and the second embodiment and variations thereof.

The image generation unit 201 calculates displacement quantities and sizes for the icons 30A2 through 30A4 based upon the results obtained by detecting a user operation of moving his fingertip F downward, performed immediately before (i.e., in the immediately preceding session) the operation detector 13 detects the reach position or the specified position at the detection reference 40. The distance between the reach position or the specified position and the detection reference 40, calculated each time the user performs an operation of moving his fingertip F downward, is stored into the storage unit 205. It is to be noted that the distance between the reach position or the specified position and the detection reference 40 stored in the storage unit 205 may be saved by overwriting the previous value with the most recent value. The image generation unit 201 individually calculates displacement quantities and sizes for the icons 30A2 through 30A4 by referencing the distance stored in the storage unit 205.

It is to be noted that if the user performs an operation in which he moves his fingertip F downward a plurality of times before the operation detector 13 detects the reach position or the specified position at the detection reference 40, the image generation unit 201 may calculate displacement quantities and sizes for the icons 30A2 through 30A4 as described below. Namely, the image generation unit 201 may individually calculate displacement quantities and sizes for the icons 30A2 through 30A4 by using the average value of the values each representing the distance between the reach position or the specified position and the detection reference 40 calculated in correspondence to one of the plurality of operations.

In addition, the image generation unit 201 may calculate displacement quantities and sizes for the icons 30A2 through 30A4 by incorporating the results of an operation is detected by the operation detector 13. For instance, the user may perform a first operation at a position 10 cm above the detection reference 40 (toward the Z direction + side) and perform a second operation at the detection reference 40. In this situation, the image generation unit 201 may calculate the distance between the reach position or the specified position and the detection reference 40 as the average value of the value representing the first operation results and the value representing the second operation results, i.e., 5 cm above.

It is to be noted that if the display device 1 is a device that is basically used exclusively by a single user, such as a portable telephone, the image generation unit 201 may calculate the distance between the reach position or the specified position and the detection reference 40 based upon a record of a plurality of operations having been performed by the single user. However, if the display device 1 is a signage system or the like that is likely to be operated by a number of people, the operation record will be deleted each time the display device is operated by a new person. The control unit 20 may photograph, via the image capturing device 18, the face of the user each time the display device 1 is operated, and decide that a change of operator has occurred if the face of the user has changed, as has been explained in reference to variation 10 of the first embodiment.

Based upon the displacement quantities and sizes calculated for the icons 30A2 through 30A4, the image generation unit 201 individually adjusts the display mode for each of the icons 30A2 through 30A4 thereby generating a display image corresponding to the second midair image 30. Based upon the display image thus generated, the display control unit 202 brings up on display the second midair image 30 shown in FIG. 34(c).

As shown in FIG. 34(c), the icons 30A2 through 30A4 in the second midair image 30 coming up after the calibration processing are displayed in a display mode switched from that for the icons 30A2 through 30A4 in the initial display. It is to be noted that while the icons 30A2' through 30A4' in the initial display are indicated by dotted lines superimposed on the second midair image 30 so as to facilitate the explanation, the second midair image 30 in FIG. 34(c) does not actually include the icons 30A2' through 30A4' in the initial display.

The icons 30A2 through 30A4 in the second midair image 30 assume a smaller size than the icons 30A2' through 30A4' in the initial display indicated by the dotted lines, with their display positions altered along a direction running toward the vanishing point. As a result, the user perceives as if the icons 30A2 through 30A4 have moved further away from the user relative to the positions taken when the user has performed an operation for the first midair image 30 shown in FIG. 34(a). Accordingly, the user is expected to perform a press-down operation toward a position further downward for the icons 30A2 through 30A4 in the second midair image 30 than the position at which the user has performed the operation for the icon 30A1.

It is to be noted that if the first operation is performed at a position further downward relative to the detection reference, the display mode for the icons 30A2 through 30A4 in the second midair image is adjusted so as to create a user perception as if they have moved closer to the user. Namely, the size of the icons 30A2 through 30A4 is increased and their display positions are altered along a direction running away from the vanishing point.

In reference to the flowchart presented in FIG. 35, the calibration processing executed in the display device 1 in variation 3 of the third embodiment will be explained.

The processing executed in step S890 and step S891 is similar to that executed in step S21 and step S22 in FIG. 12. In step S892, the first midair image (see FIG. 34(*a*)) that includes the menu icon 30A1 is brought up on display and the operation proceeds to step S893. In step S893, processing similar to that in step S24 in FIG. 12 is executed and in step S894 through step S895, processing similar to that in step S29 through step S30 is executed. In step S896, to which the operation proceeds after making a negative decision in step S895 (when the reach position or the specified position is not in alignment with the position of the detection reference 40), data indicating the distance between the reach position or the specified position and the detection reference 40 having been calculated, are stored into the storage unit 205, and the operation returns to step S893.

Upon making an affirmative decision in step S895 (when the reach position or the specified position is in alignment with the position of the detection reference 40), a decision is made in step S897 as to whether or not data indicating the calculated distance has been stored into the storage unit 205 in step S896. If data indicating the distance are stored in the storage unit 205, an affirmative decision is made in step S897 and the operation proceeds to step S898. In step S898, the display is switched to bring up a second midair image (see FIG. 34(*c*)) that includes the application icons 30A2 through 30A4 displayed in a display mode adjusted based upon the data indicating the distance, which are stored in the storage unit 205, and then the processing ends. If data indicating the distance are not stored in the storage unit 205, a negative decision is made in step S897 and the operation proceeds to step S899. In step S899, the display is switched to bring up a second midair image (see FIG. 34(*b*)) that includes the application icons 30A2 through 30A4 displayed in the initial display mode, and then the processing ends.

It is to be noted that a specific effect may be added when the display control unit 202 switches the display from the first midair image 30 to the second midair image 30. For instance, the display control unit 202 may execute processing for fading out and fading in the icons by adjusting the icon luminance. Namely, as the display switchover from the first midair image 30 starts, the display control unit 202 may gradually lower the luminance of the first midair image 30 and as the switchover to the second midair image 30 nears completion, it may gradually increase the luminance. As a result, the change in the icon display mode will be rendered less noticeable to the user while the display is switched to the second midair image 30 and thus, the user will not experience as much visual disturbance during the display mode switchover.

In variation 3 of the third embodiment, if the position at which an operation has been performed with respect to the menu icon 30A1 in the first midair image 30 is not detected at the detection reference 40, the control unit 20 executes processing corresponding to the menu icon 30A1. At this time, the image generation unit 201 displays a second midair image 30, brought up after the first midair image 30, by adjusting the display mode for the application icons 30A2 through 30A4 based upon the operation performed for the menu icon 30A1 in the first midair image 30. As a result, the display mode for the icons 30A2 through 30A4 is adjusted while the display is switched from the first midair image 30 to the second midair image 30, which makes it possible to ensure that the user does not experience a visual disturbance as the display mode is switched.

In addition, if the position at which a user operation has been performed with respect to the first midair image 30 is not detected at the detection reference 40, the control unit 20 does not switch the display to a second midair image 30 in variation 3 of the third embodiment. As a result, the user is made aware that the operation has not been performed at the position at which the detection reference 40 is set.

(Variation 4 of the Third Embodiment)

A display device 1 in variation 4 of the third embodiment will be explained next. The display device 1 in variation 4 may adopt a structure similar to that of the display device 1 in the first embodiment shown in FIG. 1 and FIG. 2.

The feature distinguishing variation 4 of the third embodiment from variation 3 of the third embodiment described above will be explained below. Even when the operation detector 13 does not detect the reach position or the specified position pertaining to a specific icon 30A1 included in the first midair image 30 brought up in the first display, at the detection reference 40, the display control unit 202 switches to a second display by bringing up a second midair image 30. It is to be noted that the specific icon 30A1 may be an icon operated when the display device is engaged in operation, among a plurality of icons stored in the display device 1, such as a start button operated to start operation at the display device 1 or a lock-release button operated to cancel a lock applied on an operation in the display device 1. Namely, the specific icon 30A1 is an icon corresponding to an operation that the user is expected to continuously perform on a midair image 30 even after the user has performed an operation with respect to the icon 30A1.

The processing executed when the operation detector 13 has detected a first operation performed by the user at the detection reference 40 will be explained. In this case, the image generation unit 201 generates display image data corresponding to a second midair image 30 that includes icons 30A2 through 30A4 in the initial display state, as shown in FIG. 34(*b*), as in variation 3 of the third embodiment. The display control unit 202 switches the display to the second midair image 30 corresponding to the display image data generated by the image generation unit 201.

The processing executed when the reach position or the specified position pertaining to a press-down operation performed by the user with respect to the menu icon 30A1 in the first midair image 30, has not been detected at the detection reference 40 by the operation detector 13 will be explained next. In this situation, the calibration unit 203 executes calibration processing. In the calibration processing, the detection reference control unit 204 individually calculates displacement quantities and sizes for the icons 30A2 through 30A4 based upon the distance between the reach position or the specified position and the detection reference 40, as has been explained in reference to the first embodiment, the variations thereof and the second embodiment. Based upon the displacement quantities and the sizes calculated for the icons 30A2 through 30A4, the image generation unit 201 individually adjusts the display mode for the icons 30A2 through 30A4, thereby generating a display image corresponding to a second midair image 30. The display control unit 202 brings up on display the second midair image 30 shown in FIG. 34(*c*) based upon the display image thus generated. In other words, if an operation performed for the specific icon 30A1 has not been detected at the detection reference 40, a second midair image 30 having undergone the calibration processing, is displayed.

It is to be noted that in variation 4 of the third embodiment, too, a specific effect may be added when the display control unit 202 switches the display from the first midair image 30 to the second midair image 30, as in the variation 3. Namely, the display control unit 202 may execute processing for fading out and fading in the icons by adjusting the icon luminance. In this situation, as the display switchover from the first midair image 30 starts, the display control unit 202 may gradually lower the luminance of the first midair image 30 and as the switchover to the second midair image 30 nears completion, it may gradually increase the luminance. As a result, the change in the icon display mode will be rendered less noticeable to the user while the display is switched to the second midair image 30 and thus, the user will not experience a visual disturbance during the display mode switchover.

It is to be noted that if a user operation, performed on an icon among the icons 30A2 through 30A4 in the second midair image 30, i.e., an icon different from the specific icon 30A1 in the first display, is not detected at the detection reference 40, the display device 1 does not execute any of the processing allocated to the icons 30A2 through 30A4.

Figure 36:
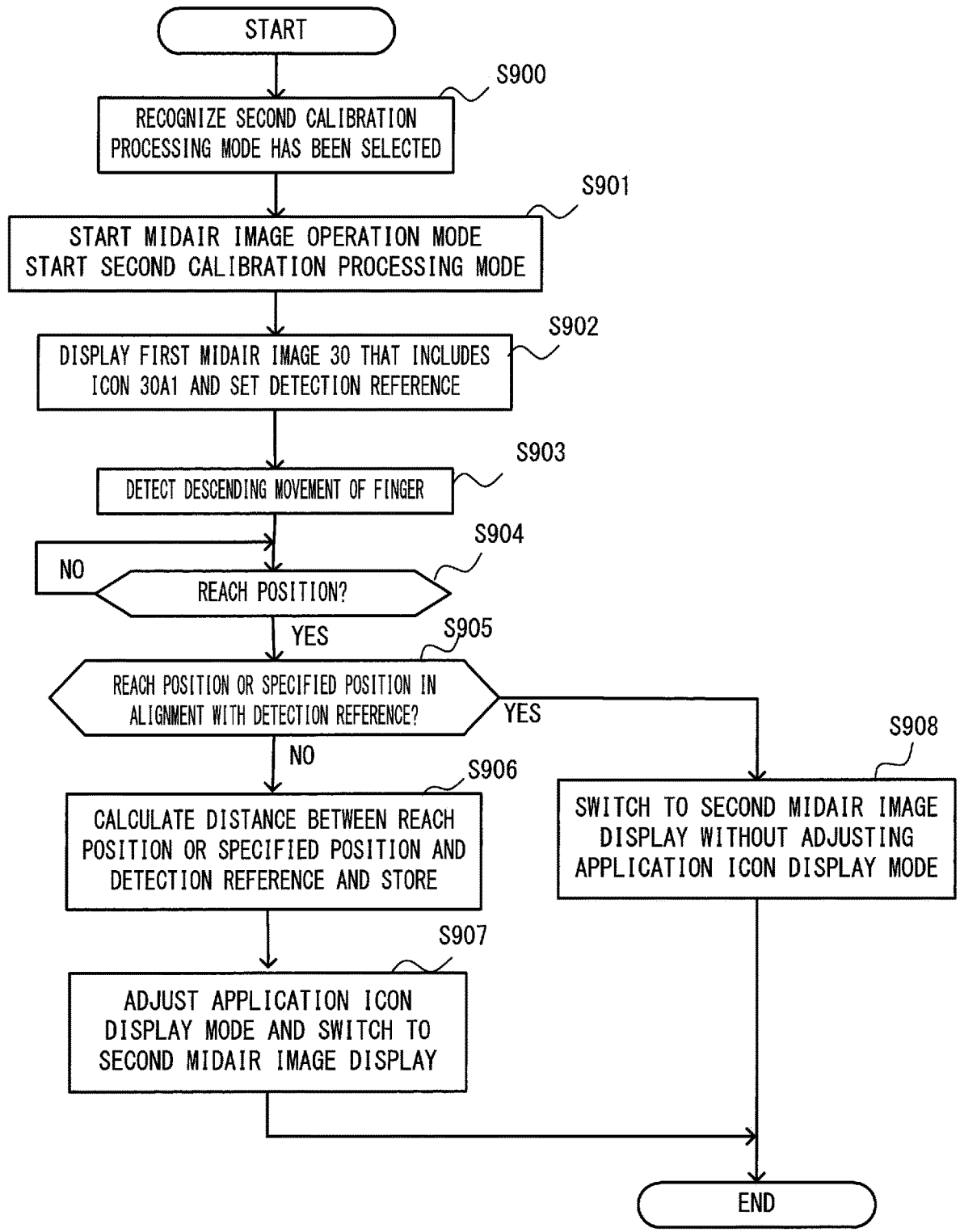

In reference to the flowchart presented in FIG. 36, the calibration processing executed in the display device 1 in variation 4 of the third embodiment will be explained.

Figure 35:
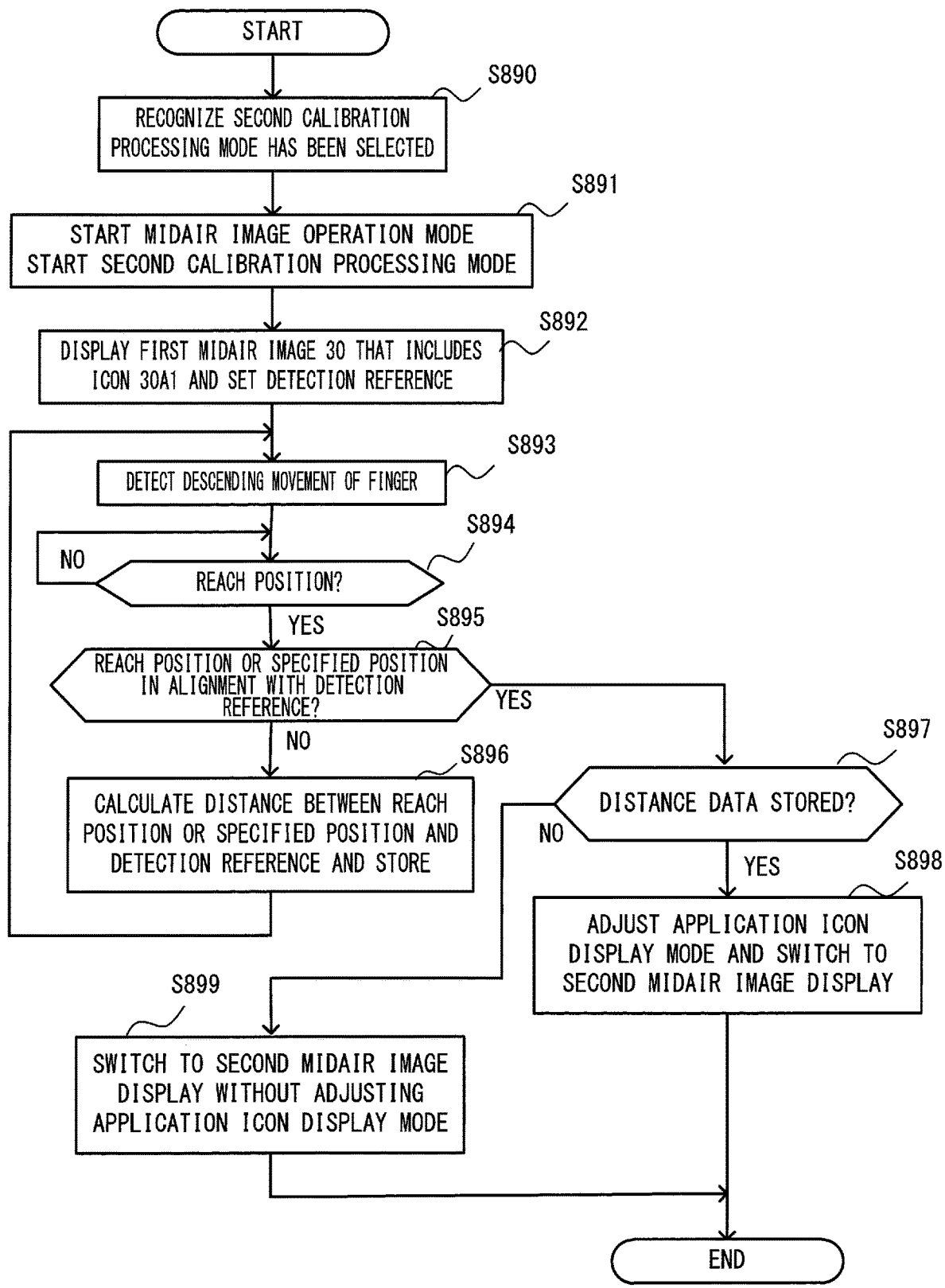
FIG. 35 A flowchart of the calibration processing executed in variation 3 of the third embodiment FIG. 36 A flowchart of the calibration processing executed in variation 4 of the third embodiment FIG. 37 A perspective presenting an exploded view of the display device in a fourth embodiment FIG. 38 A block diagram of the essential configuration of in the display device in the fourth embodiment FIG. 39 A flowchart of the calibration processing executed in the fourth embodiment FIG. 40 A block diagram of the essential configuration of the display device in variation 1 of the fourth embodiment FIG. 41 A sectional view schematically illustrating the structures adopted in a display unit and an image-forming optical system in another example of variation 1 of the fourth embodiment FIG. 42 A flowchart of the calibration processing executed in variation 2 of the fourth embodiment

The processing executed in step S900 through step S905 is similar to that executed in step S890 through step S895 in FIG. 35. If an affirmative decision is made in step S905 (when the reach position or the specified position is in alignment with the detection reference 40), the operation proceeds to step S908, in which processing similar to that in step S899 in FIG. 35 is executed before the processing in the flowchart ends. If, on the other hand, a negative decision is made in step S905 (when the reach position or the specified position is not in alignment with the detection reference 40), the operation proceeds to step S906, in which processing similar to that in step S896 in FIG. 35 is executed and then the operation proceeds to step S907. The processing executed in step S907 is similar to that executed in step S898 in FIG. 35.

It is to be noted that while data indicating the distance between the reach position and the detection reference are obtained through calculation and are stored through the processing executed in step S906, it is not strictly necessary to store the data. In step S907, a second image may be brought up on display by adjusting the display mode based upon the data obtained through calculation without storing the data.

In variation 4 of the third embodiment, if the position at which an operation performed with respect to a specific icon 30A1 in the first midair image 30 is not detected at the detection reference 40, the control unit 20 executes processing corresponding to the menu icon 30A1. Namely, the image generation unit 201 displays a second midair image 30 brought up after the first midair image 30, by adjusting the display mode for the application icons 30A2 through 30A4 based upon the operation performed for the specific icon 30A1 in the first midair image 30. As a result, the display mode for the icons 30A2 through 30A4 is adjusted while the display is switched from the first midair image 30 to the second midair image 30, which makes it possible to ensure that the user does not experience visual discomfort as the display mode switches.

In addition, if the position at which a user operation has been performed for an icon different from the specific icon 30A1 is not detected at the detection reference 40, the control unit 20 does not switch the display to a second midair image 30 in variation 4 of the third embodiment. As a result, the user is made aware that the operation has not been performed at the position at which the detection reference 40 is set.

In variation 4 of the third embodiment, the display is switched to a second midair image 30 even when an operation performed at the display position at which the specific icon 30A1, constituted with a button operated to release a lock on the display device 1, is displayed is not detected at the detection reference 40. When the user performs an operation for releasing a lock on the display device 1, the user is highly likely to continue to perform an operation on the midair image 30. In variation 4 of the third embodiment, the user is able to perform an operation on the midair image 30 having undergone the calibration processing without having to start up the calibration processing mode again after the lock on the display device 1 is released and thus, better ease of operation is assured.

While the specific icon 30A1 is constituted with a lock-release button in the example described above, the present invention is not limited to this example. For instance, the specific icon 30A1 may be a start button operated when starting operation in the display device 1. In such a case, the user does not need to perform any superfluous operations when starting operation in the display device 1. In addition, since calibration processing is executed at the start of operation in the display device 1, a midair image 30 in the midair image operation mode is brought up in the adjusted display mode. Since this eliminates the need for the user to start up the calibration processing mode again, better ease of operation is assured.

In addition, the specific icon 30A1 may be a menu button brought up on display after the start button has been operated or a calibration icon 300A such as that shown in FIG. 4.

It is to be noted that while the display device 1 in the third embodiment and variations 1 through 4 thereof described above includes at least the control unit 20, the display unit 11 and the operation detector 13, the present invention may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described earlier may be added as needed in order to realize the various advantages described in reference to the third embodiment and variations 1 through 4 thereof. In addition, the control device described above may be built into any of various types of electronic devices adopting the third embodiment and variations thereof.

Furthermore, the present invention may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to achieve the various advantages described in reference to the third embodiment and variations 1 through 4 thereof, a structural element among the structural elements described earlier may be added into the detection device as deemed necessary.

Fourth Embodiment

In the various embodiments and variations thereof described above, a midair image is generated via the image-forming optical system 12 in correspondence to an image displayed at the display unit 11 in the display device 1.

However, a midair image may be generated by adopting a structure other than that described above through the following methods. The structures explained below simply represent examples and a midair image may be generated by assuming a structure other than those described below.

A midair image may be generated at a display device by bringing up an image to be viewed with the right eye and an image to be viewed with the left eye, which has parallactic offset relative to the image to be viewed with the right eye, on display at the display unit of the display device so as to create an image perceived by the user to have depth, unlike the images displayed at the display unit. In the display device in this embodiment, calibration processing is executed that is different from the calibration processing explained in reference to the first embodiment, the variations thereof, the second embodiment, the third embodiment and the variations thereof in that a user perception is created as if the depth of an image has changed by adjusting the extent of parallactic offset for the parallax image. Namely, the display device in the embodiment adjusts the extent of parallactic offset for the parallax image based upon the distance between the reach position or the specified position determined based upon a user operation and the detection reference, detected in the same way as in the first embodiment, the variations thereof, the second embodiment, the third embodiment and the variations thereof described earlier. As a result, the user's perception of the position of a midair image 30 along the depthwise direction changes and thus, adjustment can be made so that the reach position or the specified position determined based upon the user operation is set at the detection reference.

In reference to drawings, a display device 1 in the fourth embodiment will be described. The fourth embodiment will be described in reference to an example in which the display device 1 in the embodiment is mounted in an operation panel. It is to be noted that the display device 1 in the embodiment does not need to be mounted in an operation panel and may, instead, be mounted in any type of electronic apparatus, as has been described in reference to the first through the third embodiments and the variations thereof.

Figure 37:
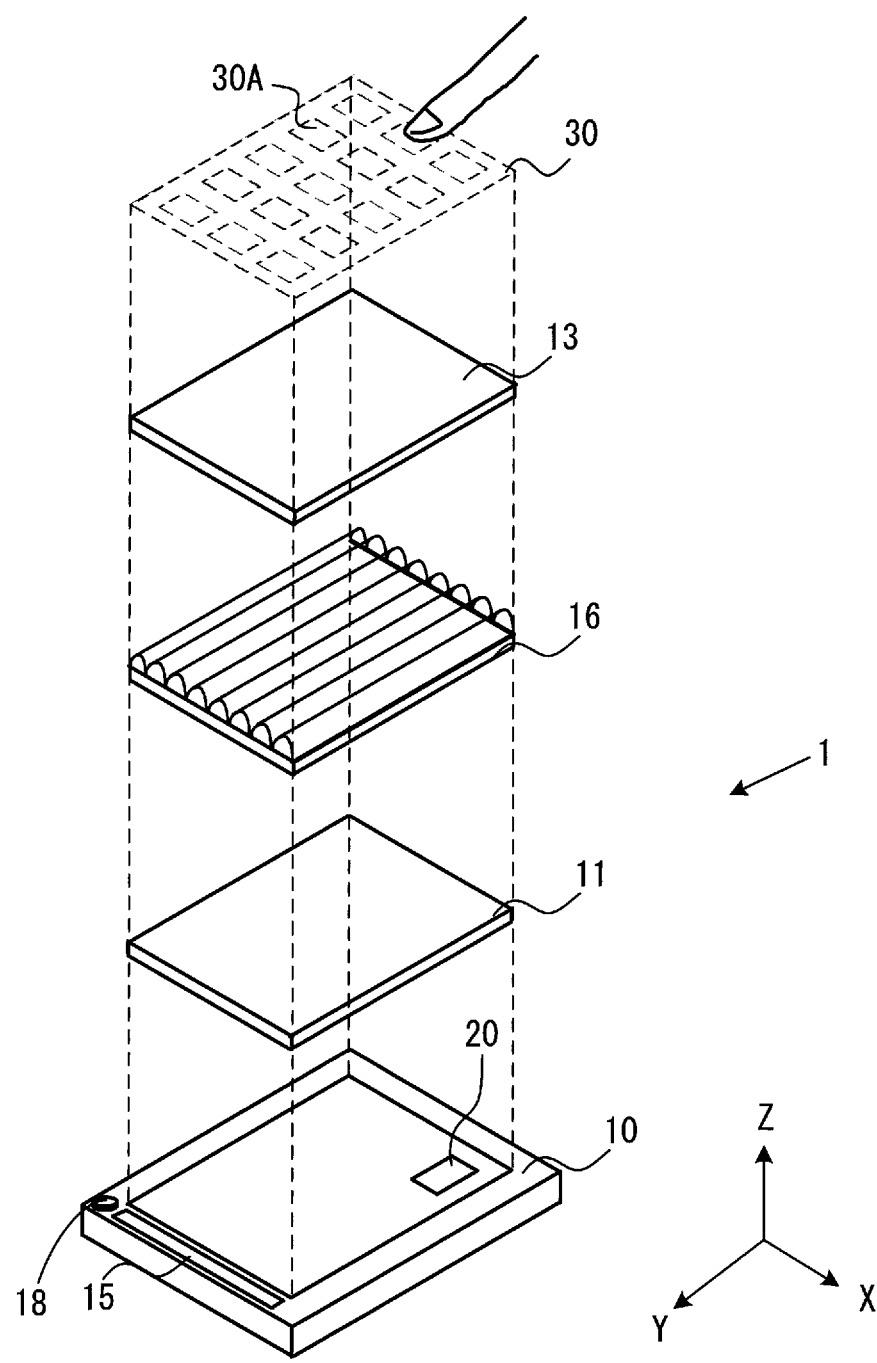

FIG. 37 shows the display device 1 in the fourth embodiment in an exploded perspective. The display device 1 in the fourth embodiment includes, for instance, a lenticular lens 16 of the known art, disposed above (toward the Z direction + side) the display unit 11, in place of or in addition to the image-forming optical system 12 included in the display device 1 in the first embodiment shown in FIG. 1. Via the lenticular lens 16, a right-eye image and a left-eye image displayed at the display unit 11 are viewed with the user's right eye and left eye respectively and as a result, the user perceives the parallax image displayed at the display unit 11 as a stereoscopic image (midair image 30) having depth. The display device 1 further includes a detector 15 that detects the user's position (the position at which the user is standing) while he is looking at the image on display at the display unit 11.

It is to be noted that the display device 1 may instead include a slit used to generate a parallax image through a parallax barrier system or the like of the known art, formed at a position above the display unit (toward the Z direction + side), instead of the lenticular lens 16. Namely, the display device 1 may adopt any of various modes that enable display of an image having parallax discernible with the naked eye. The display device 1 structured as described above creates a user perception as if the depthwise position of the midair image 30 has changed by the binocular parallax effect. In this sense, the display device 1 in the fourth embodiment is different from the first embodiment and the variations thereof, the second embodiment and the third embodiment and the variations thereof, in which the depthwise position of an icon 30A or 300A is altered by using a monocular depth cue.

It is to be noted that the display device 1 may adopt a structure that displays a parallax image that can be viewed by the user wearing special eyeglasses. In such a case, the display device 1 and the special eyeglasses may be controlled through, for instance, the active shutter method so as to create a user perception that the parallax image he is looking at is a midair image 30. The display device 1 provides a display at the display unit 11 through high-speed switching between the right-eye image and the left-eye image. The user puts on special eyeglasses such as eyeglasses with a liquid crystal shutter system and looks at the parallax image displayed at the display unit 11 through the eyeglasses. At this time, the display at the display unit 11 and the shutter open/close states are controlled in synchronization so that while the right-eye image is up on display at the display unit 11 in the display device 1, the left-eye shutter in the special glasses is closed and while the left-eye image is up on display at the display unit 11 in the display device 1, the right-eye shutter is closed in the special eyeglasses.

Figure 38:
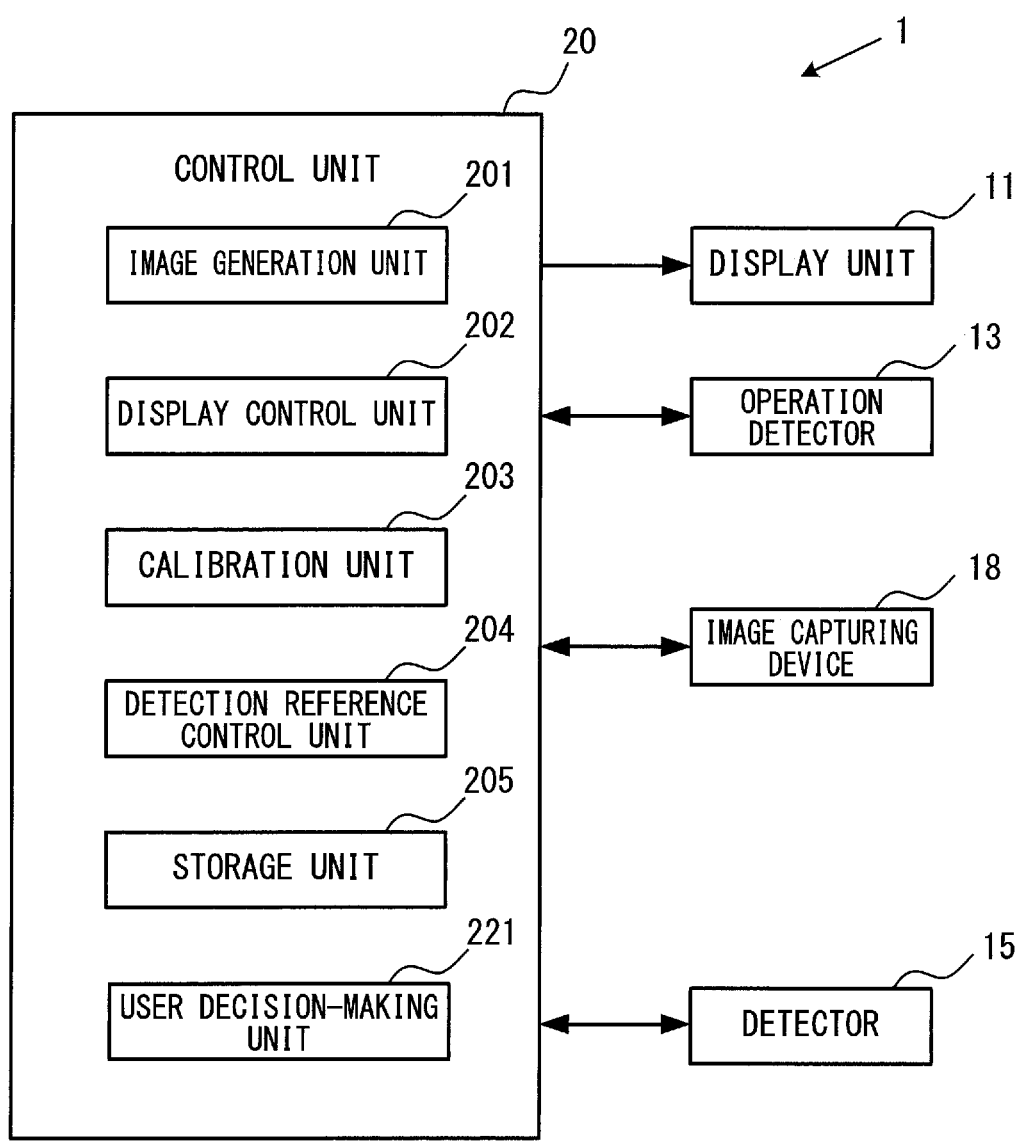

FIG. 38 is a block diagram of the essential structure adopted in the display device 1 in the fourth embodiment. In addition to the structural elements in the block diagram for the first embodiment provided in FIG. 2, the display device 1 in this embodiment includes a detector 15 that detects the line-of-sight, the eye ball movement or the like of the user looking at the parallax image on display at the display device 1. The detector 15 may be, for instance, an image capturing device capable of eye tracking of the known art that detects eye movement in the user by radiating infrared light toward the eyeballs of the user looking at the parallax image and detecting light reflected from the eyeballs.

In addition, the control unit 20 has a function realized in the form of a user decision-making unit 221 that makes a decision, based upon the detection results provided from the detector 15, as to whether or not the line-of-sight of the user or the position (standing position), at which the user is looking at the parallax image, is optimal for creating a user perception that the parallax image is a midair image 30.

It is to be noted that the display device 1 may adopt a structure achieved by adding the detector 15 and the user decision-making unit 221 to any of the structures shown in the block diagrams in reference to which the variations of the first embodiment, the second embodiment, the third embodiment and the variations thereof have been explained.

When a parallax image created by taking advantage of the binocular parallax effect is perceived as a midair image 30 by the user in conjunction with the display device 1 in the embodiment, a region where the user is able to view the parallax image as a stereoscopic image and a pseudoscopic region are present in an alternate pattern. This means that depending upon where the user is standing, the user, looking at the parallax image with the naked eye may perceive it as a distorted midair image 30 or may not be able to perceive the midair image 30 as a stereoscopic image. In order to prevent such an occurrence, the position taken by the user of the display device 1 is determined via the image capturing device 18 or a detector 15 and the user decision-making unit 221, and the display device 1 guides the user to an optimal standing position for perceiving the parallax image as a midair image 30 based upon the decision-making results.

The user decision-making unit 221 detects the standing position taken by the user looking at the parallax image brought up on display by the display device 1 based upon image capturing data generated by the image capturing device 18. The user decision-making unit 221 decides that the user is able to perceive the midair image 30 in an optimal manner if the user's standing position having been detected is within an area where the parallax image appears as a stereoscopic image. If, on the other hand, the detected standing position is in a pseudoscopic region, the user decision-making unit 221 decides that the user is unable to perceive the midair image 30 in an optimal manner, i.e., the standing position taken by the user is not desirable. If the user decision-making unit 221 decides that the standing position taken by the user is not desirable, the display control unit 202 brings up a message such as "Step to the right" over the midair image 30 by controlling, for instance, the display unit 11 so as to guide the user to an area where a stereoscopic view is afforded. It is to be noted that instead of displaying a message on the midair image 30, the display device 1 may include, for instance, a speaker or the like to lead the user to adjust his position through an audio message, a warning sound or the like.

It is to be noted that while the user decision-making unit 221 makes a decision with respect to the standing position taken by the user based upon the image capturing data provided from the image capturing device 18 in the example explained above, the control described above may be executed when the line-of-sight of the user, detected via the detector 15, is within a pseudoscopic region, instead.

In addition, instead of leading the user to adjust his standing position with a message brought up on display, an audio message or the like provided by the display device 1, the display position at which the parallax image is displayed may be adjusted so as to move a stereoscopic view-enabled region to the user's standing position or the user's line-of-sight position. In such a case, the display control unit 202 will adjust the display position at which the display image data are displayed on the display unit 11 relative to the lenticular lens 16. As an alternative, the image generation unit 201 may generate display image data having undergone processing of the known art, which are to be used to correct distortion or the like of the midair image 30 attributable to the current standing position of the user and the display control unit 202 may bring up on display the display image data resulting from the correction as the parallax image. As a further alternative, the display device 1 may include a drive device that moves the lenticular lens 16 over the XY plane so as to position the lenticular lens 16 relative to the display unit 11.

While the user of the display device 1 in the fourth embodiment perceives the parallax image displayed at the display unit 11 as a midair image 30, any change in the depth of the midair image 30 is attributable to the user's perception and thus, a change in the depth of the midair image 30 is perceived differently from one user to another. This means that some users may not be able to perceive any change in the depth of the midair image 30. In order to ensure that this does not happen, the display device 1 in the embodiment executes calibration processing so as to make it possible for a user to perceive a change in the depth of the midair image 30 if the particular user has not been able to perceive a change in the depth of the midair image 30. It is to be noted that while the following explanation is given in reference to the first calibration mode, the calibration processing may be adopted in the second calibration processing mode, as well.

While a midair image 300 brought up on display during the calibration processing at the display device 1 in the fourth embodiment includes an icon 300A, it does not include any reference lines 310 through 314, unlike the midair image 300 brought up on display in the first embodiment, as shown in FIG. 4.

If the reach position or the specified position with respect to a press-down operation performed by the user is detected, via the operation detector 13, to be located further upward (toward the Z direction + side) relative to the detection reference 40 (see FIG. 7(b)), the image generation unit 201 generates display image data expressing a parallax image in which the icon 300A appears to be located further away from the user. The image generation unit 201 generates display image data expressing a parallax image having a less pronounced parallax effect than the parallax image constituting the midair image 300 in the initial display. The image generation unit 201 determines the degree of parallax effect to manifest in the parallax image based upon the distance between the reach position or the specified position and the detection reference 40. Data indicating parallax quantities each representing a degree of parallax effect correlated a specific distance between the reach position or the specified position and the detection reference 40, obtained in advance based upon results of testing and the like, are stored in the storage unit 205. The image generation unit 201 selects a parallax quantity by referencing the data stored in the storage unit 205. Through these measures, a user perception as if the icon 300A is located further away from the user (toward the Z direction − side) than the icon 300A in the midair image 300 in the initial display is created.

It is to be noted that if the reach position or the specified position with respect to a press-down operation performed by the user is detected, via the operation detector 13, to be located further downward (toward the Z direction − side) relative to the detection reference 40 (see FIG. 7(d)), the image generation unit 201 generates display image data expressing a parallax image in which the icon 300A appears to be located closer the user. The image generation unit 201 generates display image data expressing a parallax image manifesting a more pronounced parallax effect than the extent of parallax in the parallax image constituting the midair image 300 in the initial display. The image generation unit 201 determines the degree of parallax effect to manifest in the parallax image based upon the distance between the reach position or the specified position and the detection reference 40 by referencing the data stored in advance in the storage unit 205. Through these measures, a user perception as if the icon 300A is located closer to the user (toward the Z direction + side) than the icon 300A in the midair image 300 in the initial display is created.

Once the position at which the icon 300A is displayed in midair is adjusted as described above, the user decision-making unit 221 makes a decision as to whether or not the user perceives a change in the depth of the icon 300A. In this step, the user decision-making unit 221 makes a decision based upon information pertaining to the user's eyes. The decision-making processing executed by the user decision-making unit 221 will be explained next.

The detector 15 described earlier detects the distance between the left pupil and the right pupil of the user viewing the parallax image as the information pertaining to the user's eyes. The user decision-making unit 221 calculates the position at which the user perceives the icon 300A along the Z direction based upon the display position at which the icon 300A is displayed in midair (i.e., its position along the Z direction) in correspondence to the parallax image displayed at the display unit 11 and the distance between the left pupil and the right pupil detected via the detector 15. If the position of the icon 300A along the Z direction in the parallax image and the position of the icon 300A along the Z direction as perceived by the user are offset relative to each other by an extent greater than a predetermined offset quantity, the user decision-making unit 221 decides that the user has not perceived any change in the depth of the icon 300A.

If the user decision-making unit 221 decides that the user has not perceived a change in the depth of the icon 300A, the image generation unit 201 further adjusts the parallax quantity for the parallax image. In this situation, the image generation unit 201 further adjusts the parallax quantity for the parallax image based upon the extent of offset between the position of the icon 300A along the Z direction in the parallax image and the position having been calculated, at which the user perceives the icon 300A to be located along the Z direction. Namely, if the image generation unit 201 has been engaged in processing for reducing the degree of parallax effect in the parallax image, it generates a parallax image with less parallax. Through these measures, a user perception as if the midair image 300 has moved even further away from the user is created. If, on the other hand, the image generation unit 201 has been engaged in processing for increasing the degree of parallax effect in the parallax image, it generates a parallax image with more parallax. Through these measures, a user perception as if the midair image 300 has moved even closer to the user is created.

The calibration processing executed in the display device 1 in the fourth embodiment will be explained in reference to the flowchart presented in FIG. 39. It is to be noted that the flowchart in FIG. 39 only includes step S910 through step S921 and does not include subsequent steps. The processing executed in step S921 and subsequent steps is similar to the processing executed in step S7 and subsequent steps in the flowchart presented in FIG. 10.

The processing executed in step S910 through step S912 is similar to the processing executed in step S1 through step S3 in the flowchart presented in FIG. 10 pertaining to the first embodiment. In step S913, a decision is made with respect to the standing position taken by the user looking at the midair image 300. If it is decided, based upon the image capturing data generated by the image capturing device 18, that the standing position taken by the user is within a stereoscopic viewing-enabled region where the parallax image can be viewed as a stereoscopic image, an affirmative decision is made in step S913 and the operation proceeds to step S914. If, on the other hand, the standing position taken by the user is determined to be within a pseudoscopic region, a negative decision is made in step S913 and the operation waits in standby. In this case, a message leading the user to adjust the standing position may be brought up on display or an audio message leading a positional adjustment may be output, as explained earlier.

The processing executed in step S914 and step S915 is similar to the processing in step S4 and step S5 in the flowchart presented in FIG. 10. In step S916, a decision is made as to whether or not the reach position is in alignment with the position of the detection reference 40. If the reach position is in alignment with the position of the detection reference 40, an affirmative decision is made in step S916 and the operation proceeds to step S921, which will be described later. If, on the other hand, the reach position is not in alignment with the position of the detection reference 40, a negative decision is made in step S916 and the operation proceeds to step S917. In step S917, the image generation unit 201 adjusts the display mode for the icon 300A by adjusting the parallax quantity for the parallax image and then the operation proceeds to step S918.

In step S918, the line-of-sight of the user is detected based upon the detection output provided from the detector 15, and then the operation proceeds to step S919. In step S919, a decision is made as to whether or not the user perceives a midair position taken by the icon 300A following the display mode adjustment. If the user perceives the midair position of the icon 300A, i.e., if the extent of offset between the position of the icon 300A along the Z direction in the parallax image and the position of the icon 300A along the Z direction as perceived by the user is equal to or less than a predetermined offset quantity, an affirmative decision is made in step S919 and the operation proceeds to step S921. If the user does not perceive the midair position of the icon 300A, i.e., if the extent of offset between the position of the icon 300A along the Z direction in the parallax image and the position of the icon 300A along the Z direction as perceived by the user is greater than the predetermined offset quantity, a negative decision is made in step S919 and the operation proceeds to step S920. In step S920, the image generation unit 201 adjusts the degree of parallax effect for the parallax image based upon the specific extent of offset between position of the icon 300A along the Z direction in the parallax image and the position of the icon 300A along the Z direction as perceived by the user, and the display mode for the icon 300A is thus adjusted before the operation proceeds to step S921. In step S921, the operation exits the first calibration processing mode.

Figure 39:
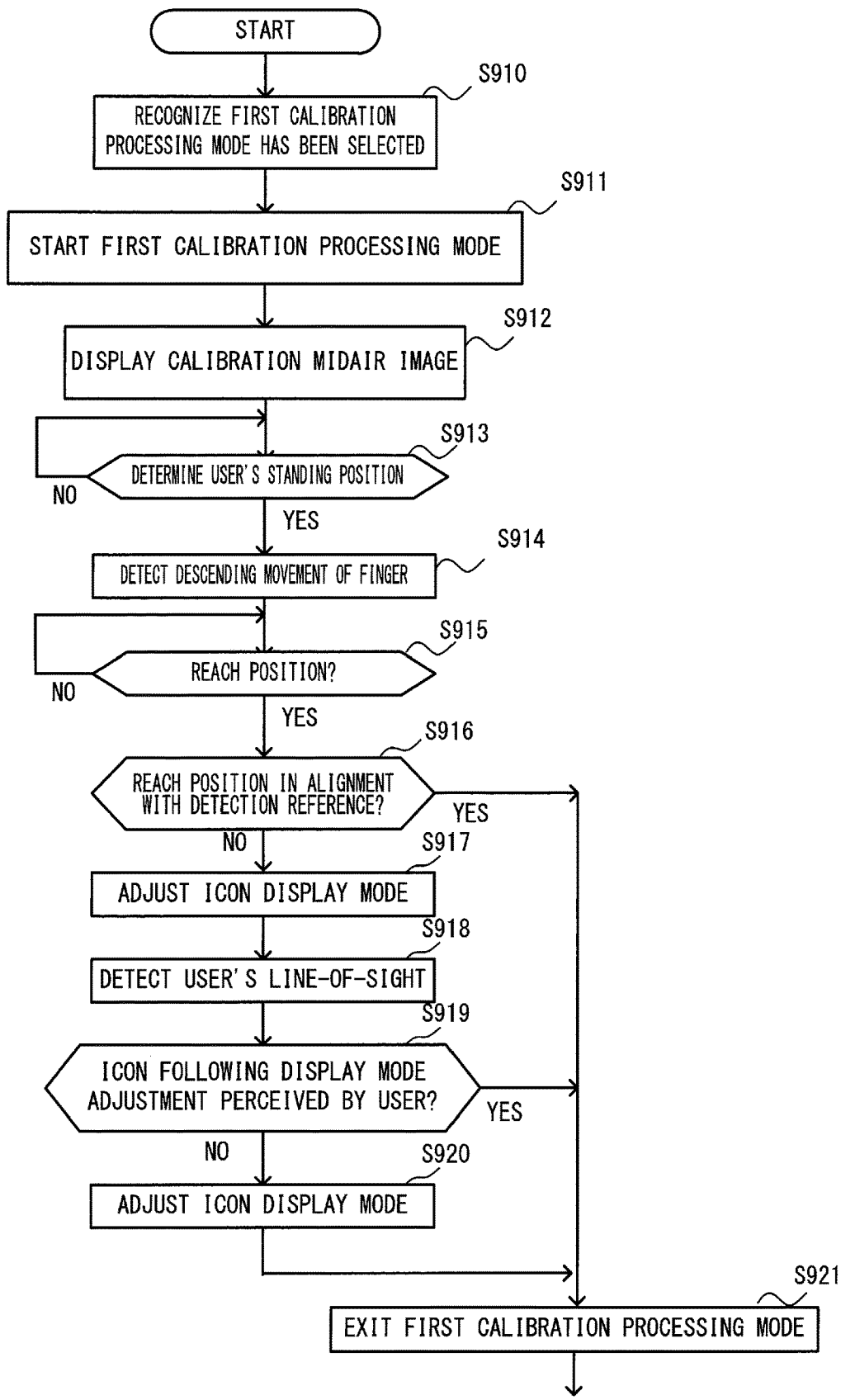

It is to be noted that the processing may be executed in the second calibration processing mode by executing the processing in step S913 in the flowchart presented in FIG. 39 following the processing in step S23 in the flowchart presented in FIG. 12 pertaining to the first embodiment. In addition, the processing in step S918 through step S920 in the flowchart presented in FIG. 39 will be executed after the processing executed in step S28 and step S32.

It is to be noted that the user decision-making unit 221 may make a decision as to whether or not the user perceives the icon 300A based upon the distance between the left pupil and the right pupil of his eyes. In such a case, the distance between the left pupil and the right pupil in the user's eyes will be obtained in advance via the detector 15 and be stored as distance data in the storage unit 205. If the parallax quantity in the parallax image corresponding to the icon 300A in the initial display is adjusted by the image generation unit 201 through calibration processing, the user decision-making unit 221 will obtain the direction of the user's left and right eye movement and the extent of the eye movement based upon a detection output from the detector 15. If an eye movement has occurred along a direction corresponding to the direction in which the change in the depth of the icon 300A has occurred as a result of the adjustment in the parallax quantity in the parallax image and the extent of the eye movement is within a predetermined range, the user decision-making unit 221 will decide that the user has perceived the change having occurred along the direction of the depth of the icon 300A.

In addition, if the user perceives that a change has occurred along the direction of depth of a midair image 30, the diameter of the user's pupils, too, normally changes with the change having occurred in the direction of the depth of the midair image 30.

Accordingly, the detector 15 may detect the pupil diameter in the user's eyes as information pertaining to the user's eyes and the user decision-making unit 221 may make a decision based upon the detected pupil diameter as to whether or not the user has perceived a change in the direction of the depth of the icon 300A. In this situation, the user decision-making unit 221 will make a decision based upon the direction of along which the pupil diameter has changed following the adjustment of the parallax quantity in the parallax image (whether the pupil diameter has increased or decreased) relative to the pupil diameter measured before the adjustment of the parallax quantity in the parallax image and the extent to which the pupil diameter has changed. Namely, if the pupil diameter has changed in a direction corresponding to the depthwise direction along which the change has occurred with respect to the icon 300A and the extent of the change is within a predetermined range, the user decision-making unit 221 will decide that the user has perceived a change having occurred in the depthwise direction with respect to the icon 300A.

It is to be noted that regardless of whether the display device 1 displays a parallax image as a midair image 30 by adopting a naked eye method or an eyeglass method, the user cannot see the midair image 30 as a stereoscopic image if one of his eyes is closed. Accordingly, if the detector 15 detects that one of the user's eyes is closed, the display device 1 may lead the user to open both eyes. The display control unit 202 may bring up on display a message such as "Please open both eyes and look at the midair image" in the midair image 30, or the display device 1 may include a speaker or the like so as to enable the control unit 20 to output the message above as an audio message or the like.

The image control unit 202 in the fourth embodiment brings up on display two parallactic images having parallactic offset at the display unit 11 and controls the display of the midair image 30 based upon the standing position taken by the user. Through these measures, it is ensured that the user takes a position in an area where he can view the midair image 30 as a stereoscopic image.

The image generation unit 201 in the fourth embodiment displays two parallactic images having parallactic offset at the display unit 11 and displays a midair image 30 based upon information related to the position at which a user operation has been detected and information pertaining to the user's eyes. As a result, it is ensured that the user is able to see the midair image 30 as a stereoscopic image through exploitation of the binocular parallax effect.

In addition, the image generation unit 201 in the fourth embodiment adjusts the parallax quantity, i.e. the extent of parallactic offset manifested by two parallax images, based upon the distance between the left pupil and the right pupil in the user's eyes or the pupil diameter. As a result, if the user has not perceived any change with respect to the depth of the midair image 30, a further change can be made with respect to the depth of the midair image 30 so that the user is able to perceive the spatial position of the midair image 30.

(Variation 1 of the Fourth Embodiment)

A display device 1 in variation 1 of the fourth embodiment adjusts the display position of a midair image along the depthwise direction by executing calibration processing through a method different from the method in which the parallax quantity representing the degree of parallax effect in a parallax image is adjusted.

In an example of such a variation, the display unit 11 is allowed to move along the Z direction in the display device 1 as explained below.

Figure 40:
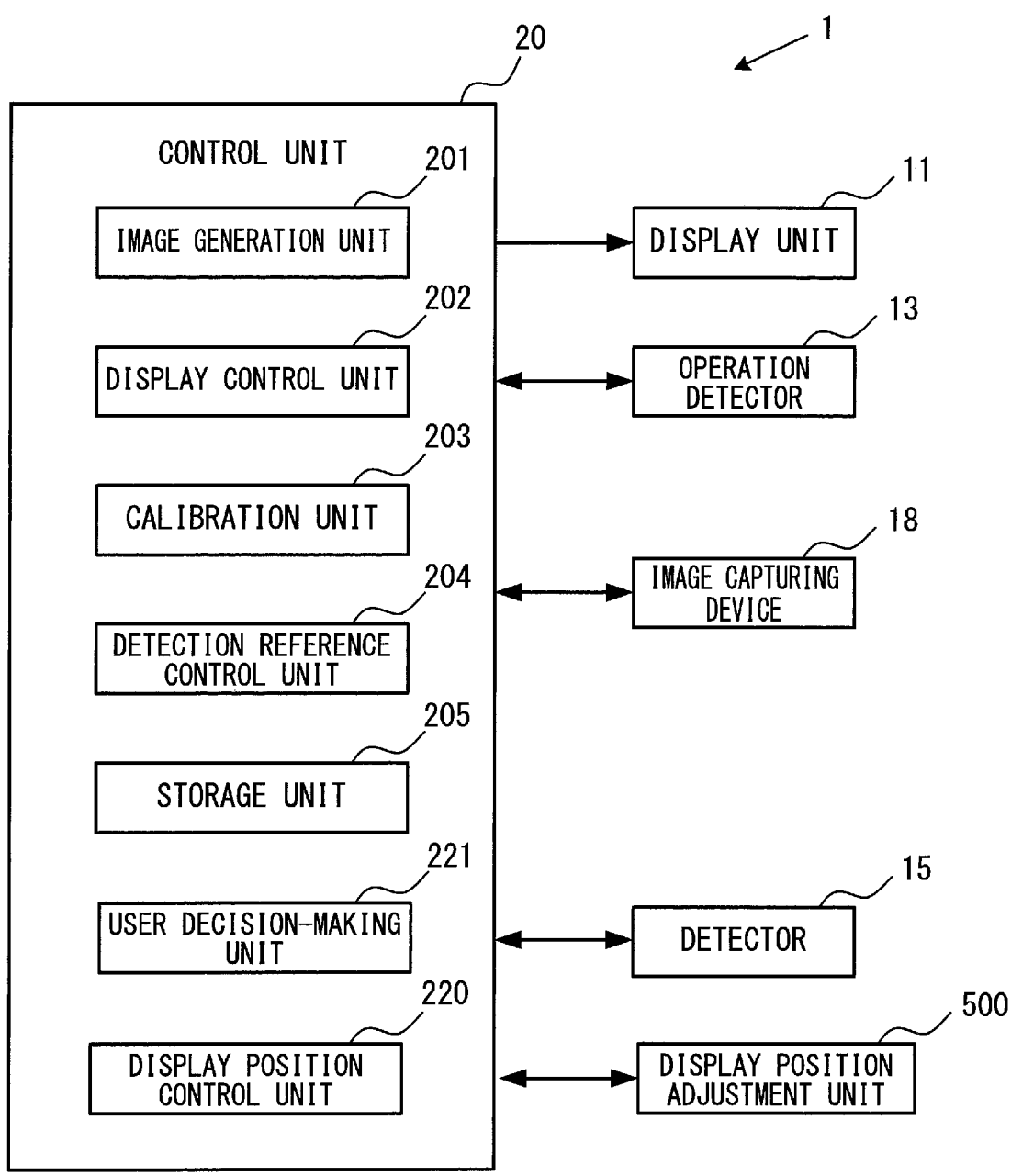

FIG. 40 is a block diagram of the essential structure adopted in the display device 1. The display device 1 in variation 1 includes a display position adjustment unit 500 and a display position control unit 220 in addition to the structural elements in the display device 1 in the fourth embodiment, as shown in FIG. 37 and FIG. 38.

The display position adjustment unit 500, which includes a drive unit such as a motor or an actuator, moves the display unit 11 along the optical axis of the lenticular lens 16, as indicated by the arrow, so as to adjust the position at which the midair image 30 is perceived by moving the position along the Z direction, i.e., along the optical axis. In order to move the midair image 30 upward, i.e., further away from the display unit 11, the display position adjustment unit 500 moves the display unit 11 upward, i.e., closer to the lenticular lens 16. In order to move the midair image 30 downward, i.e., closer to the display unit 11, the display position adjustment unit 500 moves the display unit 11 downward, i.e., away from the lenticular lens 16. It is to be noted that instead of moving the display unit 11, the display position adjustment unit 500 may move the lenticular lens 16 along the Z axis or may move both the display unit 11 and the lenticular lens 16 along the Z axis.

The display position adjustment unit 500 in the display device 1 in variation 1 of the fourth embodiment moves the display unit 11 along the Z axis if the user still does not perceive that the midair image 30 has moved along the depthwise direction even after the parallax quantity has been adjusted for a parallax image through the calibration processing. The display position adjustment unit 500 determines the extent to which the display unit 11 is to move and the direction along which the display unit 11 is to move based upon an offset quantity indicating the extent of offset between the position of the icon 300A along the Z direction in the parallax image and the calculated position at which by the user perceives the icon 300A to be located along the Z direction. Namely, if the image generation unit 201 has executed processing for reducing the parallax quantity for the parallax image, the display position adjustment unit 500 moves the display unit 11 toward the Z direction − side. As a result, a user perception as if the midair image 300 has moved even further away from the user is created. If the image generation unit 201 has executed processing for increasing the parallax quantity for the parallax image, the display position adjustment unit 500 moves the display unit 11 toward the Z direction + side. As a result, a user perception as if the midair image 300 has moved even closer to the user is created.

In the display device 1 in variation 1 of the fourth embodiment, the processing in step S920 in the flowchart presented in FIG. 39 is executed by the display position adjustment unit 500 by adjusting the display unit 11.

It is to be noted that the display device 1 may lead the user to open both eyes if one of them is closed in the same way as that described in reference to the fourth embodiment. In addition, the display position adjustment unit 500 may move the display unit 11 under such circumstances.

In variation 1 of the fourth embodiment, the position of the midair image 30 is adjusted through adjustment of the position of the display unit 11. Through these measures, it is ensured that the user is able to perceive the display position of the midair image 30 in space.

Is to be noted that instead of moving the position of the display unit 11 via the display position adjustment unit 500, the technology taught in International Publication No. 2011/158911 may be adopted in the display unit 11. Namely, the display unit 11 may adopt a structure that enables light field display of a 3D stereoscopic image and a midair image 30 may be formed at various positions in midair along the optical axis by bringing up on display an image for two-dimensional display at the display unit 11.

Figure 41:
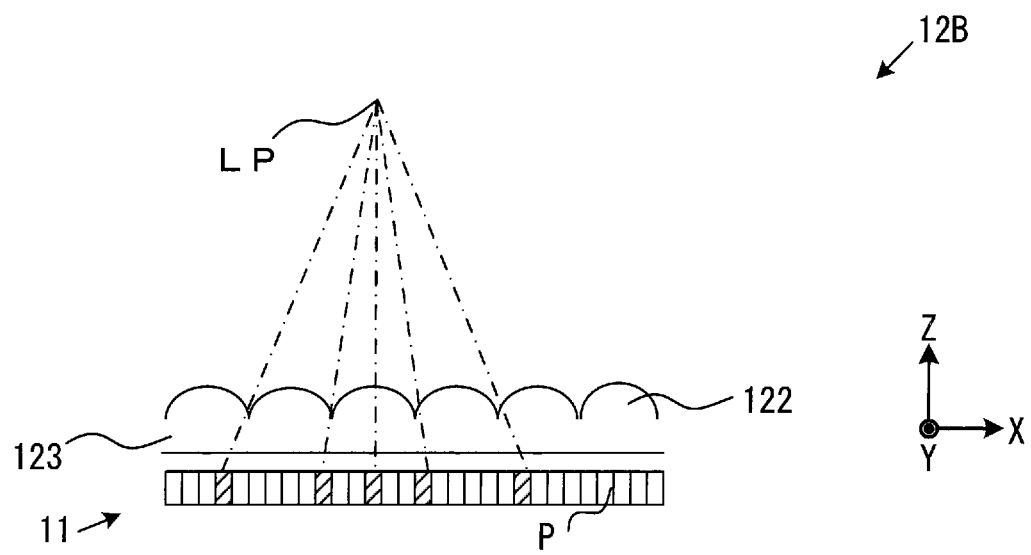

FIG. 41 schematically illustrates a display unit 11 and an image-forming optical system 12B that may be included in such a structure in a sectional view taken over the ZX plane. The image-forming optical system 12B is disposed at the display surface of the display unit 11. The image-forming optical system 12B includes a microlens array 123 constituted with a plurality of microlenses 122 disposed in a two-dimensional pattern. The microlenses 122 are each disposed in correspondence to a plurality of display pixels P at the display unit 11. It is to be noted that while a single microlens 122 is disposed in correspondence to 5×5 display pixels P in the example presented in FIG. 41 in order to simplify the illustration, each microlens 122 is actually disposed in correspondence to a greater number of display pixels P. The microlens array 123 is disposed at a position set apart from the display surface of the display unit 11 by a distance matching the focal length f of the microlenses 122 toward the Z direction + side. Each microlens 122 projects light traveling from display pixels P onto a specific image plane along the Z direction based upon the image on display. It is to be noted that lenticular lenses may be used in place of the microlenses 122.

In order for the various light points LP that compose a midair image 30 to be formed in space, the light forming a given light point LP is emitted from some of the display pixels P, each covered by one of a plurality of different microlenses 122 at the display unit 11. It is to be noted that the light point LP, which is an image displayed in midair via the display unit 11 and the microlenses 122, is a midair image. In the example presented in FIG. 41, light emitted from the shaded display pixels P is projected via the corresponding microlenses 122 to form the light point LP. In this situation, the display pixels P to emit the light that will form the light point LP are assigned corresponding to the plurality of different microlenses 122 in a number matching the number of display pixels P covered by a single microlens 122 (5×5 in the example presented in FIG. 41). Based upon the pattern in which these display pixels P are assigned, the position of a light point LP formed in midair along the Z direction can be adjusted. The midair image 30 is composed of light points P thus formed. The position of the midair image 30 along the Z direction can be thus adjusted by altering the image displayed at the display unit 11. It is to be noted that the position of the midair image 30 along the Z direction may be adjusted through a computer-generated hologram (CGH) technology by constituting the display device 1 with a DMD or the like.

(Variation 2 of the Fourth Embodiment)

The display device in variation 2 of the fourth embodiment may adopt a structure similar to that of the display device in variation 1 of the fourth embodiment shown in FIG. 40. Namely, the display device 1 in variation 2 of the fourth embodiment includes a structural element that makes it possible for the display unit 11 to move. In the display device 1 in variation 2, control is executed to move a midair image 30 along the depthwise direction either by moving the display unit 11 or by adjusting the parallax quantity in a parallax image in correspondence to the extent to which the midair image 30 is to move along the depthwise direction.

Under normal circumstances, a human being is able to perceive the distance by which the depthwise position of a midair image 30 is altered by adjusting the parallax quantity in a parallax image more accurately than the distance by which the midair image 30 actually moves through space. Accordingly, in calibration processing executed in the display device 1 in variation 2 of the fourth embodiment, the display position adjustment unit 500 moves the display unit 11 if the extent to which the midair image 30 is to move exceeds a predetermined value and the image generation unit 201 adjusts the parallax quantity for the parallax image if the extent to which the midair image 30 is to move is equal to or less than the predetermined value.

The calibration processing executed in the display device 1 in variation 2 of the fourth embodiment will be explained in reference to the flowchart presented in FIG. 42. It is to be noted that the flowchart in FIG. 42 only includes step S930 through step S941 and does not include subsequent steps. The processing executed in step S941 and subsequent steps is similar to the processing executed in step S7 and subsequent steps in the flowchart presented in FIG. 10.

The processing executed in step S930 through step S936 is similar to the processing executed in step S910 through step S916 in the flowchart presented in FIG. 39 pertaining to the fourth embodiment. In step S937, to which the operation proceeds after making a negative decision in step S936, a displacement quantity indicating the extent to which the midair image 30 is to move is calculated based upon the distance between the reach position and the detection reference 40 and then the operation proceeds to step past 938. In step S938, a decision is made as to whether or not the displacement quantity calculated for the midair image 30 exceeds a predetermined value. If it is decided that the displacement quantity exceeds the predetermined value, an affirmative decision is made in step S938 and the operation proceeds to step S939. In step S939, the display position adjustment unit 500 moves the display unit 11, and the operation proceeds to step S941. If, on the other hand, the displacement quantity is equal to or less than the predetermined value, a negative decision is made in step S938 and the operation proceeds to step S940. In step S940, the image generation unit 201 adjusts the display mode for the icon 30A before the operation proceeds to step S941. In step S921, the processing in the first calibration processing mode ends.

Figure 42:
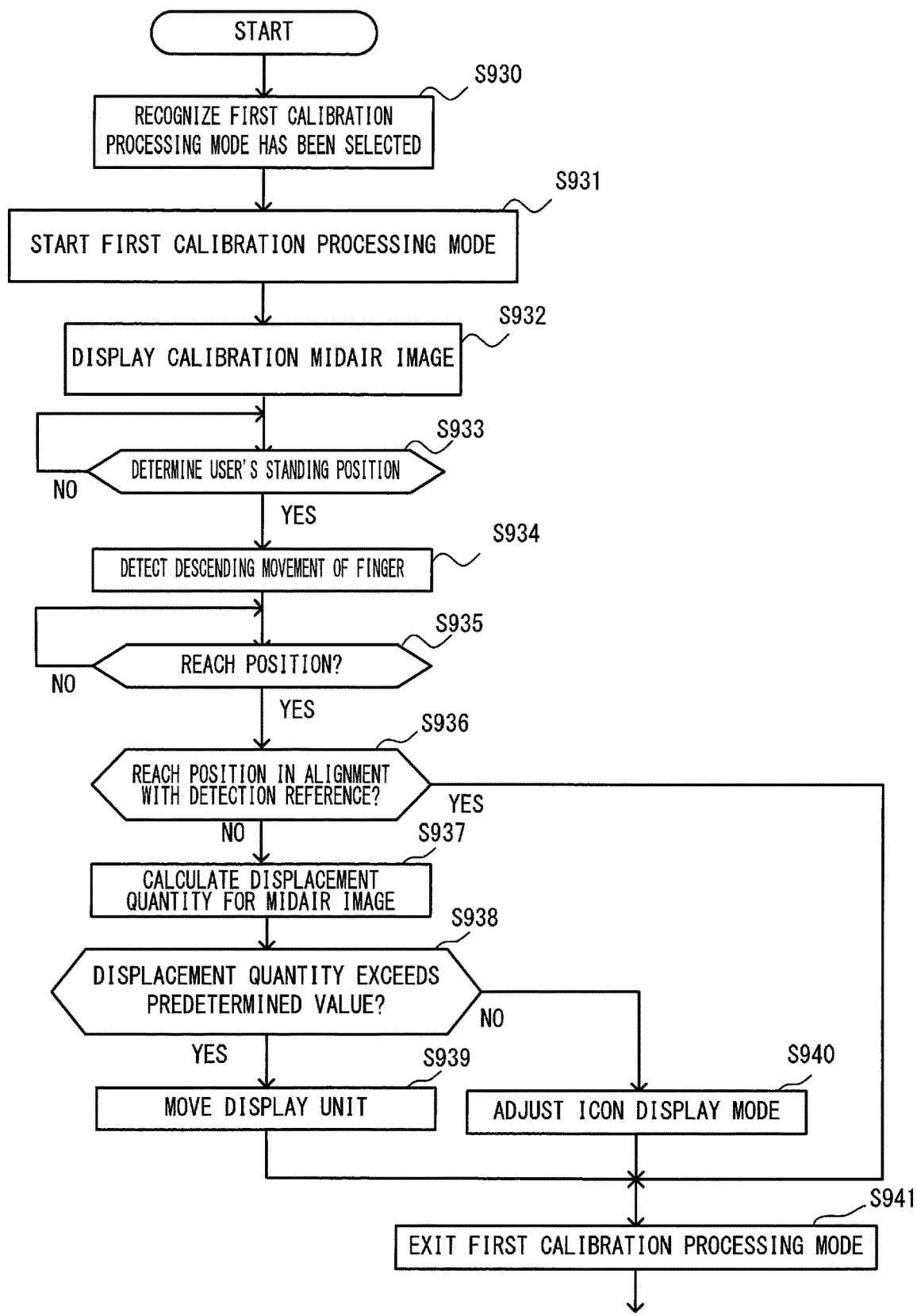

It is to be noted that the processing may be executed in the second calibration processing mode by executing the processing in step S937 through step S940 in the flowchart presented in FIG. 42 instead of the processing in step S26 through step S28 in the flowchart presented in FIG. 12 pertaining to the first embodiment. In addition, the processing in step S937 through step S940 in the flowchart presented in FIG. 42 will be executed instead of the processing executed in step S29, step S30 and step S32 in FIG. 12.

It is to be noted that the display device 1 may switch to the control by moving the display unit 11 or the control by adjusting the parallax quantity for a parallax image in correspondence to the extent to which a midair image 30 is to move when moving the midair image 30 based upon a user operation in the midair image operation mode as well as in the calibration processing mode. For instance, if the user performs an operation for moving the midair image 30 by 30 cm, the display position adjustment unit 500 moves the display unit 11. If, on the other hand, the user performs an operation for moving the midair image by 1 mm, the image generation unit 201 adjusts the parallax quantity for the parallax image.

In addition, the control executed in the display device 1 in variation 2 of the fourth embodiment may be adopted in the first embodiment and the variations thereof, the second embodiment, the third embodiment and the variations thereof. Namely, when the extent to which a midair image 30 or 300 is to move exceeds a predetermined value, the display position adjustment unit 500 may move the display unit 11 and if the extent to which the midair image 30 or 300 is to move is equal to or less than the predetermined value, the image generation unit 201 may adjust the display mode for an icon 30A or 300A.

It is to be noted that while the display device 1 in the fourth embodiment and variations 1 and 2 thereof described above includes at least the control unit 20, the display unit 11 and the operation detector 13, the present invention may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described earlier may be added as needed in order to realize the various advantages described in reference to the fourth embodiment and variations 1 and 2 thereof. In addition, the control device described above may be built into any of various types of electronic devices adopting the fourth embodiment and the variations thereof.

Furthermore, the present invention may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to realize the various advantages described in reference to the fourth embodiment and variations 1 and 2 thereof, a structural element among the structural elements described earlier may be added into the detection device as deemed necessary.

In all the embodiments and variations described above, a midair image may be generated by condensing laser light in midair and forming plasma with air molecules so as to emit light in midair. Through this method, a three-dimensional image is generated as a real image in midair by controlling the laser light condensing position at any desired position in the three-dimensional space. In another midair image generation method, an image may be generated in midair via a display device having a function of creating fog in the air in addition to a projector function by creating a screen with the fog in the air and projecting an image onto the screen formed with the fog (fog display).

A program enabling the various types of processing to be executed at the display device 1 to move the position of a midair image 30 may be recorded into a computer-readable recording medium, and the calibration may be executed based upon the program read into a computer system. It is to be noted that the "computer system" in this context may include an OS (operating system) and hardware such as peripheral devices.

It is to be also noted that the "computer system" may include a homepage provider environment (or a display environment) in conjunction with the WWW system. In addition, the "computer-readable recording medium" may be a non-volatile writable memory such as a flexible disk, a magneto-optical disk, a ROM or a flash memory, a portable medium such as a CD-ROM, or a storage device such as a hard disk built into a computer system. Furthermore, the "computer-readable recording medium" may be a storage medium capable of holding a program over a specific length of time, such as a volatile memory (e.g., DRAM (dynamic random access memory)) in a computer system functioning as a server or a client when the program is transmitted via a communication network such as the Internet or via a communication line such as a telephone line.

The "program" stored in a storage device or the like in a computer system may be transmitted to another computer system via a transmission medium or on a transmission wave in a transmission medium. The "transmission medium" through which the program is transmitted in this context refers to a medium having a function of information transmission, examples of which include a network (communication network) such as the Internet and a communication line such as a telephone line. The program described above may enable only some of the functions described earlier. Furthermore, the program may be a differential file (differential program) that works in conjunction with a program already recorded in the computer system so as to enable the functions described earlier.

As long as the features characterizing the present invention remain intact, the present invention is in no way limited to the particulars of the embodiments described above and other modes or combinations that are conceivable within the technical teaching of the present invention are also within the scope of the invention.

The disclosure of the following priority application is herein incorporated by reference:
Japanese Patent Application No. 2016-128209 filed Jun. 28, 2016

REFERENCE SIGNS LIST

1 . . . display device, 11 . . . display unit, 12 . . . image-forming optical system, 13 . . . operation detector, 14 . . . sound collector, 15 . . . detector, 18 . . . image capturing device, 20 . . . control unit, 103 . . . display unit, 201 . . . image generation unit, 202 . . . display control unit, 203 . . . calibration unit, 204 . . . detection reference control unit, 206 . . . velocity·acceleration detection unit, 207 . . . reach position predicting unit, 208 . . . sound detection unit, 209 . . . index mark display control unit, 210 . . . image analysis unit, 220 . . . display position control unit, 221 . . . user decision-making unit, 500 . . . display position adjustment unit

The invention claimed is:
1. A control device that adjusts, based upon an operation by a user with respect to a display in a midair, the display, comprising:
    an acquisition unit that ascertains a positional relationship between a first reference used for detection of the operation and a position at which the operation is detected; and
    a control unit that adjusts the display in relation to a second reference used as a depth cue for the display based upon the positional relationship ascertained by the acquisition unit so as to create a user perception as if a position of the display is changed, wherein,
    the operation is a press-down operation performed as if to press down on the display; and
    the control unit adjusts the display along a direction determined based upon the press-down operation or along a direction opposite from the direction determined based upon the press-down operation so as to create the user perception as if the position of the display is changed.
2. The control device according to claim 1, wherein:
    the control unit adjusts the display so as to create the user perception as if the position of the display has moved closer to the user or away from the user.
3. The control device according to claim 2, wherein:
    the control unit determines the direction along which the position of the display is to be altered based upon the positional relationship.

4. The control device according to claim 1, wherein:
the second reference is a midair image displayed in the midair; and
the control unit adjusts the midair image so as to create the user perception as if the position of the display is changed relative to the second reference.

5. The control device according to claim 1, wherein:
the control unit adjusts the display in a case that the positional relationship indicates that the first reference is set apart from the position at which the operation is detected.

6. The control device according to claim 5, wherein:
the control unit adjusts the display so as to create the user perception as if the position of the display is changed relative to the second reference, and judges whether or not the position at which the operation is detected moves closer to the first reference.

7. The control device according to claim 1, wherein:
the second reference is a midair image display in the midair; and
the control unit adjusts a size of the display relative to the midair image.

8. The control device according to claim 1, wherein:
the second reference is a midair image display in the midair; and
the control unit adjusts a sharpness of the display relative to the midair image.

9. The control device according to claim 1, wherein:
the second reference is a reference line; and
the control unit adjusts the display so as to create the user perception as if the position of the display relative to the reference line is changed.

10. A control method for adjusting a display based upon an operation by a user with respect to the display in a midair, the method comprising:
ascertaining a positional relationship between a first reference used for detection of the operation and a position at which the operation is detected; and
adjusting the display in relation to a second reference used as a depth cue for the display based upon the ascertained positional relationship so as to create a user perception as if a position of the display is changed, wherein,
the operation is a press-down operation performed as if to press down on the display; and
the display is adjusted along a direction determined based upon the press-down operation or along a direction opposite from the direction determined based upon the press-down operation so as to create the user perception as if the position of the display is changed.

11. The control method according to claim 10, wherein:
the second reference is a midair image displayed in the midair; and
the midair image is adjusted so as to create the user perception as if the position of the display is changed relative to the second reference.

12. The control method according to claim 10, wherein:
the display is adjusted in a case that the positional relationship indicates that the first reference is set apart from the position at which the operation is detected.

13. The control method according to claim 10, wherein:
the second reference is a midair image display in the midair; and
a size of the display relative to the midair image is adjusted.

14. The control method according to claim 10, wherein:
the second reference is a reference line; and
the display is adjusted so as to create the user perception as if the position of the display relative to the reference line is changed.

15. A non-transitory computer-readable medium storing thereon a program for adjusting a display based upon an operation by a user with respect to the display in a midair, the control program comprising:
instructions for ascertaining a positional relationship between a first reference used for detection of the operation and a position at which the operation is detected; and
instructions for adjusting the display in relation to a second reference used as a depth cue for the display based upon the ascertained positional relationship so as to create a user perception as if a position of the display is changed, wherein,
the operation is a press-down operation performed as if to press down on the display; and
the display is adjusted along a direction determined based upon the press-down operation or along a direction opposite from the direction determined based upon the press-down operation so as to create the user perception as if the position of the display is changed.

16. The non-transitory computer-readable medium according to claim 15, wherein:
the second reference is a midair image displayed in the midair; and
the midair image is adjusted so as to create the user perception as if the position of the display is changed relative to the second reference.

17. The non-transitory computer-readable medium according to claim 15, wherein:
the display is adjusted in a case that the positional relationship indicates that the first reference is set apart from the position at which the operation is detected.

18. The non-transitory computer-readable medium according to claim 15, wherein:
the second reference is a midair image display in the midair; and
a size of the display relative to the midair image is adjusted.

19. The non-transitory computer-readable medium according to claim 15, wherein:
the second reference is a reference line; and
the display is adjusted so as to create the user perception as if the position of the display relative to the reference line is changed.

* * * * *